US008111826B2

(12) United States Patent
Takashima

(10) Patent No.: US 8,111,826 B2
(45) Date of Patent: Feb. 7, 2012

(54) APPARATUS FOR GENERATING ELLIPTIC CURVE CRYPTOGRAPHIC PARAMETER, APPARATUS FOR PROCESSING ELLIPTIC CURVE CRYPTOGRAPH, PROGRAM FOR GENERATING ELLIPTIC CURVE CRYPTOGRAPHIC PARAMETER, AND PROGRAM FOR PROCESSING ELLIPTIC CYPTOGRAPH

(75) Inventor: Katsuyuki Takashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 835 days.

(21) Appl. No.: 12/085,587

(22) PCT Filed: Jan. 11, 2006

(86) PCT No.: PCT/JP2006/300223
§ 371 (c)(1),
(2), (4) Date: May 28, 2008

(87) PCT Pub. No.: WO2007/080633
PCT Pub. Date: Jul. 19, 2007

(65) Prior Publication Data
US 2009/0285386 A1 Nov. 19, 2009

(51) Int. Cl.
*H04L 9/00* (2006.01)
(52) U.S. Cl. .................. 380/28; 380/29; 380/30
(58) Field of Classification Search .............. None
See application file for complete search history.

(56) References Cited

U.S. PATENT DOCUMENTS

| 5,442,707 | A  | * | 8/1995  | Miyaji et al. ............ 380/30 |
| 6,337,909 | B1 |   | 1/2002  | Vanstone et al. |
| 6,480,606 | B1 | * | 11/2002 | Kurumatani ............ 380/30 |
| 7,023,990 | B1 |   | 4/2006  | Arita et al. |
| 7,239,701 | B1 |   | 7/2007  | Ogishi et al. |

FOREIGN PATENT DOCUMENTS

| JP | 11-212457 A | 8/1999 |
| JP | 11-305660 A | 11/1999 |

(Continued)

OTHER PUBLICATIONS

Sakai et al., "Cryptosystems based on Pairing over Elliptic Curve," The 2001 Symposium on Cryptography and Information Security, pp. 369-373, (2001).

(Continued)

*Primary Examiner* — David García Cervetti
*Assistant Examiner* — Ghazal Shehni
(74) *Attorney, Agent, or Firm* — Birch Stewart Kolasch & Birch, LLP

(57) ABSTRACT

A prime number generation unit 110 generates an integer r having a form suitable for fast elliptic curve pairing computation, by using a processing device (S302 to S303). The prime number generation unit 110 judges whether the integer r is a prime number or not, by using the processing device (S304). When the integer r is a prime number, the prime number generation unit 110 judges whether the prime number r is a group order capable of easily changing the level of security or not, by using the processing device (S305). Thereby, it is possible to generate an elliptic curve parameter which is settable to an elliptic curve cryptographic processor that performs elliptic curve pairing computation using an algorithm capable of performing fast computation even by using a processing device with low computational capacity and which is capable of easily changing the level of security.

44 Claims, 20 Drawing Sheets

FOREIGN PATENT DOCUMENTS

| | | |
|---|---|---|
| JP | 2001-66987 A | 3/2001 |
| JP | 2002-26892 A | 1/2002 |
| JP | 2002-533787 A | 10/2002 |
| JP | 2004-177673 A | 6/2004 |
| JP | 2004-271792 A | 9/2004 |
| JP | 2005-500740 A | 1/2005 |
| JP | 2005-241898 A | 9/2005 |
| JP | 2005-283674 A | 10/2005 |
| WO | WO-03/017559 A2 | 2/2003 |

OTHER PUBLICATIONS

Boneh et al., "Identity-Based Encryption from the Weil Pairing", Crypto, LNCS 2139, pp. 213-229, 2001.

D. Freeman et al: A Taxonomy of Pairing-Friendly Elliptic Curves:, Internet Citation, Jan. 1, 2006, pp. 1-48, XP007906596, Retrieved from the Internet: URL:http://eprint.iacr.org/2006/372.pdf.

Daniel V. Balley et al: "Optimal extension fields for fast arithmetic in public-key algorithms", Advances in Cryptology, Crypto '98. 19th Annual International Cryptology Conference, Santa Barbara, Aug. 23-27, 1998. Proceedings; [Lecture Notes in Computer Science vol. 1462] Berlin Springer DE Aug. 23, 1998 pp. 472-485.

Galbraith S ED—Ian F Blake: Advances in Elliptic Cryptography, Chapter IX, "Pairings", May 31, 2005, Cambridge University Press, GB, pp. 183-214, XP007916329.

Michael Scott—Subhamoy Maitra et al: "Faster Pairings Using an Elliptic Curve with an Efficient Endomorphism", Jan. 1, 2005, Progress in Cryptology—Indocrypt 2005 Lecture Notes in Computer Science;; LNCS, Springer, Berlin, DE, pp. 258-269, XP019025595.

Michael Scott: "Scaling security in pairing-based protocols", Cryptology Eprint Archive: Report No. 2005/139, May 10, 2005, pp. 1-15 XP007916133, Retrieved from the Internet: URL:http://eprint.iacr.org/2005/139.

* cited by examiner

Fig. 6

ELLIPTIC CURVE PAIRING PROCESSING UNIT ( TATE PAIRING COMPUTING PROCESS )

S101: INPUT POINTS P AND Q ON ELLIPTIC CURVE E OVER FINITE FIELD GF($q^k$), AND STORE INPUT POINTS P AND Q IN STORAGE DEVICE

S102: READ COEFFICIENTS a AND b OF ELLIPTIC CURVE E AND GROUP ORDER r OF ADDITIVE GROUP E(GF(q)) FROM STORAGE DEVICE

S103: SELECT POINT ON ELLIPTIC CURVE E OVER FINITE FIELD GF($q^k$) AT RANDOM BY USING PROCESSING DEVICE, AND STORE IT IN STORAGE DEVICE, AS POINT S

S104: CALCULATE SUM OF POINTS Q AND S ON ELLIPTIC CURVE E OVER FINITE FIELD GF($q^k$) BY USING PROCESSING DEVICE, AND STORE IT IN STORAGE DEVICE, AS POINT Q'

S105: READ POINT P ON ELLIPTIC CURVE E OVER FINITE FIELD GF($q^k$) FROM STORAGE DEVICE, AND STORE IT IN STORAGE DEVICE, AS POINT A

S106: STORE CONSTANT 1, BEING IN FINITE FIELD GF($q^k$), IN STORAGE DEVICE, AS PAIRING VALUE f

S107: STORE BIT LENGTH u OF GROUP ORDER r OF ADDITIVE GROUP E(GF(q)) IN STORAGE DEVICE, AS INTEGER m

S108: CALCULATE EQUATION l : cX+dY+e=0 OF TANGENT TO ELLIPTIC CURVE E AT POINT A BY USING PROCESSING DEVICE, AND STORE COEFFICIENTS c, d AND e OF EQUATION l IN STORAGE DEVICE

S109: CALCULATE INTERSECTION OF TANGENT TO ELLIPTIC CURVE E AT POINT A AND ELLIPTIC CURVE E BY USING PROCESSING DEVICE, AND STORE IT IN STORAGE DEVICE, AS INTERSECTION R'

FROM S128

S110: CALCULATE EQUATION v : X−u=0 OF STRAIGHT LINE PASSING THROUGH INTERSECTION R', WHEREIN VALUE OF X IS CONSTANT, BY USING PROCESSING DEVICE, AND STORE COEFFICIENT u OF EQUATION v IN STORAGE DEVICE

S111: CALCULATE INTERSECTION OF STRAIGHT LINE PASSING THROUGH INTERSECTION R', WHEREIN VALUE OF X IS CONSTANT, AND ELLIPTIC CURVE E, BY USING PROCESSING DEVICE, AND STORE IT IN STORAGE DEVICE, AS POINT A (DOUBLE POINT A TO OBTAIN NEW POINT A)

S112: CALCULATE VALUE l(Q') IN FINITE FIELD GF($q^k$) BY SUBSTITUTING COORDINATES OF POINT Q' INTO LEFT-HAND SIDE cX+dY+e OF EQUATION l BY USING PROCESSING DEVICE, AND STORE CALCULATED VALUE l(Q') IN STORAGE DEVICE

S113: CALCULATE VALUE l(S) IN FINITE FIELD GF($q^k$) BY SUBSTITUTING COORDINATES OF POINT S INTO LEFT-HAND SIDE cX+dY+e OF EQUATION l BY USING PROCESSING DEVICE, AND STORE CALCULATED VALUE l(S) IN STORAGE DEVICE

S114: CALCULATE VALUE v(Q') IN FINITE FIELD GF($q^k$) BY SUBSTITUTING COORDINATES OF POINT Q' INTO LEFT-HAND SIDE X−u OF EQUATION v BY USING PROCESSING DEVICE, AND STORE CALCULATED VALUE v(Q') IN STORAGE DEVICE

S115: CALCULATE VALUE v(S) IN FINITE FIELD GF($q^k$) BY SUBSTITUTING COORDINATES OF POINT S INTO LEFT-HAND SIDE X−u OF EQUATION v BY USING PROCESSING DEVICE, AND STORE CALCULATED v(S) IN STORAGE DEVICE

S116: CALCULATE VALUE $\frac{f^2 \times l(Q') \times v(S)}{v(Q') \times l(S)}$ IN FINITE FIELD GF($q^k$) BY USING PROCESSING DEVICE, AND STORE IT IN STORAGE DEVICE, AS PAIRING VALUE f

TABLE 1: $\rho$ ORIENTED PARAMETER GENERATION METHOD

| Method | k | $\rho$ |
|---|---|---|
| MNT | 3, 4, 6 | ~1 |
| BM | 12 | ~1 |
| BM | 8, 24 | ~5/4 |
| | Prime k | ~ (k+2) / (k-1) |

Algorithm 1 Cocks-Pinch algorithm When $D \equiv 1 \mod 4$

---

Input: k, r:Prime, $D (\equiv 1 \mod 4)$ (D: quadratic residue modulo r, $k|r-1$).

Output: $p, t$ s.t. $r|p+1-t$, $r|p^k - 1$.

1: Select primitive k-th root of unity $g(\in \mathbb{F}_r^*)$
2: $\omega \leftarrow g/2 \mod r$.
3: $f_0 \leftarrow (2\omega - 1)/\sqrt{D} \mod r$.
4: repeat
5: $\quad p \leftarrow \omega^2 + \omega + (1 - (f_0 + jr)^2 D)/4$.
6: until p is prime
7: $t \leftarrow 2\omega$.
8: Output p and t

Algorithm 2 Auxiliary function g

---

Input : $A, B\ (\in E(\mathbb{F}_p))$, $Q\ (\in \phi(E'(\mathbb{F}_{p^{k/2}})) \subset E(\mathbb{F}_{p^k}))$, $i\ (\in \mathbb{Z}_{\geq 0})$.

1: $x_i, y_i \leftarrow A$, $x_Q, y_Q \leftarrow Q$.
2: Calculate slope $m_i$ between A and B, and calculate $A + B$ using $m_i$ Then put it A
3: $s[i] \leftarrow -y_Q - y_i - m_i(\beta x_Q - x_i)$.
4: Output $y_Q - y_i - m_i(x_Q - x_i)$

Fig. 20

| Algorithm 3    (73rd power of) Tate pairing value for group order $r_1$ |
|---|
| Input :   $P\ (\in E(\mathbb{F}_p))$, $Q\ (\in \phi(E'(\mathbb{F}_{p^{k/2}})) \subset E(\mathbb{F}_{p^k}))$. <br> Output :   $e(P,Q)^{73}$. <br> 1: $A \leftarrow P, f \leftarrow 1$. <br> 2: for $i \leftarrow 1$ to 87 do <br> 3:     $f \leftarrow f^2 \cdot g(A, A, Q, i)$. <br> 4: end for <br> 5: $f \leftarrow f \cdot g(A, P, Q, -)$. <br> 6: for $i \leftarrow 1$ to 87 do <br> 7:     $f \leftarrow f^2 \cdot s[i]$. <br> 8: end for <br> 9: Output $f^{(p^k-1)/r}$ |

Fig. 21

| Algorithm 4    Tate pairing value for group order $r_2$ |
|---|
| Input :   $P\ (\in E(\mathbb{F}_p))$, $Q\ (\in \phi(E'(\mathbb{F}_{p^{k/2}})) \subset E(\mathbb{F}_{p^k}))$. <br> Output :   $e(P,Q)$. <br> 1: $A \leftarrow P, f \leftarrow 1, j \leftarrow 1$. <br> 2: for $i \leftarrow 1$ to $c_1 - c_2$ do <br> 3:     $f \leftarrow f^2 \cdot g(A, A, Q, j++)$. <br> 4: end for <br> 5: $f \leftarrow f \cdot g(A, P, Q, j++)$. <br> 6: for $i \leftarrow 1$ to $c_2$ do <br> 7:     $f \leftarrow f^2 \cdot g(A, A, Q, j++)$. <br> 8: end for <br> 9: $f \leftarrow f \cdot g(A, P, Q, -)$. <br> 10: $h \leftarrow f, j \leftarrow 1$. <br> 11: for $i \leftarrow 1$ to $c_1 - c_2$ do <br> 12:     $f \leftarrow f^2 \cdot s[j++]$. <br> 13: end for <br> 14: $f \leftarrow f \cdot s[j++]$. <br> 15: $f \leftarrow f \cdot h$. <br> 16: for $i \leftarrow 1$ to $c_2$ do <br> 17:     $f \leftarrow f^2 \cdot s[j++]$. <br> 18: end for <br> 19: Output $f^{(p^k-1)/r}$ |

Fig. 22

Algorithm 5   Tate pairing value for group order $r_2$ (without storage)

Input:   $P \ (\in E(\mathbb{F}_p))$, $Q \ (\in \phi(E'(\mathbb{F}_{p^{k/2}})) \subset E(\mathbb{F}_{p^k}))$.
Output:  $e(P, Q)$.

1: $A \leftarrow P$, $f_1 \leftarrow 1$, $f_2 \leftarrow 1$, $j \leftarrow 1$.
2: for $i \leftarrow 1$ to $c_1 - c_2$ do
3: $\quad f_1 \leftarrow f_1^2 \cdot g(A, A, Q, 0)$.
4: $\quad f_2 \leftarrow f_2^2 \cdot s[0]$.
5: end for
6: $f_1 \leftarrow f_1 \cdot g(A, P, Q, 0)$.
7: $f_2 \leftarrow f_2 \cdot s[0]$.
8: for $i \leftarrow 1$ to $c_2$ do
9: $\quad f_1 \leftarrow f_1^2 \cdot g(A, A, Q, 0)$.
10: $\quad f_2 \leftarrow f_2^2 \cdot s[0]$.
11: end for
12: $f_1 \leftarrow f_1 \cdot g(A, P, Q, -)$.
13: $f \leftarrow f_1^\lambda f_2$.
14: Output $f^{(p^k - 1)/r}$

Fig. 23

TABLE 2 : Parameters p and b for D=−3 and $\lambda = 2^{80} + 2^{16} (r_2 = \lambda^2 + \lambda + 1)$

| k | bit length of p | p | b |
|---|---|---|---|
| 4 | 338 | 8749689943823846291322799712414549003542995649430834215621577291614345545887142157023424871887343742 49 | 11 |
| 6 | 333 | 2848196313264805534819210603154611427115990784408659871915307904817085669102615769389218988351336 4229 | 1 |
| 8 | 336 | 1653105027960914201970422747531601645734705643768111039328502818917091039903437400150089750595697 94877 | 2 |

Fig. 24

TABLE 3 : FACTORIZATION OF $r_2-1$ (D=-3)

| $c_1$ | $c_2$ | FACTORIZATION OF $r_2-1$ |
|---|---|---|
| 80 | 16 | $2^{16} \cdot 3 \cdot 7 \cdot 11 \cdot 13 \cdot C_1$ |
| 80 | 29 | $2^{29} \cdot 3^2 \cdot 17 \cdot C_2$ |
| 80 | 76 | $2^{76} \cdot 3 \cdot 7 \cdot 11 \cdot 13 \cdot 17 \cdot C_3$ |
| 96 | 83 | $2^{83} \cdot 3 \cdot 5 \cdot C_4$ |
| 128 | 22 | $2^{22} \cdot 3 \cdot 5 \cdot 7 \cdot C_5$ |
| 128 | 25 | $2^{25} \cdot 3 \cdot 7 \cdot C_6$ |
| 128 | 58 | $2^{58} \cdot 3 \cdot 5^2 \cdot 7 \cdot 29 \cdot 41 \cdot C_7$ |
| 128 | 64 | $2^{64} \cdot 3 \cdot 7 \cdot 13 \cdot C_8$ |
| 128 | 82 | $2^{82} \cdot 3 \cdot 5 \cdot 7 \cdot 23 \cdot C_9$ |
| 128 | 84 | $2^{84} \cdot 3 \cdot 17 \cdot C_{10}$ |
| 128 | 115 | $2^{115} \cdot 3 \cdot 5^2 \cdot 7^2 \cdot 19 \cdot 23 \cdot C_{11}$ |

Fig. 25

TABLE 3 : FACTORIZATION OF $r_3-1$ (D=-3)

| $c_1$ | $c_2$ | $c_3$ | FACTORIZATION OF $r_3-1$ |
|---|---|---|---|
| 112 | 47 | 3 | $2^4 \cdot 3^6 \cdot 5 \cdot 7 \cdot 13 \cdot C_{12}$ |
| 112 | 52 | 22 | $2^{23} \cdot 3^4 \cdot 5^2 \cdot 7 \cdot 13 \cdot 41 \cdot C_{13}$ |
| 112 | 70 | 43 | $2^{44} \cdot 3^2 \cdot 5 \cdot 7 \cdot C_{14}$ |
| 112 | 80 | 45 | $2^{46} \cdot 3^4 \cdot 5 \cdot 7 \cdot 37 \cdot C_{15}$ |
| 112 | 82 | 19 | $2^{20} \cdot 3^2 \cdot 5^3 \cdot 7 \cdot 37 \cdot 41 \cdot C_{16}$ |
| 112 | 83 | 3 | $2^4 \cdot 3^3 \cdot 5 \cdot 7 \cdot 13 \cdot C_{17}$ |
| 112 | 92 | 38 | $2^{39} \cdot 3^3 \cdot 5 \cdot 7 \cdot C_{18}$ |
| 112 | 104 | 57 | $2^{58} \cdot 3^3 \cdot 5 \cdot 7 \cdot 11 \cdot 19 \cdot C_{19}$ |
| 112 | 104 | 62 | $2^{63} \cdot 3^2 \cdot 5 \cdot 7 \cdot C_{20}$ |
| 112 | 111 | 31 | $2^{32} \cdot 3^2 \cdot 5 \cdot 7 \cdot C_{21}$ |

APPARATUS FOR GENERATING ELLIPTIC CURVE CRYPTOGRAPHIC PARAMETER, APPARATUS FOR PROCESSING ELLIPTIC CURVE CRYPTOGRAPH, PROGRAM FOR GENERATING ELLIPTIC CURVE CRYPTOGRAPHIC PARAMETER, AND PROGRAM FOR PROCESSING ELLIPTIC CYPTOGRAPH

TECHNICAL FIELD

The present invention relates to a cryptographic processor employing an elliptic curve pairing, and to a generator for generating an elliptic curve cryptographic parameter which is set in the cryptographic processor employing the elliptic curve pairing. More particularly, the present invention relates to an apparatus for generating an elliptic curve cryptographic parameter that speeds up the operation of the elliptic cryptographic pairing and that is capable of easily changing the security level of cryptography based on the elliptic curve pairing.

BACKGROUND ART

In recent years, a cryptosystem based on pairing on the elliptic curve has been brought to attention (e.g., Nonpatent Reference 3). According to this cryptosystem, a user's public key can be generated based on ID (Identifier) information etc., and thereby it is not necessary to guarantee the validity of the public key.

Meanwhile, when performing a pairing computation on an elliptic curve by using a processing device, such as a computer, it is a problem how to quickly perform the pairing computation in a large amount of computation by using a processing device with low computational capacity. As a method for solving this problem, Nonpatent References 1 and 2 are proposed.

The security of these encryption technologies is based on that it takes enormous time for the computational capacity of existing processing devices, such as a computer, to break the encryption.

[Nonpatent Reference 1]: M. Scott, "Faster pairings using an elliptic curve endomorphism", to appear in Indocrypt 2005, Springer Verlag (2005)

[Nonpatent Reference 2]: M. Scott, "Scaling security in pairing-based protocols", available at http://eprint.iacr.org, 2005

[Nonpatent Reference 3]: Sakai, Ohgishi, and Kasahara, "Cryptosystems based on pairing over the elliptic curve", The 2001 Symposium on cryptography and information security (SCIS 2001)

DISCLOSURE OF THE INVENTION

Problems to be Solved by the Invention

Conventionally, a high speed pairing on an elliptic curve is achieved by using a group order having a special form as a group order of an additive group composed of points on the elliptic curve. The bit number of a group order is one of the elements that define the security of the elliptic curve pairing-based cryptography. However, the computational capacity of the processing devices, such as a computer, is improving day by day, and thus the security of encryption may be threatened. Therefore, even when a group order form or a group order is fixed in order to speed up the pairing on an elliptic curve, there is a problem that the security level of encryption needs to be easily changed.

Means to Solve the Problems

An apparatus for generating an elliptic curve cryptographic parameter according to the present invention comprises:
  a storage device for storing information;
  an output device for outputting information;
  a processing device for performing computation;
  a prime number generation unit for generating a prime number r by using the processing device, and for storing the prime number r generated, in the storage device;
  a group order suitability judgment unit for reading the prime number r generated by the prime number generation unit from the storage device, and for judging whether the prime number r is suitable as a group order of an additive group E(K) composed of points on an elliptic curve E over a finite field K=GF(q) in elliptic curve cryptographic processing, by using the processing device; and
  a group order candidate output unit, when the group order suitability judgment unit judges that the prime number r is suitable as the group order of the additive group E(K) composed of points on the elliptic curve E over the finite field K in elliptic curve cryptographic processing, for reading the prime number r generated by the prime number generation unit from the storage device, and for outputting the prime number r as a group order candidate by using the output device.

The group order suitability judgment unit
  reads the prime number r generated by the prime number generation unit from the storage device, calculates a natural number r−1 by subtracting 1 from the prime number r by using the processing device, and stores the natural number r−1 calculated, in the storage device;
  generates a natural number k in a predetermined range by using the processing device, and stores the natural number k generated, in the storage device;
  reads the natural number r−1 calculated and the natural number k generated, from the storage device, and judges whether the natural number k is a divisor of the natural number r−1 by using the processing device; and
  when judging that each of the natural number k in the predetermined range is a divisor of the natural number r−1, judges that the prime number r is suitable as the group order of the additive group E(K) composed of points on the elliptic curve E over the finite field K in elliptic curve cryptographic processing, by using the processing device.

The group order suitability judgment unit generates the natural number k in a range of even numbers equal to or greater than 2 and less than or equal to a predetermined threshold $2k_{max}$ by using the processing device, and stores the natural number k generated, in the storage device.

The prime number generation unit generates the prime number r, a Hamming weight of the primer number r being less than or equal to a predetermined value, by using the processing device, and stores the prime number r generated, in the storage device.

The prime number generation unit
  generates a natural number λ by using the processing device, and stores the natural number λ generated, in the storage device;
  reads the natural number λ generated, from the storage device, calculates an integer $f(\lambda)=a\lambda^2+b\lambda+c$ by substituting the natural number λ into a predetermined quadratic polynomial f(x)=ax²+bx+c (where, a, b, and c being integers and x being a variable) by using the processing device, and stores the integer f(λ) calculated, in the storage device;

reads the integer f(λ) calculated, from the storage device, calculates a prime factor r of the integer f(λ) by using the processing device, and stores the prime factor r calculated, in the storage device; and reads the prime factor r calculated, from the storage device, and outputs the prime factor r as the prime number r by using the output-device.

The prime number generation unit reads the integer f(λ) calculated, and the prime factor r calculated, from the storage device, calculates a quotient n=f(λ)/r by dividing the integer f(λ) by the prime factor r by using the processing device, and stores the quotient n calculated, in the storage device;

reads the quotient n calculated, from the storage device, and judges whether the quotient n is equal to less than a predetermined integer by using the processing device; and when judging that the quotient n is equal to less than a predetermined integer, reads the prime factor r calculated, from the storage device, and outputs the prime factor r as the prime number r by using the output device.

The prime number generation unit utilizes $x^2+x+1$ or $x^2+1$ as the predetermined quadratic polynomial f(x) to calculate the integer f(λ) by using the processing device, and stores the integer f(λ) calculated, in the storage device.

The prime number generation unit generates the natural number λ, a Hamming weight of the natural number being less than or equal to a predetermined value, by using the processing device, and stores the natural number λ generated, in the storage device.

The prime number generation unit generates the prime number r by using the processing device, the prime number r being settable to an apparatus for processing elliptic curve cryptograph as a group order, the apparatus for processing elliptic curve cryptograph performing elliptic curve pairing computation at high speed by being specialized in a group order having a specific form, and stores the prime number r generated, in the storage device.

The prime number generation unit generates the prime number r by using the processing device, the prime number r being settable to an apparatus for processing elliptic curve cryptograph as a group order, the apparatus for processing elliptic curve cryptograph performing elliptic curve pairing computation at high speed by utilizing an endomorphism mapping φ on the elliptic curve E over the finite field K, and stores the prime number r generated, in the storage device.

The prime number generation unit generates the prime number r by using the processing device, the prime number r being settable to an apparatus for processing elliptic curve cryptograph as a group order, the apparatus for processing elliptic curve cryptograph performing elliptic curve pairing computation at high speed by utilizing an efficiently computable endomorphism mapping as the endomorphism mapping φ, and stores the prime number r generated, in the storage device.

The prime number generation unit generates the prime number r by using the processing device, the prime number r being settable to an apparatus for processing elliptic curve cryptograph as a group order, the apparatus for processing elliptic curve cryptograph performing elliptic curve pairing computation at high speed by utilizing an endomorphism mapping, an absolute value of a discriminant D of a ring generated by the endomorphism mapping being smaller than a predetermined value, as the endomorphism mapping φ, and stores the prime number r generated, in the storage device.

The prime number generation unit generates the prime number r by using the processing device, the prime number r being settable to an apparatus for processing elliptic curve cryptograph as a group order, the apparatus for processing elliptic curve cryptograph performing elliptic curve pairing computation at high speed by using $Y^2=X^3+b$ as the elliptic curve E and utilizing (x, y)→(βx, y) (β being a primitive third root of unity in the finite field K) as the endomorphism mapping φ, and stores the prime number r generated, in the storage device.

The prime number generation unit generates the prime number r by using the processing device, the prime number r being settable to an apparatus for processing elliptic curve cryptograph as a group order, the apparatus for processing elliptic curve cryptograph performing elliptic curve pairing computation at high speed by using $Y^2=X^3+aX$ as the elliptic curve E and utilizing (x, y)→(−x, iy) (i being a primitive fourth root of unity in the finite field K) as the endomorphism mapping φ, and stores the prime number r generated, in the storage device.

The group order candidate output unit outputs the prime number r as the group order candidate by using the output device, the prime number r having a same form as a form of the group order, the apparatus for processing elliptic curve cryptograph specializing in the form of the group order, when an extension degree k of an extension field $K'=GF(q^k)$ of the finite field K in elliptic curve pairing computation is changed in a predetermined range.

The group order candidate output unit outputs the prime number r as a group order candidate by using the output device, the prime number r being settable as a same group order when an extension degree k of an extension field $K'=GF(q^k)$ of the finite field K in elliptic curve pairing computation is changed in a predetermined range.

The group order candidate output unit outputs the prime number r as the group order candidate by using the output device, the prime number r being settable as a same group order when an extension degree k of an extension field $K'=GF(q^k)$ of the finite field K in elliptic curve pairing computation is changed in a range of even numbers equal to or greater than 2 and less than or equal to a predetermined threshold $2k_{max}$.

The apparatus for generating an elliptic curve cryptographic parameter further comprises:

an input device for inputting information;

an extension degree input unit for inputting an extension degree k of an extension field $K'=GF(q^k)$ of the finite field K in elliptic curve pairing computation by using the input device, and for storing the extension degree k input, in the storage device;

a group order input unit for inputting the prime number r selected from the group order candidate output by the group order candidate output unit, as the group order r, by using the input device, and stores the group order r input, in the storage device;

a finite field order determination unit for reading the group order r input by the group order input unit and the extension degree k input by the extension degree input unit, from the storage device, for determining an order q of the finite field K in the elliptic curve cryptographic processing, based on the group order r and the extension degree k by using the processing device, and for storing the order q of the finite field K determined, in the storage device; and a finite field order output unit for reading the order q of the finite field K determined from the storage device, and for outputting the order q of the finite field K by using the output device.

The finite field order determination unit determines the order q settable to an apparatus for processing elliptic curve cryptograph as an order of the finite field K by using the processing device, the apparatus for processing elliptic curve cryptograph performing elliptic curve pairing computation at high speed by extending the finite field K to the extension field K' by using a predetermined irreducible polynomial pol(x), and stores the order q of the finite field K determined, in the storage device.

The finite field order determination unit determines the order q settable to an apparatus for processing elliptic curve cryptograph as an order of the finite field K by using the processing device, the apparatus for processing elliptic curve cryptograph performing elliptic curve pairing computation at high speed by extending the finite field K to the extension field K' by using pol(x)=$x^k$-γ (where, x being a variable in the finite field K and γ being an element of a multiplicative group K* of the finite field K) as an irreducible polynomial pol(x), and stores the order q of the finite field K determined, in the storage device.

The finite field order determination unit
generates a candidate q for the order settable as the order of the finite field K, by using the processing device, and stores the candidate q generated for the order, in the storage device;
reads the extension degree k input by the extension degree input unit and the candidate q of the order from the storage device, and judges, using the processing device, whether an element γ of the finite field K satisfying all of three conditions below exists:
(1) all prime factors of the extension degree k being divisors of an order L of the element y of the finite field K,
(2) none of prime factors of the extension degree k being divisors of (q−1)/L,
(3) when the extension degree k being in multiples of 4, q−1 also being in multiples of 4; and
when judging that the element y of the finite field K satisfying all of the three conditions exists by using the processing device, judges, using the processing device, that the candidate q calculated of the order is settable as the order of the finite field K.

The finite field order determination unit
generates a candidate q for the order settable as the order of the finite field K, by using the processing device, and stores the candidate q generated for the order, in the storage device;
reads the extension degree k from the storage device, calculates all prime factors π by factorizing the extension degree k into prime factors by using the processing device, and stores all the prime factors π calculated, in the storage device;
reads all the prime factors π calculated from the storage device, calculates a product Π of all the prime factors π by using the processing device, and stores the product Π calculated, in the storage device;
reads the extension degree k from the storage device, judges whether the extension degree k is in multiples of 4 by using the processing device, when judging that the extension degree k is in multiples of 4, reads the product Π calculated from the storage device, calculates a product 2Π by doubling the product Π by using the processing device, and stores the product 2Π calculated, in the storage device, as a new product Π;

reads the candidate q generated for the order from the storage device, calculates an integer q−1 by subtracting 1 from the candidate q for the order by using the processing device, and stores the integer q−1 calculated, in the storage device;
reads the integer q−1 calculated and the product Π calculated from the storage device, and judges, using the processing device, whether the integer q−1 is in multiples of the product Π;
when judging that the integer q−1 is in multiples of the product Π, reads the integer q−1 calculated and the product Π calculated from the storage device, calculates a quotient N=(q−1)/L by dividing the integer q−1 by the product Π by using the processing device, and stores the quotient N calculated, in the storage device;
reads the quotient N calculated and all the prime factors π calculated, from the storage device, and judges, using the processing device, whether the quotient N is in multiples of the prime factor π; and
when judging that, with respect to all the prime factors π, the quotient N is not in multiples of the prime factor π, judges, using the processing device, that the candidate q generated for the order is settable as the order of the finite field K.

An apparatus for processing elliptic curve cryptograph according to the present invention comprises:
an input device for inputting information;
a storage device for storing information;
a processing device for performing computation;
a finite field order input unit for inputting an order q of a finite field K=GF(q) in elliptic curve cryptographic processing by using the input device, and for storing the order q input, in the storage device;
a group order input unit for inputting a group order r by using the input device and for storing the group order r input, in the storage device, the group order r being a group order of an additive group E(K) composed of points on an elliptic curve E over a finite field K=GF(q) in elliptic curve cryptographic processing and having a specific form; and
an elliptic curve pairing processing unit for reading the order q input by the finite field order input unit and the group order r input by the group order input unit from the storage device, and for performing elliptic curve pairing computation, the elliptic curve pairing computation being performed at high speed by being specialized in the group order having the specific form, based on the order q and the group order r input by the group order input unit, by using the processing device.

The elliptic curve pairing processing unit performs elliptic curve pairing computation by using the processing device, the elliptic curve pairing computation being performed at high speed by utilizing an endomorphism mapping φ on the elliptic curve E over the finite field K.

The elliptic curve pairing processing unit performs elliptic curve pairing computation by using the processing device, the elliptic curve pairing computation being performed at high speed by utilizing an efficiently computable endomorphism mapping as the endomorphism mapping φ.

The elliptic curve pairing processing unit performs elliptic curve pairing computation by using the processing device, the elliptic curve pairing computation being performed at high speed by utilizing an endomorphism mapping, an absolute value of a discriminant D of a ring generated by the endomorphism mapping being smaller than a predetermined value, as the endomorphism mapping φ.

The elliptic curve pairing processing unit performs elliptic curve pairing computation by using the processing device, the elliptic curve pairing computation being performed at high speed by using $Y^2=X^3+b$ as the elliptic curve E and utilizing $(x, y) \to (\beta x, y)$ ($\beta$ being a primitive third root of unity in the finite field K) as the endomorphism mapping $\phi$.

The elliptic curve pairing processing unit performs elliptic curve pairing computation by using the processing device, the elliptic curve pairing computation being performed at high speed by using $Y^2=X^3+aX$ as the elliptic curve E and utilizing $(x, y) \to (-x, iy)$ (i being a primitive fourth root of unity in the finite field K) as the endomorphism mapping $\phi$.

An apparatus for processing elliptic curve cryptograph according to the present invention comprises:
  an input device for inputting information;
  a storage device for storing information;
  a processing device for performing computation;
  a finite field order input unit for inputting an order q of a finite field K=GF(q) in elliptic curve cryptographic processing by using the input device, and for storing the order q input, in the storage device; and
  an elliptic curve pairing processing unit for reading the order q input by the finite field order input unit from the storage device, and for performing elliptic curve pairing computation by using the processing device, based on the order q and a specific group order r determined in advance as a group order of an additive group E(K) composed of points on an elliptic curve E over the finite pair K=GF(q) in elliptic curve cryptographic processing, the elliptic curve pairing computation being performed at high speed by being specialized in the specific group order.

A program for generating an elliptic curve cryptographic parameter according to the present invention comprises a function for causing a computer including a storage device to store information, an output device to output information, and a processing device to perform computation, to operate as an apparatus for generating an elliptic curve cryptographic parameter, wherein the apparatus includes:
  a prime number generation unit for generating a prime number r by using the processing device, and for storing the prime number r generated, in the storage device;
  a group order suitability judgment unit for reading the prime number r generated by the prime number generation unit from the storage device, and for judging whether the prime number r is suitable as a group order of an additive group E(K) composed of points on an elliptic curve E over a finite field K=GF(q) in elliptic curve cryptographic processing, by using the processing device; and
  a group order candidate output unit, when the group order suitability judgment unit judges that the prime number r is suitable as the group order of the additive group E(K) composed of points on the elliptic curve E over the finite field K in elliptic curve cryptographic processing, for reading the prime number r generated by the prime number generation unit from the storage device, and for outputting the prime number r as a group order candidate by using the output device.

A program for processing elliptic curve cryptograph according to the present invention comprises a function for causing a computer including an input device to input information, a storage device to store information, and a processing device to perform computation, to operate as an apparatus for processing elliptic curve cryptograph, wherein the apparatus includes:
  a finite field order input unit for inputting an order q of a finite field K=GF(q) in elliptic curve cryptographic processing by using the input device, and for storing the order q input, in the storage device;
  a group order input unit for inputting a group order r by using the input device and for storing the group order r input, in the storage device, the group order r being a group order of an additive group E(K) composed of points on an elliptic curve E over a finite field K=GF(q) in elliptic curve cryptographic processing and having a specific form; and
  an elliptic curve pairing processing unit for reading the order q input by the finite field order input unit and the group order r input by the group order input unit from the storage device, and for performing elliptic curve pairing computation, the elliptic curve pairing computation being performed at high speed by being specialized in the group order having the specific form, based on the order q and the group order r by using the processing device.

EFFECTS OF THE INVENTION

An apparatus for generating an elliptic curve cryptographic parameter according to the present invention comprises:
  a storage device for storing information;
  an output device for outputting information;
  a processing device for performing computation;
  a prime number generation unit for generating a prime number r by using the processing device, and for storing the prime number r generated, in the storage device;
  a group order suitability judgment unit for reading the prime number r generated by the prime number generation unit from the storage device, and for judging whether the prime number r is suitable as a group order of an additive group E(K) composed of points on an elliptic curve E over a finite field K=GF(q) in elliptic curve cryptographic processing, by using the processing device; and
  a group order candidate output unit, when the group order suitability judgment unit judges that the prime number r is suitable as the group order of the additive group E(K) composed of points on the elliptic curve E over the finite field K in elliptic curve cryptographic processing, for reading the prime number r generated by the prime number generation unit from the storage device, and for outputting the prime number r as a group order candidate by using the output device.

Accordingly, there is an effect of obtaining a candidate of a group order that can easily change the security level of elliptic curve cryptography.

PREFERRED EMBODIMENTS FOR CARRYING OUT THE INVENTION

Embodiment 1

Embodiment 1 will be described with reference to FIGS. 1 to 11.

In the public key cryptograph communication system, each user is provided with a pair of a secret key x and a public key y, and the each user secretly holds the secret key x. The public key y is released to the public other than the user himself. When a user B wants to send data to a user A secretly, the user B encrypts the data by using the public key y corresponding to the user A. This ciphertext can be decrypted only by the user A that knows the secret key x.

In this case, the user B needs to verify whether the public key y is the one corresponding to the user A. That is, it is necessary to guarantee that the public key y is truly released by the user B. If not guaranteed, there may be a possibility of electronic eavesdropping; that is, a malicious third party releases a public key y' corresponding to his own secret key x' while pretending that the public key y' belongs to the user B. Then, the malicious third party can receive the ciphertext which was encrypted using the public key y' by the user A who does not know the state, and can decrypt it by using his own secret key x'.

Therefore, conventionally, guaranteeing a corresponding relation between the user and the public key is performed by using an infrastructure called a PKI (Public Key Infrastructure).

On the other hand, an elliptic curve cryptosystem 800 of the present Embodiment generates a secret key and a public key based on ID information released by the user. In such an ID-based public key cryptosystem, a public key generated based on an identifier (ID), such as a name and an equipment number, can be used. Therefore, it is not necessary to verify whether the public key really belongs to the user or not.

FIG. 1 shows a system configuration of an example of the whole configuration of the elliptic curve cryptosystem 800 based on released ID information according to the present Embodiment. A center 300 generates and releases an elliptic curve cryptographic parameter 510. Elliptic curve cryptographic processors 200a and 200b acquire and store the elliptic curve cryptographic parameter 510 released by the center 300. The elliptic curve cryptographic processor 200b releases its own ID (Identifier) information 521. The center 300 acquires the ID information 521 released by the elliptic curve cryptographic processor 200b, and generates a secret key 531 of the elliptic curve cryptographic processor 200b based on the acquired ID information 521. The center 300 secretly transmits the generated secret key 531 to the elliptic curve cryptographic processor 200b. The elliptic curve cryptographic processor 200b receives and stores the secret key 531 transmitted by the center 300.

The elliptic curve cryptographic processor 200a acquires the ID information 521 released by the elliptic curve cryptographic processor 200b, and calculates the public key of the elliptic curve cryptographic processor 200b, based on the stored elliptic curve cryptographic parameter. The elliptic curve cryptographic processor 200a encrypts a plain text 1 to be transmitted to the elliptic curve cryptographic processor 200b, using the calculated public key, and transmits a ciphertext 651 to the elliptic curve cryptographic processor 200b. The elliptic curve cryptographic processor 200b receives the ciphertext 651 transmitted by the elliptic curve cryptographic processor 200b and decrypts it to acquire the original plain text 601 by using the stored secret key 531.

Thus, in the elliptic curve cryptosystem based on released ID information, since the secret key is also generated based on user's ID information, it is necessary to prevent a third party from generating the secret key. Therefore, it is structured so that an elliptic curve pairing may prevent the third party from generating a secret key (Nonpatent Reference 3, etc.).

An elliptic curve cryptographic parameter generator 100 and an elliptic curve cryptographic processor 200 described in the present Embodiment are used for the elliptic curve cryptosystem based on the elliptic curve pairing, and as an example, there will be explained an elliptic curve cryptosystem based on released ID information. They can be applied not only to the elliptic curve cryptosystem based on released ID information but also to other elliptic curve cryptosystem as long as it is based on the elliptic curve pairing.

The elliptic curve cryptosystem using the elliptic curve pairing is based on that it is almost impossible for a third party, using the capacity of the existing computer, to know secret information, such as a secret key, because an enormous computation amount is needed to solve a discrete logarithm problem.

The discrete logarithm problem herein is to obtain m that satisfies $g_1 = mg_2$ with respect to two elements $g_1$ and $g_2$ of an algebraic group (G, +) (whose addition is defined, and which is a group with respect to addition. It will be hereinafter called an algebraic group G.). Regarding $g_1 = mg_2$, m is a natural number, and $mg_2$ represents the result of adding $g_2$ m times. When the number of elements ("order" or called a "group order" to be distinguished from an order of the element) of the algebraic group G is large, it is known that many of discrete logarithm problems are extremely difficult to be solved in the matter of the computation amount. By utilizing this fact, therefore, it is possible to design public key cryptosystems.

As to the elliptic curve cryptosystem based on the elliptic curve pairing, discrete logarithm problems of two types are related. One is a discrete logarithm problem in the case of thinking an additive group E(K) composed of points on the elliptic curve E over the finite field K, as the algebraic group G. The other is a discrete logarithm problem in the case of thinking a multiplicative group K'* made of pairing e(P, Q) obtained by mapping a direct product of two points P and Q on the elliptic curve E over the finite field K to the finite field K', as the algebraic group G.

The elliptic curve pairing indicates the value e(P, Q) calculated with respect to the two points P and Q on the elliptic curve E over the finite field K. In the elliptic curve cryptosystem based on the elliptic curve pairing, pairing with bilinearity is used. The bilinearity of pairing is to satisfy $e(aP, bQ) = e(P, Q)^{ab}$ with respect to integers a and b (where aP represents a point obtained by adding the point P a times in the additive group E(K), bQ represents a point obtained by adding the point Q b times in the additive group E(K), e(•, •) represents a paring of a value belonging to the multiplicative group K'* of the finite field K', and $e(•, •)^{ab}$ represents the result of multiplying e(•, •) a×b times in the multiplicative group K'*). As the pairing which has such characteristics described above, the Weil pairing and the Tate pairing are known.

Many of the ID-based public key cryptography using pairing is based on the difficulty of Bilinear Diffie-Hellman problem. The Bilinear Diffie-Hellman problem is to calculate $e(P, Q)^{abc}$ when aP, bP, and cQ, being the elements of the additive group E(K), are known (where a, b, and c are integers, and P and Q are points on the elliptic curve E over the finite field K). For retaining the difficulty of the Bilinear Diffie-Hellman problem, it is necessary to secure the difficulty of the elliptic curve discrete logarithm problem and the difficulty of the discrete logarithm problem of the finite field multiplicative group.

The difficulty of the elliptic curve discrete logarithm problem is related to the number of elements (group order) r of the additive group E(K) composed of points on the elliptic curve E over the finite field K (and a point O at infinity). The longer the bit length of r is, the more difficult it becomes to solve the elliptic curve discrete logarithm problem.

The difficulty of the discrete problem of the finite field multiplicative group is related to the number of elements (order) $q^k$ of the finite field K'. The longer the bit length of $q^k$ is, the more difficult it becomes to solve the discrete problem of the finite field multiplicative group. In this case, q is the number of elements (order) of the finite field K, and k is a natural number.

Therefore, for securing the difficulty of the Bilinear Diffie-Hellman problem, it is necessary to set parameters so that the bit length of the group order r of the additive group E(K) and the bit length of the order $q^k$ of the finite field K' may become suitable length.

The Weil pairing and the Tate pairing can be calculated not only with respect to an elliptic curve but also with respect to a hyper elliptic curve. Moreover, they can also be calculated as to other general algebraic curves. Although the case of calculating the Weil pairing and Tate pairing on an elliptic curve will be explained in the present Embodiment, it is only an example, and also applicable to a cryptosystem based on pairing on a hyper elliptic curve or other general algebraic curves.

The finite field (or called a Galois Field) of the order q is denoted by GF(q). The number of elements (order) q of the finite field GF(q) is $q=p^n$ (p being a prime number and n being a natural number).

When n=1, that is when q is equal to the prime number p, it can be considered that the finite field GF(p) is a set of integers from 0 to p−1.

Addition in the finite field GF(p) can be calculated by applying addition of ordinary integers. However, when a calculation result is greater than p, a remainder divided by p is regarded as the calculation result. That is, addition of an element a and an element b in the finite field GF(p) can be obtained by calculating (a+b)mod p (where mod represents a modulus) using a processing device, such as a computer.

Subtraction in the finite field GF(p) is defined in terms of adding an additive inverse. The additive inverse herein means an element which becomes an additive identity (0) when added. Expressing the inverse element of the element a as −a, it is a+(−a)=0(mod p), thus −a=p−a. Therefore, subtracting the element b from the element a in the finite field GF(p) can be obtained by calculating (a+p−b)mod q (or more simply, (a−b)mod p) using a processing device, such as a computer.

Multiplication in the finite field GF(p) is also calculated by applying multiplication of ordinary integers. Similarly to the case of addition, when a calculation result is greater than p, a remainder divided by p is used as the calculation result. That is, multiplication of the element a and the element b in the finite field GF(p) can be obtained by calculating (a×b)mod p using a processing device, such as a computer.

Division in the finite field GF(p) is defined in terms of multiplying a multiplicative inverse. The multiplicative inverse herein, similarly to the case of addition, means an element which becomes a multiplicative identity (1) when multiplied. Defining the inverse element of the element a to be $a^{-1}$, it is $a \times a^{-1}=1 \pmod p$. For example, when q=5, the inverse element of 2 is 3 (2×3=6 mod 5=1), and the inverse element of 4 is 4 (4×4=16 mod 5=1). Therefore, dividing the element a by the element b in the finite field GF(p) can be obtained by calculating $(a \times b^{-1})$mod p by using a processing device, such as a computer.

With respect to each of elements other than 0 in the finite field GF(q), a multiplicative inverse certainly exists (because of the definition of the finite field), and since the number of elements in the finite field GF(q) is limited, the inverse element can be obtained by calculation of finite times.

When n≧2, i.e., when q is obtained by exponentiating a prime number p, it is considered that the finite field GF($p^n$) is a set of (n−1)th degree polynomial $f(x)=a_{n-1}x^{n-1}+a_{n-2}x^{n-2}+\ldots+a_1x+a_0$ (x being a variable, $a_i$ being an integer from 0 to p−1, and i being an integer from 0 to n−1). In the case of realizing this in a computer, elements of the finite field GF($p^n$) can be realized, for example, by storing a coefficient $a_i$ (i being an integer from 0 to n−1) as a[n] being an array of n integers.

Addition in the finite field GF($p^n$)≧(n≧2) is calculated by using addition of ordinary polynomial equations. That is, addition of an element $f(x)=\Sigma a_i x^i$ (i being an integer from 0 to n−1) and an element $g(x)=\Sigma b_i x^i$ (i being an integer from 0 to n−1) in the finite field GF($p^n$) can be obtained by calculating $\Sigma a_i x^i + \Sigma b_i x^i = \Sigma(a_i+b_i)x^i$. In addition, when $a_i+b_i$ is greater than p, a remainder divided by p is regarded as a calculation result like the case of n=1.

In the case of realizing this in a computer, since the elements of the finite field GF($p^n$) are stored in the storage device as a[n] being an array of n integers, it is possible to calculate addition in the finite field GF($p^n$) using a processing device, such as a computer, by adding the i-th (i being an integer from 0 to n−1) element a[i] of the array a[n] and the i-th element b[i] of an array b[n] (if necessary, by obtaining a remainder divided by p), and storing it in the storage device as the i-th element c[i] of a new array c[n].

Subtraction in the finite field GF($p^n$) (n≧2) is addition of an additive inverse like the case of n=1. In the case of realizing this in a computer, since the elements of the finite field GF($p^n$) are stored in the storage device as a[n] being an array of n integers, it is possible to calculate subtraction in the finite field GF($p^n$) using a processing device, such as a computer, by subtracting the i-th (i being an integer from 0 to n−1) element b[i] of an array b[n] from the i-th element a[i] of an array a[n] (if necessary, by obtaining a remainder divided by p), and storing it in the storage device as the i-th element c[i] of a new array c[n].

Multiplication in the finite field GF($p^n$) (n≧2) is calculated by using multiplication of ordinary polynomial equations. That is, multiplication of an element $f(x)=\Sigma a_i x^i$ (i being an integer from 0 to n−1) and an element $g(x)=\Sigma b_j x^j$ (j being an integer from 0 to n−1) in the finite field GF($p^n$) can be obtained by calculating $\Sigma a_i x^i \times \Sigma b_j x^j = \Sigma(a_i \times b^j)x^{(i+j)}$. In addition, when $a_i \times b_j$ is greater than p, a remainder divided by p is regarded as a calculation result like the case of n=1. This calculation result becomes the 2(n−1)th degree polynomial at the maximum. When the calculation result is a polynomial of n-th or greater than n-th degree, a remainder divided by an n-th degree irreducible polynomial pol(x) is obtained to be used as the calculation result.

The irreducible polynomial pol(x) is required to be a polynomial of the form of $pol(x)=\Sigma a_i x^i$ (where x is a variable, $a_i$ is an integer from 0 to p−1, i is an integer from 0 to n, and a≠0), and to be irreducible (that is, when substituting the element of the finite field GF($p^n$) into pol(x), no element satisfying pol(x)=0 exists).

Mathematically, it is known, as long as it is irreducible, no matter what irreducible polynomial pol(x) we choose, a finite field of the same type can be obtained. However, when realizing this in a computer, $pol(x)=x^n-\gamma$ ($\gamma(=a_0)$ being an integer from 0 to p−1) is used as an irreducible polynomial in many cases. This is because the computation of obtaining a remainder of dividing a result of multiplication by the irreducible polynomial pol(x) can be faster by using $pol(x)=x^n-\gamma$ as the irreducible polynomial.

That is, when realizing this in a computer, since the elements of the finite field GF($p^n$) are stored in the storage device as a[n] being an array of n integers, a product of the i-th (i being an integer from 0 to n−1) element a[i] of the array a[n] and the j-th (j being an integer from 0 to n−1) element b[j] of the array b[n] is calculated (if necessary, a remainder divided by p is obtained), and when i+j<n, is added to the (i+j)th element c[i+j] of a new array c[n] (the array c[n] needs to have been initialized with 0). When $i+j \geq n$, a product of $a[i] \times b[j]$ and $\gamma$ is further calculated (if necessary, a remainder divided by p is obtained) and is added to the $(i+j-n)$th element $c[i+j-n]$ of the array $c[n]$ (if necessary, a remainder divided by p is obtained). By virtue of this, it becomes possible to calculate multiplication in the finite field $GF(p^n)$ by using a processing device, such as a computer.

Division in the finite field $GF(p^n)$ ($n \geq 2$) is defined in terms of multiplying a multiplicative inverse like the case of n=1. For realizing this in a computer, it is necessary to calculate a multiplicative inverse of an element of the finite field $GF(p^n)$. Therefore, the computation amount of division is the largest and takes much time among the four arithmetic operations defined in the finite field $GF(p^n)$. With respect to each of elements other than 0 in the finite field $GF(q)$, a multiplicative inverse certainly exists (because of the definition of the finite field), and since the number of elements in the finite field $GF(q)$ is limited, the inverse element can be obtained by calculation of finite times. Accordingly, it is possible to calculate division in the finite field $GF(p^n)$ by using the processing device, such as a computer.

As described above, all of the four arithmetic operations defined in the finite field $GF(q)$ can be calculated using a processing device, such as a computer.

The elliptic curve E is a set of the points (X, Y) satisfying an equation denoted as $Y^2 = X^3 + aX + b$ (X and Y being variables, and a and b being constants). The elliptic curve E over the finite field $GF(q)$ is a set of the points (X, Y) satisfying the equation $Y^2 = X^3 + aX + b$ based on the four arithmetic operations that are defined in the finite field $GF(q)$ while defining X, Y, a, and b as elements of the finite field $GF(q)$. In this case, the order q of the finite field $GF(q)$ is $q = p^n$ (p being a prime number other than 2, and n being a natural number).

A set made by adding a point O at infinity to a set of points on the elliptic curve E over the finite field $K = GF(q)$ is denoted by $E(K)$, in which addition is defined. That is, computation of obtaining a point R being an element of $E(K)$ is defined based on the point P being also an element of $E(K)$ and a point Q being also an element of $E(K)$, which is called an addition on an elliptic curve.

The addition on an elliptic curve is defined as described below. The additive identity (zero element) on an elliptic curve is a point O at infinity. With respect to the point $P=(X, Y)$ being an element of $E(K)$, an additive inverse $-P$ on the elliptic curve is $-P=(X, -Y)$.

The addition $R=P+Q$ on the elliptic curve is calculated as follows. When $P \neq Q$, an intersection R' of a straight line 1 passing through the points P and Q and an elliptic curve E is calculated, and its inverse element $-R'$ is defined to be a sum $R=P+Q$ of the points P and Q. When $P=Q$, the point R is calculated by defining the tangent line of the elliptic curve E at the point P to be the straight line 1.

When the addition on an elliptic curve is defined as described above, $E(K)$ is an Abelian group with respect to addition. This will hereafter be called an additive group $E(K)$.

Although the addition on an elliptic curve is herein geometrically defined, by converting this definition into an algebraic one, it becomes possible to calculate the addition on the elliptic curve by using the four arithmetic operations defined in the finite field K.

For realizing this in a computer, elements of $E(K)$ are stored in the storage device as a pair (array having two factors) of an element X of the finite field K and an element Y of the finite field K. Since elements of a finite field $K = GF(p^n)$ are stored in the storage device as an array of n integers, elements of $E(K)$ are stored in the storage device as an array of $n \times 2 = 2n$ integers.

As described above, since the four arithmetic operations defined in the finite field K can be calculated using a processing device, such as a computer, it is also possible to calculate addition on an elliptic curve by using a processing device, such as a computer.

The public key encryption based on an additive group $E(GF(q))$ is called an elliptic cryptography (or an elliptic curve cryptography). Specifically, it is cryptographically important when the order (the number of elements) of the additive group $E(GF(q))$ can be divided by a large prime number r. In that case, pairing e(P, Q) of values in the finite field $GF(q^k)$ is defined with respect to the minimum k (k is a natural number) satisfying $r | q^k - 1$ (representing that $q^k - 1$ is divisible by r, namely, $q^k - 1$ is in multiples of r). The public key encryption using this pairing is called an elliptic pairing-based cryptography (or the elliptic curve pairing-based cryptography).

As described above, the longer the bit length of the order $q^k$ of the finite field $GF(q^k)$ is, the more difficult it generally becomes to solve the discrete logarithm problem of the finite field multiplicative group. Therefore, the risk of the encryption being broken becomes low.

On the other hand, if k is large, the amount of computation of the cryptographic operation (generating a key, encrypting a plain text, decrypting a ciphertext, etc.) increases. In particular, in ubiquitous society, since performing cryptographic operations even in an apparatus equipped with a computer with low computational capacity, such as an IC card, is needed, it is to be avoided to make k so large.

Thus, for using pairing for encryption, it is necessary for k to be a suitable size in order to realize balance between security and computational capacity. That is, it is required for a processing device which can be manufactured at a practical cost to perform cryptographic operations at a practical speed, and, it is required that, as a matter of practice, the risk of the encryption being broken by a third party is extremely low.

To select an elliptic curve to fulfill such conditions is an issue for realizing pairing-based cryptography that is different from the conventional elliptic curve parameter generation.

Security of encryption is secured by that the amount of computation for breaking the encryption is extremely large, so that it will take decades or centuries for the computational capacity of an existing processing device, such as a computer, to break encryption. However, as the computational capacity of a processing device, such as a computer, is improving day by day, there is a possibility of what is safe to the present becoming not-safe tomorrow.

Accordingly, the balance point between the security and the computational capacity also changes day by day. Therefore, it is desired to enable k to be easily changed when it becomes necessary to increase the security after setting k to be an appropriate amount.

In the conventional the elliptic cryptography, the main operation is to calculate a scalar multiple point aP (representing the result of adding the point P a times) with respect to an integer a and the point P, whereas in the elliptic pairing-based cryptography, to calculate a value of pairing e(P, Q) is also the main operation in addition to the conventional scalar multiple. Therefore, it is needed to calculate the value of pairing e(P, Q) at high speed.

FIG. 2 shows an example of appearance of the elliptic curve cryptographic processor 200 described in the present Embodiment. In FIG. 2, the elliptic curve cryptographic processor 200 includes hardware resources, such as a system unit 910, a display unit 901 having a display screen of CRT (Cathode Ray Tube) or LCD (Liquid Crystal), a keyboard (K/B) 902, a mouse 903, FDD (Flexible Disk Drive) 904, a compact disk drive (CDD) 905, a printer 906, and a scanner 907, which are connected through cables and signal lines.

The system unit 910, being a computer, is connected to a facsimile machine 932 and a telephone 931 through cables, and to the Internet 940 through a local area network (LAN) 942 and a gateway 941.

In ubiquitous society, there exists not only a computer-looking computer but also a computer built in IC card etc. It is acceptable for the elliptic curve cryptographic processor 200 to be such a computer. It is sufficient for the elliptic curve cryptographic processor 200 to include at least a processing device for performing computations, a storage device for storing information, and an input/output device for exchanging information with the outside.

FIG. 3 shows an example of hardware resources of the elliptic curve cryptographic processor 200 described in the present Embodiment. In FIG. 3, the elliptic curve cryptographic processor 200 includes a CPU 911 (also called a Central Processing Unit, central processing apparatus, processing device, or processor) which executes a program. The CPU 911 is connected through a bus 912 to a ROM 913, RAM 914, communication board 915, display unit 901, keyboard 902, mouse 903, FDD 904, CDD 905, printer 906, scanner 907, and magnetic disk drive 920, and controls these hardware devices. Instead of the magnetic disk drive 920, a storage device, such as an optical disk drive and a memory card read/write device may be used. The RAM 914 is an example of a volatile memory. Storage media, such as the ROM 913, FDD 904, CDD 905, and magnetic disk drive 920 are examples of a nonvolatile memory. These are examples of a storage device or a storage unit. The communication board 915, keyboard 902, scanner 907, FDD 904, etc. are examples of an input unit or an input device. The communication board 915, display unit 901, printer 906, etc. are examples of an output unit or an output device.

The communication board 915 is connected to the facsimile machine 932, telephone 931, LAN 942, etc. The communication board 915 may be connected not only to the LAN 942 but also to a WAN (Wide Area Network), such as the Internet 940 and ISDN. When connected to the WAN, such as the Internet 940 or ISDN, the gateway 941 becomes dispensable. In the magnetic disk drive 920, an operating system (OS) 921, a window system 922, a program group 923, and a file group 924 are stored. Programs of the program group 923 are executed by the CPU 911, operating system 921, and window system 922.

In the program group 923, a program for executing functions expressed by the word "unit" or "means" in the Embodiments stated below is stored. The program is read and executed by the CPU 911. In the file group 924, data, signal values, variable values, and parameters expressed by the words "judgment result of", "calculation result of", or "processing result of" in the Embodiments stated below are stored as each item of the "file" or "database".

Moreover, arrows in the flowchart described in Embodiments stated below mainly show inputting and outputting of data or signals. Data and signal values are recorded on recording media, such as a memory of the RAM 914, a flexible disk of the FDD 904, a compact disk of the CDD 905, a magnetic disk of the magnetic disk drive 920, other optical disk, a mini disk, and a DVD (Digital Versatile Disk). Moreover, data and signals are transmitted on line by the bus 912, a signal line, a cable, or other transmission medium.

Moreover, what is expressed by the word "unit" or "means" in Embodiments stated below may be executed by the firmware stored in the ROM 913. Alternatively, they may be implemented only by software, only by hardware or a combination of software and hardware, and alternatively by a combination with firmware. Firmware and software are stored as a program, in a recording medium, such as a magnetic disk, flexible disk, optical disk, compact disk, mini disk, and DVD. Programs are read and executed by the CPU 911. That is, a program makes a computer function as a "unit" or "means" described below, or alternatively, it makes a computer execute procedures of "unit" or "means" described below.

FIG. 4 is a configuration block diagram showing a configuration example of an internal block of the elliptic curve cryptographic processor 200 described in the present Embodiment.

The elliptic curve cryptographic processor 200 includes an elliptic curve cryptographic parameter input unit 210, an ID information input unit 221, a plain text input unit 222, a ciphertext input unit 223, a secret key input unit 224, a cryptographic processing unit 230, a public key calculation unit 241, a ciphertext generation unit 242, a ciphertext decryption unit 243, a ciphertext output unit 252, a plain text output unit 253, a secret key storage unit 294, etc.

The elliptic curve cryptographic parameter input unit 210 inputs a parameter necessary for calculating elliptic curve cryptography by using the input device, and stores the input parameter in a storage device. As the elliptic curve cryptographic parameters, there are an order q of a finite field $GF(q)$ to which values of coordinates X and Y of a point (X, Y) on an elliptic curve E belong, an extension degree k (or called an Embedding Degree) for defining an order $q^k$ of a finite field $GF(q^k)$ to which a value of pairing e(•, •) belongs, coefficients a and b of an elliptic curve $E:Y^2=X^3+aX+b$, a group order r of an additive group E(K.), etc.

The elliptic curve cryptographic parameter input unit 210 includes a finite field order input unit 211, an extension degree input unit 212, an elliptic curve coefficient input unit 213, a group order input unit 214, etc.

The finite field order input unit 211 inputs the order q of the finite field $GF(q)$ by using the input device. The order q is an integer (a prime number p or a value obtained by exponentiating the prime number p) whose bit length is 320 bits, for example. Therefore, a storage region of 40 bytes is required for storing the order q in the storage device. The finite field order input unit 211 stores the input order q of the finite field $GF(q)$ in the storage device.

The extension degree input unit 212 inputs an extension degree k by using the input device. The extension degree k is an integer from about 2 to about 20, for example. Therefore, if there is a storage region of 1 byte, it is enough for the extension degree k to be stored in the storage device. The extension degree input unit 212 stores the input extension degree k in the storage device.

In addition, as stated later, it is preferable for k to be an even number because computation of the pairing e (•, •) can be faster when the extension degree k is an even number.

The elliptic curve coefficient input unit 213 inputs coefficients a and b of an elliptic curve E by using the input device. Since the coefficients a and b are elements of the finite field $GF(q)$, they are integers from 0 to p−1 when q is the prime number p. Therefore, in order to store the coefficients a and b in the storage device, a storage region of 40 bytes, which is the same as the case of the order q, is required respectively. The elliptic curve coefficient input unit 213 stores the input coefficients a and b of the elliptic curve E in the storage device.

The group order input unit 214 inputs a group order r of an additive group E(K) by using the input device. The bit length of the group order r is less than or equal to the bit number of q. Therefore, if there is a storage region of 40 bytes, it is enough for the group order r to be stored in the storage device. The group order input unit 214 stores the input group order r in the storage device.

The ID information input unit 221 inputs ID information of the party to whom ciphertext is to be transmitted, by using the input device. An e-mail address, an employee number, an apparatus serial number, etc. can be the ID information. The ID information input unit 221 stores the input ID information in the storage device.

The public key calculation unit 241 reads the ID information input by the ID information input unit 221, from the storage device. The public key calculation unit 241 calculates a public key of the party to whom the ciphertext is to be transmitted, from the read ID information, based on an elliptic curve pairing-based cryptography algorithm. In this process, it is necessary to add a point on the elliptic curve E and compute the elliptic curve pairing. The public key calculation unit 241 performs such computation by calling the cryptographic processing unit 230. The public key calculation unit 241 stores the calculated public key in the storage device.

Using the input device, the plain text input unit 222 inputs data (plain text) which is to be transmitted to the party without seen by a third party. The plain text input unit 222 stores the input data in the storage device.

The ciphertext generation unit 242 reads the data input by the plain text input unit 222 and the public key calculated by the public key calculation unit 241, from the storage device. The ciphertext generation unit 242 generates a ciphertext from the read data and public key, based on the elliptic curve pairing-based cryptography algorithm. In this process, it is necessary to add a point on the elliptic curve E and compute the elliptic curve pairing. The ciphertext generation unit 242 also performs such computation by calling the cryptographic processing unit 230. The ciphertext generation unit 242 stores the generated ciphertext in the storage device.

As the data (plain text) used as the basis of the ciphertext, what is generated in the elliptic curve cryptographic processor 200 can also be used as well as what is input from outside. For example, it is acceptable to store data indicating the state of the elliptic curve cryptographic processor 200, data obtained by decrypting a ciphertext input from outside, etc. in the storage device, and to generate a ciphertext based on the stored data, by the ciphertext generation unit 242.

The ciphertext output unit 252 reads the ciphertext generated by the ciphertext generation unit 242, from the storage device. The ciphertext output unit 252 outputs the read ciphertext by using the output device. For example, the ciphertext is transmitted to a transmission party through the Internet. Alternatively, the ciphertext is transmitted to a transmission party or a relay device by using a wireless transmission device.

The secret key input unit 224 inputs the secret key of the elliptic curve cryptographic processor 200 by using the input device. This was generated by the center 300, based on the ID information on the elliptic curve cryptographic processor 200, and secretly transmitted to the elliptic curve cryptographic processor 200. The secret key input unit 224 stores the input secret key in the secret key storage unit 294.

The secret key storage unit 294 stores the secret key input by the secret key input unit 224, in the storage device. Since keeping the secret key so as not to be known by the third parties is needed, it is preferable for the storage device which is used by the secret key storage unit 294 to have a tamper-proof feature.

The ciphertext input unit 223 inputs the ciphertext which other elliptic curve cryptographic processor transmitted to the elliptic curve cryptographic processor 200, by using the input device. For example, it receives the ciphertext through the Internet, or alternatively, receives it by using a wireless receiving device. The ciphertext input unit 223 stores the input ciphertext in the storage device.

The ciphertext decryption unit 243 reads the ciphertext input by the ciphertext input unit 223 and the secret key stored by the secret key storage unit 294, from the storage device. The ciphertext decryption unit 243 performs decryption to obtain the original data (plain text) from the read ciphertext and secret key, based on the elliptic curve pairing-based cryptography algorithm. In this process, it is necessary to add a point on the elliptic curve E and compute the elliptic curve pairing. The ciphertext decryption unit 243 also performs such computation by calling the cryptographic processing unit 230. The ciphertext decryption unit 243 stores the decrypted data (plain text) in the storage device.

The plain text output unit 253 reads the data decrypted by the ciphertext decryption unit 243 from the storage device. The plain text output unit 253 outputs the decrypted data by using the output device. For example, a screen generated from the decrypted data is displayed on the display unit.

It is not necessarily needed to output the decrypted data (plain text) outside, and it may be used inside the elliptic curve cryptographic processor 200. For example, it is acceptable to interpret it as some sort of command (e.g., a command for changing the setting of the elliptic curve cryptographic parameter) to the elliptic curve cryptographic processor 200, and to operate based on it.

The cryptographic processing unit 230 performs computation necessary for a cryptographic operation based on the elliptic curve pairing-based cryptography algorithm, such as addition of the point on the elliptic curve E and computation of the elliptic curve pairing.

The cryptographic processing unit 230 includes a finite field processing unit 231, an elliptic curve processing unit 232, an elliptic curve pairing processing unit 233, etc.

The finite field processing unit 231 performs the four arithmetic operations, such as addition, subtraction, multiplication, and division, defined in the finite field $GF(q)$ or the finite field $GF(q^k)$, by using the processing device.

The elliptic curve processing unit 232 performs computation, such as an addition and a scalar multiple (that is, a calculation of adding the same point integer times) of the point on the elliptic curve E over the finite field $GF(q)$, by using the processing device. When performing these computations, if it is necessary to calculate the four arithmetic operations defined in the finite field, they can be performed by calling the finite field processing unit 231.

The elliptic curve pairing processing unit 233 performs computation, such as calculating a pairing value of two points on the elliptic curve E over the finite field $GF(q)$, by using the processing device.

When performing these computations, if it is necessary to add a point on the elliptic curve or calculate the four arithmetic operations defined in the finite field, they can be performed by calling the elliptic curve processing unit 232 or the finite field processing unit 231.

As described above, these computations can be performed by using a processing device, such as a computer.

FIG. 5 is a configuration block diagram showing a configuration example of the internal block of the elliptic curve pairing processing unit 233 described in the present Embodiment. The elliptic curve pairing processing unit 233 includes a point input unit 331, a first processing unit 332, an auxiliary processing unit 333, a second processing unit 334, an exponential processing unit 335, a pairing output unit 336, etc.

The point input unit 331 inputs points P and Q, to be calculated for pairing, on the elliptic curve over the finite field GF(q), from a block, such as the ciphertext generation unit 242, which is a target of calculating a value of pairing with the points P and Q. For example, in the case of realizing the point input unit 331 by a program, the points P and Q are input by receiving an array of integers indicating the points P and Q (alternatively, a pointer or a reference indicating the array), as an argument of a function or a subroutine. The point input unit 331 stores the input points P and Q in the storage device.

The first processing unit 332 reads the points P and Q input by the point input unit 331, from the storage device. Using the processing device, the first processing unit 332 performs the former part of the pairing computation based on the read points P and Q to obtain a halfway calculation result f. The halfway calculation result f is a value in the finite field $GF(q^k)$. The first processing unit 332 stores the obtained halfway calculation result f in the storage device.

The auxiliary processing unit 333 inputs three points on the elliptic curve over the finite field GF(q) and an integer i, from the first processing unit 332. The input three points herein are called as points A, B, and Q. The auxiliary processing unit 333 stores the points A, B, and Q, and the integer i in the storage device. The auxiliary processing unit 333 reads the input points A, B, and Q, and the integer i, from the storage device. Using the processing device, the auxiliary processing unit 333 calculates a value g necessary for the pairing computation of the first processing unit 332 and a value s necessary for the pairing computation of the second processing unit 334, based on the read points A, B, and Q. The g and s herein are values in $GF(q^k)$. The auxiliary processing unit 333 stores the calculated values g and s in the storage device. At this time, s is stored as the i-th element of the array of the element of the finite field $GF(q^k)$. The auxiliary processing unit 333 outputs the stored g to the first processing unit 332.

The second processing unit 334 reads the halfway calculation result f calculated by the first processing unit and the value s calculated by the auxiliary processing unit 333, from the storage device. Using the processing device, the second processing unit 334 performs the latter part of the pairing computation based on the read halfway calculation result f and the value s, to obtain a halfway calculation result f'. The halfway calculation result f' is a value in the finite field $GF(q^k)$ The second processing unit 334 stores the obtained halfway calculation result f' in the storage device.

The exponential processing unit 335 reads the halfway calculation result f' calculated by the second processing unit 334, from the storage device. The exponential processing unit 335 raises the halfway calculation result f' to the power of $(q^k-1)/r$ by using the processing device. Since $q^k-1$ is in multiples of r, this calculation indicates to raise f' to the power of an integer. Therefore, it can be calculated by multiplying f' finite times. The exponential processing unit 335 stores the calculation result in the storage device.

The pairing output unit 336 reads the calculation result calculated by the exponential processing unit 335, from the storage device. The pairing output unit 336 outputs the read calculation result to the block which called the elliptic curve pairing processing unit 233.

For reference, a computation method in which Tate pairing is not performed fast will be explained.

FIGS. 6 and 7 show flowcharts describing a flow example of computation processing for calculating a pairing value of Tate pairing by the computation method performed not at high speed. This computation processing uses an algorithm called a Miller algorithm. In this case, u denotes a bit length of the group order r of the additive group E(GF(q)). A binary expansion of r is denoted as $r_{u-1} \ldots r_0$ ($r_0$ being the lowest bit). That is, $r=\Sigma r_i 2^i$ (i being an integer from 0 to u−1, and $r_i$=0 or 1).

In S101, the elliptic curve pairing processing unit inputs the points P and Q on the elliptic curve E over the finite field $GF(q^k)$ It is presumed that the order of the point P is equal to the group order r of the additive group E(GF(q)). Thus, it is rP=O (when adding the point P r times, it becomes a point O at infinity (identity element of the additive group E(GF(q))). Since the finite field $GF(q^k)$ is an extension field of the finite field GF(q), points on the elliptic curve E over the finite field GF(q) are included in the points on the elliptic curve E over the finite field $GF(q^k)$ The elliptic curve pairing processing unit stores the input points P and Q in the storage device.

In S102, the elliptic curve pairing processing unit reads the coefficients a and b of the elliptic curve E and the group order r of the additive group E(GF(q)), from the storage device.

In S103, the elliptic curve pairing processing unit selects a point on the elliptic curve E over the finite field $GF(q^k)$ at random by using the processing device. The elliptic curve pairing processing unit allocates a storage region for storing a point S on the elliptic curve E over the finite field $GF(q^k)$, and stores the selected point in the storage device, as the point S.

In S104, the elliptic curve pairing processing unit calculates the sum of the points Q and S on the elliptic curve E over the finite field $GF(q^k)$ by using the processing device. The elliptic curve pairing processing unit allocates a storage region for storing a point Q' on the elliptic curve E over the finite field $GF(q^k)$, and stores the calculated sum of the points Q and S in the storage device, as the point Q'.

In S105, the elliptic curve pairing processing unit reads the point P on the elliptic curve E over the finite field $GF(q^k)$ from the storage device. The elliptic curve pairing processing unit allocates a storage region for storing a point A which is on the elliptic curve E over the finite field $GF(q^k)$, and stores the read point P in the storage device, as the point A.

In S106, the elliptic curve pairing processing unit allocates a storage region for storing a pairing value f which is in the finite field $GF(q^k)$, and stores a constant 1 in the finite field $GF(q^k)$ in the storage device, as the pairing value f.

In S107, the elliptic curve pairing processing unit allocates a storage region for storing an integer m and stores a bit length u of the group order r of the additive group E(GF(q)) in the storage device, as the integer m.

In S108, the elliptic curve pairing processing unit reads the point A from the storage device. Using the processing device, the elliptic curve pairing processing unit calculates an equation 1:cX+dY+e=0 of the tangent to the elliptic curve E at the point A (where, X and Y are variables having values in the finite field $GF(q^k)$, and c, d, and e are elements of the finite field $GF(q^k)$). Specifically, assuming that the point A is $A=(X_A, Y_A)$, since the equation 1 is $(3X_A^2+a)(X-X_A)-2Y_A(Y-Y_A)=0$, it can be transformed to $(3X_A^2+a)X-2Y_AY+(-3X_A^3+aX_A+2Y_A^2)=0$. Therefore, the elliptic curve pairing processing unit calculates $c=3X_A^2+a$, $d=-2Y_A$, and $e=-3X_A^3+aX_A+2Y_A^2$, by using the processing device. The elliptic curve pairing processing unit allocates a storage region for storing the elements c, d, and e of the finite field $GF(q^k)$, and stores the coefficients c, d, and e of the calculated equation 1 in the storage device.

In S109, the elliptic curve pairing processing unit reads the coefficients c, d, and e of the equation 1 calculated in S108, from the storage device. Using the processing device, the elliptic curve pairing processing unit calculates an intersection R' of the tangent to the elliptic curve E at the point A, which is represented by the equation 1, and the elliptic curve E. The elliptic curve pairing processing unit allocates a storage region for storing the point R' which is on the elliptic curve E over the finite field $GF(q^k)$, and stores the calculated intersection R' in the storage device.

In S110, the elliptic curve pairing processing unit reads the intersection R' calculated in S109, from the storage device. Using the processing device, the elliptic curve pairing processing unit calculates an equation $v: X-u=0$ of a straight line passing through the intersection R', wherein the value of X is constant (X is a variable having a value in the finite field $GF(q^k)$, and u is an element of the finite field $GF(q^k)$). Specifically, assuming that the intersection R' is $R'=(X_{R'}, Y_{R'})$, the equation v is $X-X_{R'}=0$. Therefore, the elliptic curve pairing processing unit calculates $u=X_{R'}$ by using the processing device. The elliptic curve pairing processing unit allocates a storage region for storing the element u of the finite field $GF(q^k)$, and stores the coefficient u of the calculated equation v in the storage device.

In S111, the elliptic curve pairing processing unit reads the coefficient u of the equation v calculated in S110, from the storage device. Using the processing device, the elliptic curve pairing processing unit calculates an intersection (i.e., an inverse element of the point R'=a point obtained by doubling the point A) of a line passing through the point R' represented by the equation v, wherein the value of X is constant, and the elliptic curve E. The elliptic curve pairing processing unit stores the calculated intersection in the storage device, as a new point A.

In S112, the elliptic curve pairing processing unit reads the coefficients c, d, and e of the equation 1 calculated in S108, and the point Q' calculated in S104, from the storage device. Using the processing device, the elliptic curve pairing processing unit calculates a value $cX_{Q'}+dY_{Q'}+e$ obtained by substituting coordinates $(X_{Q'}, Y_{Q'})$ of the point Q' into the left-hand side $cX+dY+e$ of the equation 1. The elliptic curve pairing processing unit allocates a storage region for storing an element $1(Q')$ of the finite field $GF(q^k)$, and stores the calculated value $cX_{Q'}+dY_{Q'}+e$ in the storage device, as $1(Q')$.

In S113, the elliptic curve pairing processing unit reads the coefficients c, d, and e of the equation 1 calculated in S108, and the point S selected in S103, from the storage device. Using the processing device, the elliptic curve pairing processing unit calculates a value $cX_S+dY_S+e$ obtained by substituting coordinates $(X_S, Y_S)$ of the point S into the left-hand side $cX+dY+e$ of the equation 1. The elliptic curve pairing processing unit allocates a storage region for storing an element $1(S)$ of the finite field $GF(q^k)$, and stores the calculated value $cX_S+dY_S+e$ in the storage device, as $l(S)$.

In S114, the elliptic curve pairing processing unit reads the coefficient u of the equation v calculated in S110 and the point Q' calculated in S104, from the storage device. The elliptic curve pairing processing unit calculates a value $X_{Q'}-u$ obtained by substituting the coordinates $(X_{Q'}, Y_{Q'})$ of the point Q' into the left-hand side $X-u$ of the equation v, by using the processing device. The elliptic curve pairing processing unit allocates a storage region for storing an element $v(Q')$ of the finite field $GF(q^k)$, and stores the calculated value $X_{Q'}-u$ in the storage device, as $v(Q')$ In S115, the elliptic curve pairing processing unit reads the coefficients u of the equation v calculated in S110 and the point S selected in S103, from the storage device. The elliptic curve pairing processing unit calculates a value Xs-u obtained by substituting the coordinates $(X_S, Y_S)$ of the point S into the left-hand side $X-u$ of the equation v, by using the processing device. The elliptic curve pairing processing unit allocates a storage region for storing an element $v(S)$ of the finite field $GF(q^k)$, and stores the calculated value Xs-u in the storage device, as $v(S)$.

In S116, the elliptic curve pairing processing unit reads the pairing value f, and the values $1(Q')$, $1(S)$, $v(Q')$, and $v(S)$ calculated in S112 to S115, from the storage device. The elliptic curve pairing processing unit calculates $(f^2 \times 1(Q') \times v(S))/(v(Q') \times 1(S))$, by using the processing device. The elliptic curve pairing processing unit stores the calculated value $(f^2 \times 1(Q') \times v(S))/(v(Q') \times 1(S))$ in the storage device, as a new pairing value f.

In S117, the elliptic curve pairing processing unit checks whether bit $r_m$ being the m-th bit of the group order r of the additive group $E(GF(q))$ is 1 or not, by using the processing device. If $r_m=1$, it goes to S118, and if $r_m=0$, it goes to S127.

In S118, the elliptic curve pairing processing unit reads the points A and P from the storage device. Using the processing device, the elliptic curve pairing processing unit calculates the equation $1: cX+dY+e=0$ of a straight line passing through the points A and P (where X and Y are variables having values in the finite field $GF(q^k)$, and c, d, and e are elements of the finite field $GF(q^k)$) Specifically, assuming that the point A is $A=(X_A, Y_A)$ and the point P is $P=(X_P, Y_P)$, since the equation 1 is $(Y_P-X_A)(X-X_A)-(X_P-X_A)(Y-X_A)=0$, it can be transformed to $(Y_P-X_A)X-(X_P-X_A)Y+(X_AY_P-X_PY_A)=0$. Therefore, the elliptic curve pairing processing unit calculates $C=Y_P-X_A$, $d=X_P-X_A$, and $e=X_AY_P-X_PY_A$, by using the processing device. The elliptic curve pairing processing unit stores the coefficients c, d, and e of the calculated equation l in the storage device.

In S119, the elliptic curve pairing processing unit reads the coefficients c, d, and e of the equation 1 calculated in S118, from the storage device. The elliptic curve pairing processing unit calculates an intersection R' of a straight line passing through the points A and P represented by the equation 1 and the elliptic curve E, by using the processing device. The elliptic curve pairing processing unit stores the calculated intersection R' in the storage device.

In S120, the elliptic curve pairing processing unit reads the intersection R' calculated in S119, from the storage device. Using the processing device, the elliptic curve pairing processing unit calculates an equation $v: X-u=0$ of a straight line passing through the intersection R', wherein the value of X is constant (X is a variable having a value in the finite field $GF(q^k)$, and u is an element of the finite field $GF(q^k)$) Specifically, assuming that the intersection R' is $R'=(X_{R'}, Y_{R'})$, the equation v is $X-X_{R'}=0$. Therefore, the elliptic curve pairing processing unit calculates $u=X_{R'}$ by using the processing device. The elliptic curve pairing processing unit stores the coefficient u of the calculated equation v in the storage device.

In S121, the elliptic curve pairing processing unit reads the coefficient u of the equation v calculated in S120, from the storage device. Using the processing device, the elliptic curve pairing processing unit calculates an intersection (i.e., an inverse element of the point R'=a sum of the points A and P) of a line passing through the point R' represented by the equation v, wherein the value of X is constant, and the elliptic curve E. The elliptic curve pairing processing unit stores the calculated intersection in the storage device, as a new point A.

In S122, the elliptic curve pairing processing unit reads the coefficients c, d, and e of the equation 1 calculated in S118, and the point Q' calculated in S104, from the storage device. Using the processing device, the elliptic curve pairing processing unit calculates a value $cX_{Q'}+dY_{Q'}+e$ obtained by substituting coordinates $(X_{Q'}, Y_{Q'})$ of the point Q' into the left-hand side $cX+dY+e$ of the equation 1. The elliptic curve pairing processing unit stores the calculated value $cX_{Q'}+dY_{Q'}+e$ in the storage device, as $1(Q')$.

In S123, the elliptic curve pairing processing unit reads the coefficients c, d, and e of the equation 1 calculated in S118, and the point S selected in S103, from the storage device. Using the processing device, the elliptic curve pairing processing unit calculates a value $cX_S+dY_S+e$ obtained by substituting coordinates $(X_S, Y_S)$ of the point S into the left-hand side $cX+dY+e$ of the equation 1. The elliptic curve pairing processing unit stores the calculated value $cX_S+dY_S+e$ in the storage device, as $l(S)$.

In S124, the elliptic curve pairing processing unit reads the coefficients u of the equation v calculated in S120 and the point Q' calculated in S104, from the storage device. The elliptic curve pairing processing unit calculates a value $X_{Q'}-u$ obtained by substituting the coordinates $(X_{Q'}, Y_{Q'})$ of the point Q' into the left-hand side $X-u$ of the equation v, by using the processing device. The elliptic curve pairing processing unit allocates a storage region for storing an element $v(Q')$ of the finite field $GF(q^k)$, and stores the calculated value $X_{Q'}-u$ in the storage device, as $v(Q')$ In S125, the elliptic curve pairing processing unit reads the coefficients u of the equation v calculated in S120 and the point S selected in S103, from the storage device. The elliptic curve pairing processing unit calculates a value $X_S-u$ obtained by substituting the coordinates $(X_S, Y_S)$ of the point S into the left-hand side $X-u$ of the equation v, by using the processing device. The elliptic curve pairing processing unit allocates a storage region for storing an element $v(S)$ of the finite field $GF(q^k)$, and stores the calculated value $X_S-u$ in the storage device, as $v(S)$.

In S126, the elliptic curve pairing processing unit reads the pairing value f, and the values $l(Q')$, $l(S)$, $v(Q')$, and $v(S)$ calculated in S122 to S125, from the storage device. The elliptic curve pairing processing unit calculates $(f \times l(Q') \times v(S))/(v(Q') \times l(S))$, by using the processing device. The elliptic curve pairing processing unit stores the calculated value $(f \times l(Q') \times v(S))/(v(Q') \times l(S))$ in the storage device, as a new pairing value f.

In S127, the elliptic curve pairing processing unit reads the integer m from the storage device. The elliptic curve pairing processing unit obtains an integer $m-1$ by subtracting 1 from the integer m, by using the processing device. The elliptic curve pairing processing unit stores the obtained integer $m-1$ in the storage device, as a new integer m.

In S128, the elliptic curve pairing processing unit reads the integer m from the storage device. The elliptic curve pairing processing unit checks whether m is greater than or equal to 0 or not by using the processing device. If $m \geq 0$, it returns to S108. If $m<0$, it goes to S129.

In S129, the elliptic curve pairing processing unit reads the pairing value f from the storage device. The elliptic curve pairing processing unit raises f to the power of $(q^k-1)/r$ by using the processing device. Since $q^k-1$ is in multiples of r, $(q^k-1)/r$ is an integer. Therefore, using the processing device, the elliptic curve pairing processing unit raises f to the power of $(q^k1)/r$, by multiplying f $(q^k1)/r$ times. The elliptic curve pairing processing unit stores the f exponentiated by $(q^k1)/r$ in the storage device, as a new f.

In S130, the elliptic curve pairing processing unit reads the pairing value f calculated in S129, from the storage device. The elliptic curve pairing processing unit outputs the read pairing value f.

In addition, a pairing value of Weil pairing can also be calculated by similar procedure up to S128.

As known from the computational procedures described above, the smaller the Hamming weight of the group order r of the additive group E(GF(q)) is, the shorter the computation time of the pairing value becomes. The Hamming weight means the number of bits whose bit values are 1 in the case of a certain integer being expressed in the binary notation.

According to this computational procedure, when a bit value $r_m$ of the m-th bit of the group order r is 1, the steps from S118 to S126 are performed, but when $r_m$ is 0, the steps from S118 to S126 are not performed. Therefore, the smaller the Hamming weight of the group order r is, the smaller the number of the overall processing steps becomes, thereby the computation time of the pairing value becomes shorter.

In this computational procedure, the point P is multiplied by r, and by using the equation of the straight line which is obtained in this process, the pairing value is computed.

Now, a method of high speed computation by the elliptic curve pairing processing unit 233 in the present Embodiment will be explained.

FIGS. 8 to 10 are flowcharts showing a flow example of computation processing of calculating a pairing value of Tate pairing, by the elliptic curve pairing processing unit 233 in the present Embodiment. This computation processing applies an algorithm called the Miller lite (lightened Miller) algorithm which utilizes an efficiently computable homomorphism mapping.

As a premise, it is presumed there is a relation of $r=\lambda^2+\lambda+1$ between the group order r of the additive group E(GF(q)) and a certain integer $\lambda$. Moreover, it is presumed the integer $\lambda$ is $\lambda=2^{c1}+2^{c2}$ ($c_1$ and $c_2$ are integers greater than or equal to 0. $c_1>c_2$). That is, the Hamming weight of the integer $\lambda$ is 2. At this time, since it is $r=\lambda^2+\lambda+1=2^{c1}+2^{c1+c2+1}+2^{c2}+2^{c1}+2^{c2}+1$, the Hamming weight of r is less than or equal to 6.

Moreover, in order to store the value s calculated by the auxiliary processing unit 333, it is presumed that $c_2$ storage regions (array $s[c_2]$) for storing a value s of the finite field $GF(q^k)$ are allocated in the storage device.

In S201, the point input unit 331 inputs the points P and Q on the elliptic curve E over the finite field $GF(q^k)$ The point input unit 331 allocates a storage region for storing the points P and Q, and stores the input points P and Q in the storage device.

In this case, the point P is a point on the elliptic curve E over the finite field GF(q) which is a subfield of the finite field $GF(q^k)$ That is, the point P is an element of the additive group E(GF(q)). Moreover, the point Q is a point obtained by mapping a point on the elliptic curve E' over the finite field $GF(q^{k/2})$, which is a subfield of the finite field $GF(q^k)$, by using an efficiently computable endomorphism mapping $\phi$. That is, the point Q is an element of the additive group $E(GF(q^{k/2}))$. In addition, for using this high speed method, since k/2 needs to be an integer, it is restricted to the case the extension degree k being an even number.

The elliptic curve E' is a twisted elliptic curve corresponding to the elliptic curve $E: Y^2=X^3+aX+b$. The twisted elliptic curve E' is given by the equation $Y^2=X^3+d^2aX+d^3b$ (d being a value in the finite field GF(q) and a quadratic non-residue). The quadratic non-residue means d when no $\alpha$ satisfying $d=\alpha^2$ exists (d and $\alpha$ are elements of the finite field GF(q)).

The efficiently computable endomorphism mapping $\phi$ is a mapping to map an element of the additive group $E(GF(q^{k/2}))$ to an element of the same additive group $E(GF(Q^{k/2}))$, and a mapping satisfying $\phi(P)=\lambda P$ with respect to all the points P being elements of the additive group $E(GF(q^{k/2}))$ (where $\lambda(P)$ represents a point obtained by mapping the point P by the endomorphism mapping $\phi$, $\lambda$ is an integer, and $\lambda P$ represents a point obtained by adding the point P $\lambda$ times). The point obtained by using a scalar multiple of a point on the elliptic curve, $\lambda P$, is defined to be what is obtained by adding the point P $\lambda$ times. If performing these computations one by one, it is necessary to carry out adding on the elliptic curve $\lambda$ times.

Even when a somewhat efficient algorithm is used, it is necessary to perform adding on the elliptic curve the maximum ($2 \log_2 \lambda$) times.

Since the point obtained by using a scalar multiple of a point on an elliptic curve is still a point on the elliptic curve, it can be regarded as an endomorphism mapping. Assuming that such an endomorphism mapping is $\phi$, the relation $\phi(P)=\lambda P$ is satisfied. Therefore, if a computation amount of calculating $\phi(P)$ is smaller than that of calculating the point $\lambda P$ which is obtained by using a scalar multiple of a point on an elliptic curve, it becomes possible to calculate a scalar multiple of the point on the elliptic curve at high speed by calculating $\phi(P)$ instead of calculating $\lambda P$. Thus, the endomorphism mapping $\phi$ whose computation amount for calculating $\phi(P)$ is relatively small is called an efficiently computable endomorphism mapping.

Regarding an arbitrary $\lambda X$, the efficiently computable endomorphism mapping does not necessarily exist. However, for example, when the group order r of the additive group E(K) is $r=\lambda^2+\lambda+1$, it is known that the endomorphism mapping $\phi:(x, y) \rightarrow (\beta x, y)$ satisfies the relation of $\phi(P)=\lambda P$ (where x and y are coordinates of a point on the elliptic curve $E:Y^2=X^3+b$). In this case, $\beta$ is a primitive third root of unity in the finite field GF(q), i.e., an element of the finite field GF(q) where $\beta^3=1$ and $\beta \neq 1$.

Moreover, when the group order r is $r=\lambda^2+1$, it is known that the endomorphism mapping $\phi:(x, y) \rightarrow (-x, iy)$ satisfies the relation of $\phi(P)=\lambda P$ (where x and y are coordinates of a point on the elliptic curve $E:Y^2=X^3+aX$). In this case, i is a primitive fourth root of unity in the finite field GF(q), i.e., an element of the finite field GF(q) where $i^4=1$ and $i \neq \pm 1$.

Generally, when an integer $f(\lambda)=a\lambda^2+b\lambda+c$, which is obtained by substituting an integer $\lambda$ into a quadratic polynomial $f(x)=ax^2+bx+c$ (a, b, and c being integers), is in multiples of the group order r, the efficiently computable endomorphism mapping $\phi$ that satisfies the relation of $\phi(P)=\lambda P$ exists. However, in order for such a mapping to be an endomorphism mapping, it is necessary there is a predetermined relation between the coefficients a and b of the elliptic curve E.

Moreover, it is known, with respect to such an endomorphism mapping $\phi$, that the smaller the absolute value of the discriminant D of the ring generated by the endomorphism mapping $\phi$ is, the more efficiently the computation can be performed. The discriminant D of the ring generated by the endomorphism mapping $\phi$ is an integer that can be obtained by $D=b^2-4ac$ when $a\phi^2(P)+b\phi(P)+cP=O$ is satisfied with respect to an arbitrary point P on the elliptic curve E over the finite field $GF(q^k)$, (where a, b, and c are integers, $\phi^2(P)$ represents a point $\phi(\phi(P))$ obtained by mapping the point $\phi(P)$ which is acquired by mapping the point P, and O is a point at infinity). Generally, the discriminant D has a negative value.

For example, when the endomorphism mapping $\phi$ is $\phi:(x, y) \rightarrow (\beta x, y)$, $\phi^2(p)+\phi(p)+p=O$ is satisfied with respect to an arbitrary point P. Therefore, the discriminant D of the endomorphism mapping $\phi:(x, y) \rightarrow (\beta x, y)$ is $D=1^2-4 \times 1 \times 1=-3$. Moreover, when the endomorphism mapping $\phi$ is $\phi:(x, y) \rightarrow (-x, iy)$, $\phi^2(P)+P=O$ is satisfied with respect to an arbitrary point P. Therefore, the discriminant D of the endomorphism mapping $\phi:(x, y) \rightarrow (-x, iy)$ is $D=0^2-4 \times 1 \times 1=-4$.

In the present Embodiment, the case in which $\phi:(x, y) \rightarrow (\beta x, y)$ is used as an efficiently computable endomorphism mapping $\phi$ will be explained. However, this is merely an example, and thus $\phi:(x, y) \rightarrow (-x, iy)$ can also be used as an efficiently computable endomorphism mapping $\phi$. Alternatively, other endomorphism mapping may also be used. It is preferable to use an endomorphism mapping $\phi$, the absolute value of the discriminant D of the ring generated by which is small, because the computation can be performed at high speed.

In S202, the first processing unit 332 reads the coefficients a and b of the elliptic curve E and the group order r of the additive group E(GF(q)), from the storage device.

In S203, the first processing unit 332 reads the point P on the elliptic curve E over the finite field $GF(q^k)$. The first processing unit 332 allocates a storage region for storing a point A which is on the elliptic curve E over the finite field $GF(q^k)$, and stores the read point P in the storage device, as the point A.

In S204, the first processing unit 332 allocates a storage region for storing a pairing value f which is in the finite field $GF(q^k)$, and stores a constant 1, which is in the finite field $GF(q^k)$, in the storage device as the pairing value f.

In S205, the first processing unit 332 allocates a storage region for storing an integer j, and stores an integer 1 in the storage device, as the integer j.

In S206, the first processing unit 332 allocates a storage region for storing an integer i and stores an integer 1 in the storage device, as the integer i.

In S207, the first processing unit 332 reads the points A and Q, and the integer j from the storage device. The first processing unit 332 feeds three points (points A, A, and Q) on the elliptic curve E over the finite field $GF(q^k)$ and the integer j into the auxiliary processing unit 333.

In S208, the auxiliary processing unit 333 calculates the point A and values g and s, based on the three points on the elliptic curve E over the finite field $GF(q^k)$ which the first processing unit 332 fed in S208. The auxiliary processing unit 333 stores the calculated point A in the storage device, as a new point A. The auxiliary processing unit 333 allocates a storage region for storing the value g, and stores the calculated value g in the storage device. The auxiliary processing unit 333 stores the calculated value s in the i-th (s[i]) of the storage region which has been allocated beforehand for storing the value s, in the storage device.

FIG. 11 is a flowchart showing a flow example of auxiliary processing of Tate pairing performed by the auxiliary processing unit 333 described in the present Embodiment.

In S281, the auxiliary processing unit 333 inputs three points on the elliptic curve E over the finite field $GF(q^k)$ and an integer i. The input three points herein are called a point A, a point B, and a point Q in order. Into the point A and the point Q, the point A and the Point Q from the first processing unit 332 are input. Into the point B, there are a case of inputting the point A and a case of inputting the point P from the first processing unit 332. The auxiliary processing unit 333 allocates a storage region for storing the points A, B, and Q on the elliptic curve E over the finite field $GF(q^k)$ and the integer i, and stores the input points A, B and Q and integer i in the storage device.

In S282, the auxiliary processing unit 333 reads the points A and B which were input in S281, from the storage device. The auxiliary processing unit 333 calculates an equation $1:Y=mx+c$ of a straight line passing through the read points A and B, by using the processing device. Specifically, assuming that the point A is $A=(X_A, Y_A)$ and the point B is $B=(X_B, Y_B)$, when the point A is not equal to the point B, the auxiliary processing unit 333 calculates a slope $m=(Y_B-X_A)/(X_B-X_A)$ between A and B, and a Y intercept $c=(X_A Y_B - X_B Y_A)/(X_B - X_A)$ by using the processing device. When the point A is equal to the point B, the auxiliary processing unit 333 calculates an equation $1:Y=mx+c$ of the tangent to the elliptic curve E at the point A by using the processing device. The auxiliary processing unit 333 allocates a storage region for storing the values m and c of the finite field $GF(q^k)$, and stores the coefficients m and c of the calculated equation 1 in the storage device.

In S283, the auxiliary processing unit 333 reads the coefficients m and c of the equation 1 which were calculated in S282 and the points A and B which were input in S281, from the storage device. The auxiliary processing unit 333 calculates a sum of the point A and the point B, based on the equation 1 calculated in S282, by using the processing device. The auxiliary processing unit 333 stores the calculated sum of the point A and the point B in the storage device, as a new point A. This makes the point A at the first processing unit 332 side, which called the auxiliary processing unit 333, also be rewritten to be a new point A.

In S284, the auxiliary processing unit 333 reads the points A and Q which were input in S281 (not the point A calculated in S283) and the coefficient m of the equation 1 which was calculated in S282, from the storage device. The auxiliary processing unit 333 calculates a value $-Y_Q-Y_A-m(\beta X_Q-X_A)$ in the finite field $GF(q^k)$ by using the processing device. In this case, $(X_A, Y_A)$ are coordinates of the point A, $(X_Q, Y_Q)$ are coordinates of the point Q, and $\beta$ is a primitive third root of unity in the finite field $GF(q^k)$ The auxiliary processing unit 333 reads the integer i which was input in S281, from the storage device. The auxiliary processing unit 333 stores the calculated $-Y_Q-X_A-m(\beta X_Q-X_A)$ in the i-th storage region (s[i]) in the storage region allocated for storing the value s of the finite field $GF(q^k)$, in the storage device.

In S285, the auxiliary processing unit 333 reads the points A and Q which were input in S281 (not the point A calculated in S283) and the coefficient m of the equation 1 which was calculated in S282, from the storage device. The auxiliary processing unit 333 calculates a value $Y_Q-X_A-m(X_Q-X_A)$ in the finite field $GF(q^k)$ by using the processing device. In this case, $(X_A, Y_A)$ are coordinates of the point A, and $(X_Q, Y_Q)$ are coordinates of the point Q. The auxiliary processing unit 333 allocates a storage region for storing the value g of the finite field $GF(q^k)$, and stores the calculated value $Y_Q-Y_A-m(X_Q-X_A)$ in the storage device, as the value g.

In S286, the auxiliary processing unit 333 reads the value g calculated in S285 from the storage device. The auxiliary processing unit 333 outputs the read value g to the first processing unit 332 which is a calling party.

In this way, the auxiliary processing unit 333, while moving the point A, calculates the value g required for the first processing unit 332 to perform a pairing computation. Moreover, in parallel to this, it calculates the value s required for the second processing unit 335 to perform a pairing computation later, and stores it in the storage device.

It returns to FIGS. 8 to 10 to continue the explanation.

In S209, the first processing unit 332 reads the pairing value f and the value g calculated in S208 by the auxiliary processing unit 333, from the storage device. The first processing unit 332 calculates a value $f^2 \times g$ in the finite field $GF(q^k)$ by using the processing device. The first processing unit 332 stores the calculated value $f^2 \times g$ in the storage device, as a new pairing value f.

In S210, the first processing unit 332 reads an integer j from the storage device. The first processing unit 332 calculates an integer j+1 by adding 1 to the read integer j by using the processing device. The first processing unit 332 stores the calculated integer j+1 in the storage device, as a new integer j.

In S211, the first processing unit 332 reads an integer i from the storage device. The first processing unit 332 calculates an integer i+1 by adding 1 to the read integer i by using the processing device. The first processing unit 332 stores the calculated integer i+1 in the storage device, as a new integer i.

In S212, the first processing unit 332 reads the integer i from the storage device. The first processing unit 332 checks whether the integer i is equal to less than $c_1-c_2$ or not by using the processing device. If $i \leq c_1-c_2$, it returns to S207, and if $i > c_1-c_2$, it goes to S213.

In S213, the first processing unit 332 reads the points A, P, and Q, and the integer j from the storage device. The first processing unit 332 feeds the three points (points A, P, and Q) on the elliptic curve E over the finite field $GF(q^k)$ and the integer j into the auxiliary processing unit 333.

In S214, the auxiliary processing unit 333 calculates the point A, and the values g and s, based on the three points on the elliptic curve E over the finite field $GF(q^k)$ which the first processing unit 332 fed in S213. The auxiliary processing unit 333 stores the calculated point A, and values g and s in the storage device.

In S215, the first processing unit 332 reads the pairing value f and the value g which the auxiliary processing unit 333 calculated in S214, from the storage device. The first processing unit 332 calculates a value $f \times g$ in the finite field $GF(q^k)$, by using the processing device. The first processing unit 332 stores the calculated value $f \times g$ in the storage device, as a new pairing value f.

In S216, the first processing unit 332 reads the integer j from the storage device. The first processing unit 332 calculates an integer j+1 by adding 1 to the read integer j by using the processing device. The first processing unit 332 stores the calculated integer j+1 in the storage device, as a new integer j.

In S217, the first processing unit 332 stores an integer 1 in the storage device, as an integer i.

In S218, the first processing unit 332 reads the points A and Q, and the integer j from the storage device. The first processing unit 332 feeds the three points (points A, A, and Q) on the elliptic curve E over the finite field $GF(q^k)$ and the integer j into the auxiliary processing unit 333.

In S219, the auxiliary processing unit 333 calculates the point A and values g and s, based on the three points on the elliptic curve E over the finite field $GF(q^k)$ which the first processing unit 332 fed in S218. The auxiliary processing unit 333 stores the calculated point A, and values g and s in the storage device.

In S220, the first processing unit 332 reads the pairing value f and the value g which the auxiliary processing unit 333 calculated in S219, from the storage device. The first processing unit 332 calculates a value $f^2 \times g$ in the finite field $GF(q^k)$ by using the processing device.

The first processing unit 332 stores the calculated value $f^2 \times g$ in the storage device, as a new pairing value f.

In S221, the first processing unit 332 reads the integer j from the storage device. The first processing unit 332 calculates an integer j+1 by adding 1 to the read integer j by using the processing device. The first processing unit 332 stores the calculated integer j+1 in the storage device, as a new integer j.

In S222, the first processing unit 332 reads the integer i from the storage device. The first processing unit 332 calculates an integer i+1 by adding 1 to the read integer by using the processing device. The first processing unit 332 stores the calculated integer i+1 in the storage device, as a new integer i.

In S223, the first processing unit 332 reads the integer i from the storage device. The first processing unit 332 checks whether i is equal to less than $c_2$ or not by using the processing device. If $i \leq c_2$, it returns to S218, and if $i > c_2$, it goes to S224.

In S224, the first processing unit 332 reads the points A, P, and Q from the storage device. The first processing unit 332 feeds the three points (points A, P, and Q) on the elliptic curve E over the finite field $GF(q^k)$ and an integer 0 into the auxiliary processing unit 333.

In S225, the auxiliary processing unit 333 calculates the point A and values g and s, based on the three points on the elliptic curve E over the finite field $GF(q^k)$ which the first processing unit 332 fed in S224. The auxiliary processing unit 333 stores the calculated point A and values g and s in the storage device.

In S226, the first processing unit 332 reads the pairing value f and the value g which the auxiliary processing unit 333 calculated in S225, from the storage device. The first processing unit 332 calculates a value f×g in the finite field $GF(q^k)$ by using the processing device. The first processing unit 332 stores the calculated value f×g in the storage device, as a new pairing value f.

In S227, the second processing unit 334 reads the pairing value f which the first processing unit 332 calculated in S226. The second processing unit 334 allocates a storage region for storing a value h which is in the finite field $GF(q^k)$, and stores the read pairing value f in the storage device, as a pairing value h.

In S228, the second processing unit 334 stores an integer 1 in the storage device, as an integer j.

In S229, the second processing unit 334 stores the integer 1 in the storage device, as an integer i.

In S230, the second processing unit 334 reads the pairing value f, the integer j and the j-th value in the values s, s[j], which the auxiliary processing unit 333 calculated, from the storage device. The second processing unit 334 calculates a value $f^2 \times s[j]$ in the finite field $GF(q^k)$ by using the processing device. The second processing unit 334 stores the calculated value $f^2 \times s[j]$ in the storage device, as a new pairing value f.

In S231, the second processing unit 334 reads the integer j from the storage device. The first processing unit 332 calculates an integer j+1 by adding 1 to the read integer j by using the processing device. The first processing unit 332 stores the calculated integer j+1 in the storage device, as a new integer j.

In S232, the second processing unit 334 reads the integer i from the storage device. The first processing unit 332 calculates an integer i+1 by adding 1 to the read integer i by using the processing device. The first processing unit 332 stores the calculated integer i+1 in the storage device, as a new integer i.

In S233, the second processing unit 334 reads the integer i from the storage device. The second processing unit 334 checks whether the read integer i is equal to less than $c_1 - c_2$ or not by using the processing device. If $i \leq c_1 - c_2$, it returns to S230, and if $i > c_1 - c_2$, it goes to S234.

In S234, the second processing unit 334 reads the pairing value f, the integer j and the j-th value in the values s, s[j], which the auxiliary processing unit 333 calculated, from the storage device. The second processing unit 334 calculates a value f×s[j] in the finite field $GF(q^k)$ by using the processing device. The second processing unit 334 stores the calculated value f×s[j] in the storage device, as a new pairing value f.

In S235, the second processing unit 334 reads the integer j from the storage device. The first processing unit 332 calculates an integer j+1 by adding 1 to the read integer j by using the processing device. The first processing unit 332 stores the calculated integer j+1 in the storage device, as a new integer j.

In S236, the second processing unit 334 reads the pairing value f and the pairing value h stored in S227, from the storage device. The second processing unit 334 calculates a value f×h in the finite field $GF(q^k)$ by using the processing device. The second processing unit 334 stores the calculated value f×h in the storage device, as a new pairing value f.

In S237, the second processing unit 334 stores an integer 1 in the storage device, as an integer i.

In S238, the second processing unit 334 reads the pairing value f, the integer j and the j-th value in the values s, s[j], which the auxiliary processing unit 333 calculated, from the storage device. The second processing unit 334 calculates a value $f^2 \times s[j]$ in the finite field $GF(q^k)$ by using the processing device. The second processing unit 334 stores the calculated value $f^2 \times s[j]$ in the storage device, as a new pairing value f.

In S239, the second processing unit 334 reads the integer j from the storage device. The second processing unit 334 calculates an integer j+1 by adding 1 to the read integer j by using the processing device. The second processing unit 334 stores the calculated integer j+1 in the storage device, as a new integer j.

In S240, the second processing unit 334 reads the integer i from the storage device. The second processing unit 334 calculates an integer j+1 by adding 1 to the read integer j by using the processing device. The second processing unit 334 stores the calculated integer i+1 in the storage device, as a new integer i.

In S241, the second processing unit 334 reads the integer i from the storage device. The second processing unit 334 checks whether the read integer i is equal to less than $c_2$ or not by using the processing device. If $i \leq c_2$, it returns to S238, and if $i > c_2$, it goes to S242.

In S242, the exponential processing unit 335 reads the pairing value f from the storage device. The exponential processing unit 335 raises the pairing value f to the power of $(q^k 1)/r$ by using the processing device. Since $q^k - 1$ is in multiples of r, $(q^k 1)/r$ is an integer. Therefore, using the processing device, the exponential processing unit 335 raises the pairing value f to the power of $(q^k 1)/r$, by multiplying $f (q^k 1)/r$ times. The elliptic curve pairing processing unit stores the f exponentiated by $(q^k 1)/r$ in the storage device, as a new pairing value f.

In S243, the pairing output unit 336 reads the pairing value f from the storage device. The pairing output unit 336 outputs the read pairing value f.

In this computational procedure, the processing of S207 to S223 by the first processing unit 332 is almost the same as the processing of S230 to S241 by the second processing unit 334. In both of them, a point on the elliptic curve E is multiplied by λ, and by using a value acquired in the process, the pairing value is computed. Since the group order r is $r = \lambda^2 + \lambda + 1$, it is $rP = (\lambda^2 + \lambda + 1)P = \lambda(\lambda+1)P + P$.

In the pairing computing process explained in FIGS. 6 to 7, computation for obtaining rP is performed. In contrast, in the pairing processing herein explained, the first processing unit 332 calculates (λ+1)P (defining to be P'), the second processing unit 334 calculates λP'+P, and thus the same result as that of calculating rP is obtained. Actually, the second processing unit 334 does not calculate λP'+P. For calculating a pairing value, a value obtained in the process of calculating λP'+P is needed. This value is already stored as the value s, which is calculated by the auxiliary processing unit 333 in the process of calculating (λ+1)P by the first processing unit 332. Therefore, the second processing unit 334 does not need to calculate λP+P.

Then, in the process of calculating (λ+1)P, the auxiliary processing unit 333 calculates s which the second processing unit 334 needs, with respect to $\phi(A)=\lambda A$, by using an efficiently computable endomorphism mapping $\phi$.

When calculating a scalar multiple of a point on an elliptic curve, a computation amount almost proportional to the bit length of the number of the scalar multiple is needed. Since it is $r=\lambda^2+\lambda+1$, the bit length of $\lambda$ is approximately a half of the bit length of r. Accordingly, calculating $(\lambda+1)P$ (or $\lambda P$) can be performed using half the computation amount of calculating rP, thereby speeding up the computation.

Since the Hamming weight of $\lambda$ is 2, the calculation of obtaining $\lambda P$ can be performed at a higher speed than calculating a scalar multiple of the point P with respect to an integer having the same bit length as $\lambda$ and whose Hamming weight is greater than or equal to 3.

Further detailedly referring to the computational procedure herein explained, for example, in the processing (S202 to S226) performed by the first processing unit 332, the repeating of from S207 to S212 and the repeating of from S218 to S223 have the same processing content. This processing is equivalent to the processing in the case of $r_m=0$ in the repeat loop of the pairing processing explained in FIGS. 6 and 7. Moreover, the processing of from S213 to S215 performed by the first processing unit 332 is equivalent to the processing in the case of $r_m=1$ in the repeat loop of the pairing processing explained in FIGS. 6 and 7.

That is, the computational procedure explained herein speeds up the pairing processing by developing the repeat loop of the pairing processing explained in FIGS. 6 and 7 not to have conditional branch (S117 in FIG. 7) by utilizing that the Hamming weight of $\lambda$ is small.

Although the case where the Hamming weight of is 2 has been explained, even if the Hamming weight of $\lambda$ is a value other than 2, it is possible to perform the pairing processing at high speed by applying this notion.

However, if the Hamming weight of $\lambda$ is 1, integers that can be selected as a group order r will be restricted. This is because the group order r must be a prime number. Moreover, as mentioned above, the smaller the Hamming weight of $\lambda$ is, the faster the pairing processing can be performed. Therefore, it is preferable that the Hamming weight of $\lambda$ is 2.

In addition, the method for acquiring the integers $c_1$ and $c_2$ has not been explained in particular, but the integers $c_1$ and $c_2$ can be calculated from the group order r input by the group order input unit 214. This calculation can be computed by using a processing device, such as a computer.

Moreover, to the contrary, the group order input unit 214 may input not the group order r but the integers $c_1$ and $c_2$. In that case, using the processing device, the group order input unit 214 can calculate an integer $\lambda=2^{c_1}+2^{c_2}$, and further calculate the group order $r=\lambda^2+\lambda+1$. Alternatively, the group order input unit 214 may input both the group order r and the integers $c_1$ and $c_2$. In that case, since the computation amount in the elliptic curve cryptographic processor 200 becomes smaller, it is preferable when the elliptic curve cryptographic processor 200 is provided with a processing device having low computational capacity.

The elliptic curve pairing processing unit 233 is realizable by causing a computer to execute the program which makes the computer perform the operations described above. However, for speeding up the pairing computation, it is preferable to realize it by hardware using a logical circuit for exclusive use for performing the operations mentioned above rather than to realize by software.

As mentioned above, the number of repeating (from S207 to S212, and from S218 to S223) the processing performed by the first processing unit 332 is equal to the Hamming weight of $\lambda$ (the same applies to the number of repeating the processing performed by the second processing unit 334). Thus, if a conditional branch is prepared to change the number of repeating according to the Hamming weight of $\lambda$, it becomes possible to configure to respond to the group order r having different Hamming weight of $\lambda$.

However, for speeding up the pairing processing, it is better to have fewer conditional branches, and thus it is preferable to fix the Hamming weight of $\lambda$. Particularly, in the case of realizing the elliptic curve pairing processing unit 233 by hardware, since the circuit configuration can be simplified when the Hamming weight of $\lambda$ is fixed, it is further preferable to fix it.

Thus, the pairing processing can be performed at high speed by limiting the group order r which the group order input unit 214 inputs to a group order having a specific form. The group order r having a specific form herein is a group order r that has a relation of $r=\lambda^2+\lambda+1$ with respect to an integer $\lambda$ whose Hamming weight is fixed (for example, 2). Describing more generally, not only limiting to the relation of $r=\lambda^2+\lambda+1$, but also the relation of $r=\lambda^2+1$ or $r=f(\lambda)$ ($f(\lambda)$ is a value obtained by substituting the integer $\lambda$ into a quadratic polynomial $f(x)$ whose coefficient is an integer) can be applied.

Thus, the elliptic curve cryptographic processor 200 whose pairing processing is performed at high speed by limiting the group order r input by the group order input unit 214 to a group order having a specific form is an apparatus for processing elliptic curve cryptograph, which performs elliptic curve pairing computation sped up by being specialized in the group order having a specific form.

Furthermore, if the integers $c_1$ and $c_2$ are fixed, the number of times of repeating the processing performed the first processing unit 332 becomes fixed (the same applies to the processing performed by the second processing unit 334), thereby further speeding up the pairing computation. In that case, since the integer $\lambda=2^{c_1}+2^{c_2}$ is fixed, the group order $r=\lambda^2+\lambda+1$ also becomes fixed to one value.

Thus, the pairing processing can be performed at high speed by fixing the value of the group order r to a specific value. In that case, since the group order r is previously defined, the group order input unit 214 is not needed.

Accordingly, the elliptic curve cryptographic processor 200 whose pairing processing is performed at high speed by fixing the value of the group order r to a specific value is an apparatus for processing elliptic curve cryptograph, which performs elliptic curve pairing computation sped up by being specialized in a predetermined specific group order r.

As mentioned above, the security of the elliptic curve pairing-based cryptography is secured by the difficulty of the elliptic curve discrete logarithm problem and the difficulty of the discrete logarithm problem of the finite field multiplicative group. Since these difficulties are based on computational capacity of existing computers, if the computational capacity of the computers is improved, it becomes necessary to enhance the level of the difficulty in order to retain the security.

The difficulty of the elliptic curve discrete logarithm problem is related to the bit length of the group order r of the additive group E(GF(q)). As described above, if the group order r is fixed in order to speed up the pairing computation, it becomes impossible to change the bit length of the group order r. Therefore, the level of difficulty of the elliptic curve discrete logarithm problem cannot be increased.

On the other hand, the difficulty of the discrete logarithm problem of the finite field multiplicative group is related to the bit length of the order $q^k$ of the finite field $K'=GF(q^k)$ Therefore, the level of difficulty of the discrete logarithm problem of the finite field multiplicative group can be raised by increasing the extension degree k.

That is, in the apparatus for processing elliptic curve cryptograph, which performs an elliptic curve pairing computation sped up by being specialized in a predetermined group order r, the level of security can be increased by having a configuration where the extension degree k can be changed later.

For this purpose, for example, it is important that the extension degree input unit 212 for inputting the extension degree k is included. Moreover, it is important that the finite field processing unit 231 is configured to be able to perform the four arithmetic operations defined in the finite field $GF(q^k)$ even when the extension degree k is changed.

As mentioned above, the element of the finite field $GF(q^k)$ is stored in the storage device, as a list (array) of k integers of from 0 to p−1 when q is equal to a prime number p, for example. Therefore, in order to have a configuration where the extension degree k is variable, it is necessary to complicatedly configure the finite field processing unit 231. However, in the elliptic curve cryptographic processor, since retaining the security of the elliptic curve cryptography is the most important issue, it is required to configure the finite field processing unit 231 so that the extension degree k may be variable.

Moreover, even when the group order r is not fixed, the necessity of the configuration where the extension degree k is variable remains, which makes to change the security flexibly.

For changing the extension degree k relatively freely, it is necessary to carefully select the values of the group order r and the order q of the finite field K=GF(q). The elliptic curve cryptographic processor according to the present Embodiment has a feature that the elliptic curve pairing computation is performed at high speed by being specialized in the group order r selected in such a careful way. The method of selecting such group order r and order q will be described in detail in Embodiment 2.

In the elliptic curve cryptographic processor 200 according to the present Embodiment, the elliptic curve pairing processing unit 233, using the processing device, performs elliptic curve pairing computation sped up by being specialized in a group order having a specific form. Thus, it has an effect of processing the elliptic curve pairing-based cryptography at high speed even if the processing device has low computational capacity.

In the elliptic curve cryptographic processor 200 of according to the present Embodiment, the elliptic curve pairing processing unit 233, using the processing device, performs elliptic curve pairing computation sped up by utilizing the endomorphism mapping $\phi$ on the elliptic curve E over the finite field K. Thus, it has an effect of processing the elliptic curve pairing-based cryptography at high speed even if the processing device has low computational capacity.

In the elliptic curve cryptographic processor 200 according to the present Embodiment, the elliptic curve pairing processing unit 233, using the processing device, performs elliptic curve pairing computation sped up by utilizing an efficiently computable endomorphism mapping, as the endomorphism mapping $\phi$ on the elliptic curve E over the finite field K. Thus, it has an effect of processing the elliptic curve pairing-based cryptography at high speed even if the processing device has low computational capacity.

In the elliptic curve cryptographic processor 200 according to the present Embodiment, the elliptic curve pairing processing unit 233, using the processing device, performs elliptic curve pairing computation sped up by utilizing an endomorphism mapping, the absolute value of the discriminant D of the ring generated by which is small, as the endomorphism mapping $\phi$ on the elliptic curve E over the finite field K. Thus, it has an effect of processing the elliptic curve pairing-based cryptography at high speed even if the processing device has low computational capacity.

In the elliptic curve cryptographic processor 200 according to the present Embodiment, the elliptic curve pairing processing unit 233, using the processing device, performs elliptic curve pairing computation sped up by utilizing $\phi:(x, y) \to (\beta x, y)$ ($\beta$ being a primitive third root of unity in the finite field K), as the endomorphism mapping $\phi$ on the elliptic curve E over the finite field K. Thus, it has an effect of processing the elliptic curve pairing-based cryptography at high speed even if the processing device has low computational capacity.

In the elliptic curve cryptographic processor 200 according to the present Embodiment, the elliptic curve pairing processing unit 233, using the processing device, performs elliptic curve pairing computation sped up by utilizing $\phi:(x, y) \to (-x, iy)$ (i being a primitive fourth root of unity in the finite field K), as the endomorphism mapping $\phi$ on the elliptic curve E over the finite field K. Thus, it has an effect of processing the elliptic curve pairing-based cryptography at high speed even if the processing device has low computational capacity.

In the elliptic curve cryptographic processor 200 according to the present Embodiment, the elliptic curve pairing processing unit 233, using the processing device, performs elliptic curve pairing computation sped up by being specialized in a predetermined specific group order. Thus, it has an effect of processing the elliptic curve pairing-based cryptography at high speed even if the processing device has low computational capacity.

The elliptic curve cryptographic processor 200 described above can be realized by causing a computer to execute a program which makes the computer function as the elliptic curve cryptographic processor explained above.

The elliptic curve cryptographic processing program according to the present Embodiment has an effect of processing elliptic curve pairing-based cryptography at high speed even if the processing device has low computational capacity, because the elliptic curve pairing processing unit 233, using the processing device, performs the elliptic curve pairing computation sped up by being specialized in a group order having a specific form.

Embodiment 2

Embodiment 2 will be described with reference to FIGS. 12 to 25. Since the whole configuration of the elliptic curve cryptosystem 800 according to the present Embodiment is the same as that described in Embodiment 1 with reference to FIG. 1, explanation thereof is herein omitted. Moreover, since the appearance and the hardware resources of the elliptic curve cryptographic parameter generator 100 according to the present Embodiment are the same as those of the elliptic curve cryptographic processor 200 described in Embodiment 1 with reference to FIGS. 2 and 3, explanation thereof is herein omitted.

Since the number of the elliptic curve cryptographic parameter generators 100 is much fewer than that of the elliptic curve cryptographic processors 200 and the generator 100 is included in the center 300 etc., it is presumed that the performance of the processing device belonging to the elliptic curve cryptographic parameter generator 100 is higher than that of the processing device belonging to the elliptic curve cryptographic processor 200.

FIG. 12 is a configuration block diagram showing a configuration example of an internal block of the elliptic curve cryptographic parameter generator 100 described in the present Embodiment.

The elliptic curve cryptographic parameter generator 100 includes a prime number generation unit 110, a group order suitability judgment unit 120, a group order candidate output unit 130, a group order selection unit 140, a group order output unit 150, a group order input unit 160, an extension degree input unit 170, a finite field order determination unit 180, a finite field order output unit 190, etc.

Using the processing device, the prime number generation unit 110 generates a prime number r which might be used as a group order of the additive group E(GF(q)). The prime number generation unit 110 stores the generated prime number r in the storage device.

The group order suitability judgment unit 120 reads the prime number r generated by the prime number generation unit 110, from the storage device. Using the processing device, the group order suitability judgment unit 120 judges whether the read prime number r is suitable as a group order of the additive group E(GF(q)) or not. The group order suitability judgment unit 120 stores a judgment result in the storage device.

The group order candidate output unit 130 reads the prime number r generated by the prime number generation unit 110 and the judgment result judged by the group order suitability judgment unit 120, from the storage device. Using the processing device, the group order candidate output unit 130 selects a prime number r which the group order suitability judgment unit 120 judged to be suitable as a group order of the additive group E(GF(q)). Using the output device, the group order candidate output unit 130 outputs the selected prime number r as a group order candidate.

The group order selection unit 140 selects a group order r to be used as a group order of the additive group E(GF(q)), from the group order candidates output by the group order candidate output unit 130. The group order selection unit 140 stores the selected group order r in the storage device. For example, the group order selection unit 140 selects a group order r by the method that the group order candidate output unit 130 displays group order candidates by using the display unit 901 (an example of the output device) and then an administrator selects a group order r from the displayed group order candidates and feeds it. Alternatively, the group order selection unit 140 may select a group order r at random from the group order candidates output by the group order candidate output unit 130.

The group order output unit 150 reads the group order r selected by the group order selection unit 140, from the storage device. The group order output unit 150 outputs the read group order r, by using the output device. For example, the group order output unit 150 transmits the group order r to the elliptic curve cryptographic processor 200 through the Internet.

Using the input device, the group order input unit 160 inputs the group order r selected by the group order selection unit 140. The group order input unit 160 stores the input group order r in the storage device.

Using the input device, the extension degree input unit 170 inputs an extension degree k of a finite field K'=GF($q^k$) which is an extension field of the finite field K=GF(q). The extension degree input unit 170 stores the input extension degree k in the storage device.

The finite field order determination unit 180 reads the group order r input by the group order input unit 160 and the extension degree k input by the extension degree input unit 170, from the storage device. Using the processing device, the finite field order determination unit 180 determines an order q of the finite field GF(q), based on the read group order r and extension degree k. The finite field order determination unit 180 stores the determined order q of the finite field GF(q) in the storage device.

The finite field order output unit 190 reads the order q of the finite field GF(q) determined by the finite field order determination unit 180, from the storage device. Using the output device, the finite field order output unit 190 outputs the read order q of the read finite field GF(q). For example, the finite field order output unit 190 transmits the order q of the finite field GF(q) to the elliptic curve cryptographic processor 200 through the Internet.

As described in Embodiment 1, the elliptic curve cryptographic parameter generator 100 according to the present Embodiment is an apparatus for generating an elliptic curve cryptographic parameter which can be set in the elliptic curve cryptographic processor 200 that is specialized in a specific group order r or a group order r having a specific form so as to perform elliptic curve pairing computation at high speed.

First, there will be described conditions of the group order r, for changing the extension degree k flexibly without changing the fixed group order r.

It is required for $q^k-1$ to be in multiples of r so that the pairing of a point on the elliptic curve E over the finite field GF(q) may have a value in the finite field GF($q^k$) which is the k-th degree extension field of the finite field GF(q). For this, since the multiplicative group GF(r) of the finite field GF(r) needs to have a primitive k-th root of unity, it is necessary for r−1 to be in multiples of k.

Therefore, what is necessary for changing the extension degree k flexibly while keeping the group order r fixed is just to select the group order r so that r−1 may have divisors as many as possible. As explained in Embodiment 1, since the elliptic curve pairing computation can be performed at high speed when the extension degree k is an even number, it is set so that 2, 4, 6, . . . can be selected as the extension degree k, for example.

FIG. 13 shows a flowchart describing a flow example of group order suitability judgment processing by the group order suitability judgment unit 120 described in the present Embodiment.

As a premise, the range where the extension degree k is changed is defined to be an even number of $2 \leq k \leq 2k_{max}$ ($k_{max}$ being an integer greater than or equal to 2). It is also acceptable to predetermine a specific value as the integer $k_{max}$, or to input it through the input device so as to store it in the storage device.

In S381, the group order suitability judgment unit 120 inputs the prime number r generated by the prime number generation unit 110. The group order suitability judgment unit 120 stores the input prime number r in the storage device.

In S382, the group order suitability judgment unit 120 reads the prime number r input in S381, from the storage device. The group order suitability judgment unit 120 calculates an integer (r−1)/2 by using the processing device. Since r is a prime number greater than or equal to 3, (r−1)/2 is an integer. The group order suitability judgment unit 120 allocates a storage region for storing an integer r' and stores the calculated integer (r−1)/2 in the storage device, as the integer r'.

In S383, the group order suitability judgment unit 120 allocates a storage region for storing an integer k and stores an integer 2 in the storage device, as the integer k.

In S384, the group order suitability judgment unit 120 reads the integer k, and the integer r' calculated in S382, from the storage device. Using the processing device, the group order suitability judgment unit 120 checks whether the read integer r' is in multiples of the read integer k or not. If r' is in multiples of k, it goes to S385. If r' is not in multiples of k, it goes to S388.

In S385, the group order suitability judgment unit 120 reads the integer k from the storage device. Using the processing device, the group order suitability judgment unit 120 calculates an integer k+1 by adding 1 to the integer k. The group order suitability judgment unit 120 stores the calculated integer k+1 in the storage device, as a new integer k.

In S386, the group order suitability judgment unit 120 reads the integer k calculated in S385, from the storage device. Using the processing device, the group order suitability judgment unit 120 judges whether the integer k is equal to less than an integer $k_{max}$ or not. When $k \leq k_{max}$, it returns to S384, and when $k > k_{max}$, it goes to S387.

In S387, the group order suitability judgment unit 120 judges that the prime number r is suitable as a group order. That is, the group order suitability judgment unit 120 generates data (for example, a character string "OK", a Boolean value "1", etc.) which indicates a judgment result that the prime number r is suitable as a group order, by using the processing device. The group order suitability judgment unit 120 stores the generated data (judgment result) in the storage device. Then, it goes to S389.

In S388, the group order suitability judgment unit 120 judges that the prime number r is not suitable as a group order. That is, the group order suitability judgment unit 120 generates data (for example, a character string "NG", a Boolean value "0", etc.) which indicates a judgment result that the prime number r is not suitable as a group order, by using the processing device. The group order suitability judgment unit 120 stores the generated data (judgment result) in the storage device.

In S389, the group order suitability judgment unit 120 reads the judgment result from the storage device. The group order suitability judgment unit 120 outputs the read judgment result.

Thereby, when r−1 has all the even numbers less than or equal to $2k_{max}$ as divisors, the group order suitability judgment unit 120 judges the prime number r to be suitable as a group order, and in other case, judges the prime number r not to be suitable as a group order.

In this case, it is presumed that the minimum of the extension degree k is 2, and the judgment criterion is whether having all the even numbers less than or equal to $2k_{max}$ as divisors or not. However, when the extension degree k which can secure the security of encryption to the minimum is $2k_{min}$ ($k_{min}$ is an integer greater than or equal to 2. $k_{min} < k_{max}$), the judgment criterion may be whether having all the even numbers from greater than or equal to $2k_{min}$ to less than or equal to $2k_{max}$ as divisors or not. In that case, what is necessary is just to store $k_{min}$ as an initial value of the integer k in S283.

Moreover, for judging whether the integer r' is in multiples of the integer k or not in S284, the integer r' may be previously factorized into prime factors.

FIG. 14 is a flowchart showing a flow example of processing for calculating a group order candidate by the elliptic curve cryptographic parameter generator 100 described in the present Embodiment.

As a premise, it is presumed that the values of the integer $c_1$ (equals the difference between the bit length of the integer λ and 1) and the integer $k_{max}$ are predetermined. Alternatively, they may be input through the input device and stored in the storage device. Moreover, the Hamming weight of the integer λ is presumed to be 2. Therefore, $\lambda = 2^{c_1} + 2^{c_2}$ ($c_1$ and $c_2$ are integers greater than or equal to 0. $c_1 > c_2$). However, since it is merely an example, the Hamming weight of λ may be a value other than 2. Moreover, it is also acceptable to configure so that the Hamming weight of λ may be variable, by inputting through the input device and storing in the storage device.

In S301, the prime number generation unit 110 allocates a storage region for storing the integer $c_2$ and stores an integer 0 in the storage device, as the integer $c_2$.

In S302, the prime number generation unit 110 reads the integer $c_2$ from the storage device. The prime number generation unit 110 calculates an integer $2^{c_1} + 2^{c_2}$ by using the processing device. The prime number generation unit 110 allocates a storage region for storing the integer λ and stores the calculated integer $2^{c_1} + 2^{c_2}$ in the storage device, as the integer λ.

In S303, the prime number generation unit 110 reads the integer λ generated in S302, from the storage device. The prime number generation unit 110 calculates an integer $\lambda^2 + \lambda + 1$ by using the processing device. The prime number generation unit 110 allocates a storage region for storing an integer r, and stores the calculated integer $\lambda^2 + \lambda + 1$ in the storage device, as the integer r.

In S304, the prime number generation unit 110 reads the integer r generated in S303, from the storage device. Using the processing device, the prime number generation unit 110 checks whether the read integer r is a prime number or not. When the integer r is not a prime number, it goes to S307. When the integer r is a prime number, it goes to S305.

In S305, the group order suitability judgment unit 120 reads the integer r (prime number r) generated by the prime number generation unit 110 in S303, from the storage device and inputs it. Using the processing device, the group order suitability judgment unit 120 judges whether the input prime number r is suitable as a group order or not. If it is judged that the prime number r is not suitable as a group order, it goes to S307. If it is judged that the prime number r is suitable as a group order, it goes to S306.

In S306, the group order candidate output unit 130 reads the prime number r generated by the prime number generation unit 110 in S303, from the storage device. Using the output device, the group order candidate output unit 130 outputs the read prime number r as a group order candidate.

In S307, the prime number generation unit 110 reads the integer $c_2$ from the storage device. Using the processing device, the prime number generation unit 110 calculates an integer $c_2 + 1$ by adding 1 to the integer $c_2$. The prime number generation unit 110 stores the calculated integer $c_2 + 1$ in the storage device, as a new integer $c_2$.

In S308, the prime number generation unit 110 reads the integer $c_2$ calculated in S307, from the storage device. Using the processing device, the prime number generation unit 110 checks whether the read integer $c_2$ is smaller than the integer $c_1$ or not. If $c_2 < c_1$, it returns to S302. If $c_2 \geq c_1$, the processing ends.

In this example, the case of calculating a candidate for the group order r being $r = \lambda^2 + \lambda + 1$ is explained, because this is for calculating a candidate for a group order to be set in the elliptic curve cryptographic processor 200 that performs elliptic curve pairing computation at high speed by being specialized in the group order r of such a specific form.

In the case of the elliptic curve cryptographic processor 200 being specialized in a group order r of other form, the integer r is calculated using a relational expression of r and λ corresponding to the case. That is, for example, if r=f(λ) is used as the relational expression of r and λ, f(λ) is a value obtained by substituting the integer λ into a quadratic polynomial-f(x)=$ax^2$+bx+c (a, b, and c being integers), namely $f(\lambda)=a\lambda^2+b\lambda+c$), the following processing S303a will be performed instead of calculating $r=\lambda^2+\lambda+1$ in S303.

In S303a, the prime number generation unit 110 reads the integer $\lambda$ generated in S302, from the storage device. The prime number generation unit 110 calculates an integer $a\lambda^2+b\lambda+c$ by using the processing device. The prime number generation unit 110 allocates a storage region for storing the integer r, and stores the calculated integer $a\lambda^2+b\lambda+c$ in the storage device, as the integer r.

The coefficients a, b, and c of the quadratic polynomial f(x) may be predetermined constants. Alternatively, it is also acceptable that the coefficients a, b, and c are input through the input device to be stored in the storage device previously, and that the prime number generation unit 110 reads the stored coefficients a, b, and c from the storage device and calculates an integer $a\lambda^2+b\lambda+c$ based on the read coefficients a, b, and c in S303.

The quadratic polynomial f(x) may be, for example, $f(x)=x^2+1$, to be corresponding to the form of the group order r in which the elliptic curve cryptographic processor 200 is specialized. Alternatively, it may be a quadratic polynomial having other integers as coefficients.

Although the case of calculating a candidate for the group order r being $r=\lambda^2+\lambda+1$ is explained in this example, r may be a prime factor of $\lambda^2+\lambda+1$ (or $f(\lambda)$). In that case, the following processing S304a will be performed for example, instead of judging whether r is a prime number or not in S304.

In S304a, the prime number generation unit 110 reads the integer r generated in S303, from the storage device. The prime number generation unit 110 factorizes the read integer r into prime factors by using the processing device. The prime number generation unit 110 selects the largest prime number from the prime factorization of the integer r by using the processing device. Then, the prime number generation unit 110 stores the selected prime number in the storage device, as the prime number r.

When r is a prime factor of $f(\lambda)$, it is preferable for a quotient $n=f(\lambda)/r$, which is obtained by dividing $f(\lambda)$ by r, to be a small integer. In that case, as the processing of S304, the following processing S304b and S304c are added after the processing of S304a, for example.

In S304b, the prime number generation unit 110 reads the integer $\lambda$ calculated in S303 and the prime number r selected in S304a, from the storage device. The prime number generation unit 110 calculates $f(\lambda)/r$ by using the processing device. The prime number generation unit 110 allocates a storage region for storing the quotient n being an integer, and stores the calculated $f(\lambda)/r$ in the storage device, as the quotient n.

In S304c, the prime number generation unit 110 reads the quotient n calculated in S304b, from the storage device. Using the processing device, the prime number generation unit 110 judges whether the read quotient n is equal to less than a predetermined integer $n_{max}$ or not. When judged to be $n \leq n_{max}$, it goes to S305, and when judged to be $n > n_{max}$, it goes to S307.

In S304b, instead of calculating $f(\lambda)/r$, it is also acceptable to calculate the quotient n by multiplying prime factors other than r calculated in S304a. The predetermined integer $n_{max}$ in S304c may be a predetermined constant, and alternatively, $n_{max}$ may be input through the input device and stored in the storage device.

The group order selection unit 140 selects a group order r to be actually set in the elliptic curve cryptographic processor 200, from the group order candidates calculated and output through the processing of group order candidate calculation explained above. Then, the group order output unit 150 outputs the group order r selected by the group order selection unit 140.

The elliptic curve cryptographic processor 200 inputs the group order r output by the group order output unit 150 by using the input device, stores it as one of the elliptic curve cryptographic parameters by using the storage device, and performs addition of a point on the elliptic curve and computation of the elliptic curve pairing, based on the stored group order r, by using the processing device. Alternatively, it is also acceptable, based on the group order r output by the group order output unit 150, to manufacture the elliptic curve cryptographic processor 200 that performs elliptic curve pairing computation at high speed by being specialized in the group order r. In that case, although it becomes impossible to change the group order r afterwards, the level of the security of encryption can be changed later by changing the extension degree k.

Next, it will be described the processing of generating the order q of the finite field GF(q), which is one of the elliptic curve cryptographic parameters, by the elliptic curve cryptographic parameter generator 100.

After determining the group order r by the processing explained above, the extension degree k is determined based on the level of the security of the elliptic curve cryptography used by the elliptic curve cryptographic processor 200. The extension degree input unit 170 inputs the extension degree k through the input device. The extension degree k may be defined by the administrator of the elliptic curve cryptography to be input into the extension degree input unit 170. Alternatively, it is also acceptable to have a danger detector for detecting a danger of an attack on the elliptic curve cryptography, and to have a device which changes the extension degree k and inputs it into the extension degree input unit 170 when the danger detector judges that danger of the attack increases.

FIG. 15 is a flowchart showing a flow example of processing of determining a finite field order by the finite field order determination unit 180 described in the present Embodiment. An algorithm called the Cocks-Pinch method is used in the flow of processing herein explained.

As a premise, the extension degree k, the group order r, and an integer D are stored in the storage device. It is presumed that the integer D is a quadratic residue modulo group order r, and its remainder when divided by 4 is 1. Moreover, it is presumed that the group order r is a prime number, the remainder when dividing the group order r by k is 1, and the extension degrees k is an even number greater than or equal to 2.

In S401, using the processing device, the finite field order determination unit 180 calculates a primitive k-th root of unity in the multiplicative group GF(r) of the finite field GF(r). The finite field order determination unit 180 allocates a storage region for storing a value g in the finite field GF(r), and stores the calculated primitive k-th root of unity in the storage device, as the value g.

Since the order r−1 of the multiplicative group GF(r)* is in multiples of k, the primitive k-th root of unity certainly exists in the multiplicative group GF(r)*. In k k-th roots of unity in the multiplicative group GF(r), a plurality of primitive k-th roots of unity exist. Then, any one of the plurality of primitive k-th roots of unity may be selected.

In S402, the finite field order determination unit 180 reads the value g calculated in S401, from the storage device. Using the processing device, the finite field order determination unit 180 calculates a value g/2 in the finite field GF(r) by dividing the read value g by 2. The finite field order determination unit 180 allocates a storage region for storing an integer ω, and stores the calculated value g/2 in the finite field GF(r) in the storage device, as the integer ω. Since the group order r is a prime number, the value in the finite field GF(r) can be treated as an integer.

In S403, the finite field order determination unit 180 reads the integer D and the integer ω calculated in S402, from the storage device. Using the processing device, the finite field order determination unit 180 calculates a value $(2\omega-1)/\sqrt{D}$ in the finite field GF(r). In this case, since the integer D is a quadratic residue modulo group order r, $\sqrt{D}$ is a value in the finite field GF(r). Therefore, the value $(2\omega-1)/\sqrt{D}$ can be calculated by using the four arithmetic operations in the finite field GF(r). The finite field order determination unit 180 allocates a storage region for storing an integer $f_0$, and stores the calculated value $(2\omega-1)/\sqrt{D}$ in the finite field GF(r) in the storage device, as the integer $f_0$.

In S404, the finite field order determination unit 180 allocates a storage region for storing an integer j and stores an integer 1 in the storage device, as the integer j.

In S405, using the storage device, the finite field order determination unit 180 reads the group order r, the integer D, the integer j, the integer ω calculated in S402, and the integer $f_0$ calculated in S403, from the storage device. Using the processing device, the finite field order determination unit 180 calculates an integer $\omega 2+\omega+(1-(f_0+j\times r)^2 \times D)/4$. Since the remainder obtained by dividing D by 4 is 1, $(1-(f_0+j\times r)^2 \times D)/4$ is an integer. The finite field order determination unit 180 allocates a storage region for storing an integer p, and stores the calculated integer $\omega^2+\omega+(1-(f_0+j\times r)^2 \times D)/4$ in the storage device, as the integer p.

In S406, the finite field order determination unit 180 reads the integer p calculated in S405, from the storage device. Using the processing device, the finite field order determination unit 180 checks whether the read integer p is a prime number or not. If the integer p is not a prime number, it goes to S408. If the integer p is a prime number, it goes to S407.

In S407, the finite field order determination unit 180 reads the integer p (prime number p) calculated in S405, from the storage device. Using the processing device, the finite field order determination unit 180 judges whether the read prime number p is suitable for high-speed calculation or not. When it is judged that the prime number p is unsuitable for the high-speed calculation, it goes to S408. When it is judged that the prime number p is suitable for the high-speed calculation, it goes to S409. Details of the judgment will be described later.

In S408, the finite field order determination unit 180 reads the integer j, from the storage device. Using the processing device, the finite field order determination unit 180 calculates an integer j+1 by adding 1 to the read integer j. The finite field order determination unit 180 stores the calculated integer j+1 in the storage device, as a new integer j. Then, it returns to S405.

In S409, the finite field order determination unit 180 determines the prime number p as the order q of the finite field GF(q). The finite field order determination unit 180 allocates a storage region for storing the order q of the finite field GF(q) and stores the prime number p in the storage device, as the order q of the finite field GF(q).

In S410, the finite field order determination unit 180 reads the integer C calculated in S402, from the storage device. Using the processing device, the finite field order determination unit 180 calculates an integer 2ω by doubling the integer ω. The finite field order determination unit 180 allocates a storage region for storing an integer t and stores the calculated integer 2ω in the storage device, as the integer t.

Since the integer j gradually increases from 1 in this example, the minimum p that satisfies conditions is determined as the order q. However, when desired to make the bit number of the order q be close to a predetermined bit number from a viewpoint of the security design of the elliptic curve cryptography, it is possible to determine p having the number of bits close to a desired number of bits as the order q by setting the initial value of the integer j to be an appropriate value.

Moreover, although the prime number p is determined as the order q of the finite field GF(q) in this example, it is also acceptable for the order q of the finite field GF(q) to be a value obtained by exponentiating the prime number p (that is $p^n$. n is an integer greater than or equal to 2).

Although the order q of the finite field GF(q) is determined by the Cocks-Pinch method in this example, it is also acceptable to determine the order q of the finite field GF(q) based on other algorithms.

Next, the processing of judging whether the prime number p is suitable for high-speed calculation in S407 will be described in detail. As explained in Embodiment 1, $pol(x)=x^k-\gamma$ is used as an irreducible polynomial in order to calculate the multiplication in the finite field $GF(q^k)$ at high speed. The irreducible polynomial pol(x) herein must be irreducible in the finite field GF(q), that is, its condition is that an element x of the finite field GF(q) satisfying $pol(x)=x^k-\gamma=0$ does not exist.

Supposing that the multiplicative order of the element γ in the finite field GF(q) is L, the necessary and sufficient condition for $x^k-\gamma$ to be irreducible in the finite field GF(q) is as follows:

(1) All the prime factors of the extension degree k should be divisors of the order L of γ
(2) No prime factors of the extension degree k are divisors of (q−1)/L
(3) When the extension degree k is in multiples of 4, q−1 should also be in multiples of 4

When all the three conditions stated above are satisfied, $x^k-\gamma$ is irreducible in the finite field GF(q).

Therefore, the finite field order determination unit 180 judges whether the prime number p is suitable for high-speed calculation or not, by judging whether the element γ of the finite field GF(q) satisfying the above three conditions exists or not.

FIG. 16 is a flowchart showing a flow example of processing of judging suitability for high-speed calculation, by the finite field order determination unit 180 described in the present Embodiment.

In S481, the finite field order determination unit 180 reads the extension degree k from the storage device. Using the processing device, the finite field order determination unit 180 factorizes the extension degree k into prime factors and obtains all the prime factors of the extension degree k. That is, $\pi_i$ satisfying $k=\Pi(\pi_i^{a_i})$ (where i is an integer of from 0 to v−1, v is an integer greater than or equal to 1, $\pi_i$ is a prime number, and $a_i$ is an integer greater than or equal to 1) is calculated. The finite field order determination unit 180 allocates a storage region for storing an integer v and v number of integers $\pi_i$ and stores the obtained v of the number of the prime factors and prime factor $\pi_i$ in the storage device. Since the extension degree k is an even number, 2 is contained in the prime factors of k. It is herein supposed to be $\pi_0=2$.

In S482, the finite field order determination unit 180 reads v being the number of prime factors obtained in S481 and v number of prime factors $\pi_i$ from the storage device. Using the processing device, the finite field order determination unit 180 calculates $\Pi(\pi_i)$ being a product of prime factors $\pi_i$ of the extension degree k (i being an integer of from 0 to v−1). The finite field order determination unit 180 allocates a storage region for storing the integer Π, and stores the calculated product $\Pi(\pi_i)$ in the storage device, as the integer Π.

In S483, the finite field order determination unit 180 reads the extension degree k from the storage device. Using the processing device, the finite field order determination unit 180 judges whether the extension degree k is in multiples of 4 or not. When the extension degree k is in multiples of 4, it goes to S484. When the extension degree k is not in multiples of 4, it goes to S485.

In S484, the finite field order determination unit 180 reads the integer Π calculated in S482, from the storage device. Using the processing device, the finite field order determination unit 180 calculates an integer 2Π by doubling the read integer Π. The finite field order determination unit 180 stores the calculated integer 2Π in the storage device, as a new integer Π.

In S485, the finite field order determination unit 180 reads the prime number p from the storage device. Using the processing device, the finite field order determination unit 180 calculates an integer p−1 by subtracting 1 from the read prime number p. The finite field order determination unit 180 allocates a storage region for storing an integer p' and stores the calculated integer p−1 in the storage device, as the integer p'.

In S486, the finite field order determination unit 180 reads the integer Π and the integer P' calculated in S485, from the storage device. Using the processing device, the finite field order determination unit 180 calculates a quotient N and a remainder M by dividing the integer p' by the integer Π. That is, N and M satisfying p'=Π×N+M (N and M are integers. 0≦M<N) are calculated. The finite field order determination unit 180 allocates a storage region for storing the integers N and M, and stores the calculated quotient N and remainder M in the storage device.

In S487, the finite field order determination unit 180 reads the remainder M calculated in S486, from the storage device. Using the processing device, the finite field order determination unit 180 judges whether the read remainder M is 0 or not. When the remainder M is 0, it goes to S488. When the remainder M is not 0, it goes to S493.

In S488, the finite field order determination unit 180 allocates a storage region for storing an integer i and stores an integer 0 in the storage device, as the integer i.

In S489, the finite field order determination unit 180 reads the integer i, the i-th prime factor $\pi_i$ in the prime factors obtained in S481, and the quotient N calculated in S486, from the storage device. Using the processing device, the finite field order determination unit 180 judges whether the quotient N is in multiples of the prime factor $\pi_i$ or not. When N is in multiples of $\pi_i$, it goes to S493. When N is not in multiples of $\pi_i$, it goes to S490.

In S490, the finite field order determination unit 180 reads the integer i from the storage device. Using the processing device, the finite field order determination unit 180 calculates an integer i+1 by adding 1 to the integer i. The finite field order determination unit 180 stores the calculated integer i+1 in the storage device, as a new integer i.

In S491, the finite field order determination unit 180 reads v being the number of prime factors obtained in S481, and the integer i calculated in S490, from the storage device. Using the processing device, the finite field order determination unit 180 judges whether the integer i is smaller than v being the number of prime factors or not. When i<v, it returns to S489. When i≧v, it goes to S492.

In S492, the finite field order determination unit 180 judges that the prime number p is suitable for high-speed calculation, by using the processing device. That is, it generates data (for example, a character string "OK", a Boolean value "1", etc.) which indicates a judgment result that the prime number p is suitable for high-speed calculation. The finite field order determination unit 180 stores the data indicating the judgment result in the storage device. Then, the processing of judging the suitability for high-speed calculation is ended.

In S493, the finite field order determination unit 180 judges that the prime number p is not suitable for high-speed calculation, by using the processing device. That is, it generates data (for example, a character string "NG", a Boolean value "0", etc.) which indicates a judgment result that the prime number p is not suitable for high-speed calculation. The finite field order determination unit 180 stores the data indicating the judgment result in the storage device. Then, the processing of judging the suitability for high-speed calculation is ended.

In the processing described above, it is checked in S487 with respect to the above explained condition (1): all the prime factors of the extension degree k should be divisors of the multiplicative order L of γ. The order L of the element of the multiplicative group GF(q)* is a divisor of the order q−1 of the multiplicative group GF(q). With respect to each of all the divisors of the order q−1 of the multiplicative group GF(q)*, there exists an element of the multiplicative group GF(q)* whose order is the divisor concerned. Therefore, when the remainder M of dividing the integer p'(=p−1) by the integer Π is 0, an element γ of the multiplicative group GF(q)* whose order is the integer Π exists. Since the integer Π herein is a product of all the prime factors of the extension degree k, all the prime factors of the extension degree k are divisors of the order L(=Π) of the element γ of the multiplicative group GF(q)*.

When the extension degree k is in multiples of 4, the integer Π is doubled in S484. Then, the integer Π is in multiples of 4. Therefore, when the remainder M of dividing the integer p' (=p−1) by the integer Π is 0, the integer p' (=p−1) is in multiples of 4. That is, in S487, it is simultaneously checked with respect to the above explained condition (3): q−1 should also be in multiples of 4 when the extension degree k is in multiples of 4.

In the processing from S488 to S491, it is checked with respect to the above explained condition (2): none of the prime factors of the extension degree k are divisors of (q−1)/L. That is, it is checked none of the prime factors of the extension degree k are divisors of the quotient N (=(p−1)/Π) with respect to the element γ of the multiplicative group GF(q)* whose order L is Π, which has been checked in S487.

When all the three conditions explained above are satisfied in the above processing, the finite field order determination unit 180 judges that the prime number p is suitable for high-speed calculation, as the order q of the finite field GF(q).

Since $x^k - \gamma$ is irreducible in the finite field GF(q) when all the three conditions explained above are satisfied, multiplication in the finite field $GF(q^k)$ can be performed at high speed. In performing the elliptic curve pairing computation, for example, as described in the processing of S242 of FIG. 10, it is necessary to exponentiate a value in the finite field $GF(q^k)$. In the case of realizing the exponentiation by the processing device, such as a computer, it can be achieved by repeating the multiplication in the finite field $GF(q^k)$ Therefore, if it is possible to perform the multiplication in the finite field $GF(q^k)$ at high speed, the elliptic curve pairing computation can be greatly sped up.

The processing of judging the suitability for high-speed calculation explained above is merely an example. As long as it is judged whether the prime number p is suitable for high-speed calculation or not by judging whether the element γ of GF(q) satisfying the three conditions explained above exists or not, other processing method can also be applicable.

The case of the candidate q for the order of the finite field GF(q) being the prime number p is described in this example. Moreover, the candidate q for the order of the finite field GF(q) may be an exponentiated value ($p^n$) of the prime number p.

Moreover, in this example, only the existence of the element γ of the finite field GF(q) is checked. In addition, the smaller the element γ of the finite field GF(q) is, the faster the multiplication in the finite field $GF(q^k)$ can be performed. Therefore, it is also acceptable to calculate the element γ of the finite field GF(q) so as to judge whether its coefficient is small or not, and to conclude that it is suitable for high-speed calculation when small.

The processing that the elliptic curve cryptographic parameter generator 100 generates the order q of the finite field GF(q) has been described above.

In addition to this, the elliptic curve cryptographic parameter generator 100 generates elliptic curve cryptographic parameters, such as the coefficients a and b of the elliptic curve E. As to the method for computing these the elliptic curve cryptographic parameters based on the order q of the finite field GF(q) and the group order r of the additive group E(GF(q)), since there is an existing method, no explanation is given here.

In the elliptic curve cryptographic parameter generator 100 according to the present Embodiment, the prime number generation unit 110 generates a prime number r, the group order suitability judgment unit 120 judges whether the prime number r generated by the prime number generation unit 110 is suitable as a group order of the additive group E(K) composed of points on the elliptic curve E over the finite field K=GF(q), and the group order candidate output unit 130 outputs the prime number r which has been judged to be suitable, as a candidate for a group order. Thus, it has an effect of obtaining a candidate for a group order which can easily change the level of the security of elliptic curve cryptography.

In the elliptic curve cryptographic parameter generator 100 according to the present Embodiment, when a natural number r−1 has all the natural numbers k in a predetermined range as divisors, it is judged that a prime number r is suitable as a group order of the additive group E(K) composed of points on the elliptic curve E over the finite field K=GF(q), thereby capable of setting a natural number k in the predetermined range as an extension degree k of the extension field K'=GF($q^k$) of the finite field K to the elliptic curve cryptographic processor 200. Thus, it has an effect of obtaining a candidate for a group order that can easily change the level of the security of elliptic curve cryptography.

In the elliptic curve cryptographic parameter generator 100 according to the present Embodiment, when a natural number r−1 has all the natural numbers k in the range of even numbers from equal to or greater than 2 to equal to or less than a predetermined threshold $2k_{max}$, as divisors, it is judged that a prime number r is suitable as a group order of the additive group E(K) composed of points on the elliptic curve E over the finite field K=GF(q), thereby capable of setting an extension degree which can speed up the elliptic curve pairing computation to the elliptic curve cryptographic processor 200, as an extension degree k of the extension field K'=GF($q^k$) of the finite field K. Thus, it has an effect of obtaining a candidate for a group order that can easily change the level of the security of elliptic curve cryptography.

In the elliptic curve cryptographic parameter generator 100 according to the present Embodiment, a prime number r whose Hamming weight is less than or equal to a predetermined value is output as a candidate for a group order. Thus, it has an effect of performing elliptic curve pairing computation at high speed in the elliptic curve cryptographic processor 200.

In the elliptic curve cryptographic parameter generator 100 according to the present Embodiment, a prime number r being a prime factor of an integer $f(\lambda)=a\lambda^2+b\lambda+c$, which is obtained by substituting a natural number A into a predetermined quadratic polynomial $f(x)=ax^2+bx+c$ (a, b, and c being integers), is output as a candidate for a group order. Thus, it has an effect of obtaining a candidate for a group order which can be set to the elliptic curve cryptographic processor 200 that can perform elliptic curve pairing computation at high speed by being specialized in the group order of the form corresponding to the quadratic polynomial f(x) mentioned above.

In the elliptic curve cryptographic parameter generator 100 according to the present Embodiment, a prime number r whose quotient n obtained by dividing the integer f(λ) by the prime number r is less than or equal to a predetermined integer is output as a candidate for a group order. Thus, it has an effect of obtaining a candidate for a group order which can be set to the elliptic curve cryptographic processor 200 that can perform elliptic curve pairing computation at high speed by being specialized in the group order of the form corresponding to the quadratic polynomial f(x) mentioned above.

In the elliptic curve cryptographic parameter generator 100 according to the present Embodiment, a prime number r calculated by using $x^2+x+1$ or $x^2+1$ as the quadratic polynomial f(x) is output as a candidate for a group order. Thus, it has an effect of obtaining a candidate for a group order which can be set to the elliptic curve cryptographic processor 200 that can perform elliptic curve pairing computation at high speed by being specialized in the group order of the form corresponding to the quadratic polynomial f(x) mentioned above.

In the elliptic curve cryptographic parameter generator 100 according to the present Embodiment, a natural number whose Hamming weight is small is generated as the natural number λ and a prime number r calculated based on the generated natural number is output as a candidate for a group order. Thus, it has an effect of obtaining a candidate for a group order which can be set to the elliptic curve cryptographic processor 200 that can perform elliptic curve pairing computation at high speed by being specialized in the group order of the form corresponding to the quadratic polynomial f(x) mentioned above.

In the elliptic curve cryptographic parameter generator 100 according to the present Embodiment, the prime number generation unit 110 generates a prime number r which can be set as a group order to the elliptic curve cryptographic processor 200 that can perform elliptic curve pairing computation at high speed by being specialized in a group order having a specific form. Thus, it has an effect of performing elliptic curve pairing computation at high speed in the elliptic curve cryptographic processor 200, by being specialized in the group order having the specific form.

In the elliptic curve cryptographic parameter generator 100 according to the present Embodiment, the prime number generation unit 110 generates a prime number r which can be set as a group order to the elliptic curve cryptographic processor 200 that can perform elliptic curve pairing computation at high speed by utilizing an endomorphism mapping φ on the elliptic curve E over the finite field K. Thus, it has an effect of performing elliptic curve pairing computation at high speed in the elliptic curve cryptographic processor 200 by utilizing the endomorphism mapping φ.

In the elliptic curve cryptographic parameter generator 100 according to the present Embodiment, the prime number generation unit 110 generates a prime number r which can be set as a group order to the elliptic curve cryptographic processor 200 that can perform elliptic curve pairing computation at high speed by utilizing an efficiently computable endomorphism mapping φ as the endomorphism mapping on the elliptic curve E over the finite field K. Thus, it has an effect of performing elliptic curve pairing computation at high speed in the elliptic curve cryptographic processor 200 by utilizing the endomorphism mapping φ.

In the elliptic curve cryptographic parameter generator 100 according to the present Embodiment, the prime number generation unit 110 generates a prime number r which can be set as a group order to the elliptic curve cryptographic processor 200 that can perform elliptic curve pairing computation at high speed by utilizing an endomorphism mapping φ, the absolute value of the discriminant D of the ring generated by which is small, as the endomorphism mapping on the elliptic curve E over the finite field K. Thus, it has an effect of performing elliptic curve pairing computation at high speed in the elliptic curve cryptographic processor 200 by utilizing the endomorphism mapping φ.

In the elliptic curve cryptographic parameter generator 100 according to the present Embodiment, the prime number generation unit 110 generates a prime number r which can be set as a group order to the elliptic curve cryptographic processor 200 that can perform elliptic curve pairing computation at high speed by using $Y^2=X^3+b$ as an elliptic curve over the finite field K and utilizing $\phi:(x, y) \to (\beta x, y)$ ($\beta$ being a primitive third root of unity in the finite field K) as the endomorphism mapping on the elliptic curve E. Thus, it has an effect of performing elliptic curve pairing computation at high speed in the elliptic curve cryptographic processor 200 by utilizing the endomorphism mapping φ.

In the elliptic curve cryptographic parameter generator 100 according to the present Embodiment, the prime number generation unit 110 generates a prime number r which can be set as a group order to the elliptic curve cryptographic processor 200 that can perform elliptic curve pairing computation at high speed by using $E: Y^2=X^3+aX$ as an elliptic curve over the finite field K and utilizing $\phi:(x, y) \to (-x, iy)$ (i being a primitive fourth root of unity in the finite field K) as the endomorphism mapping on the elliptic curve E. Thus, it has an effect of performing elliptic curve pairing computation at high speed in the elliptic curve cryptographic processor 200 by utilizing the endomorphism mapping φ.

In the elliptic curve cryptographic parameter generator 100 according to the present Embodiment, as a candidate for a group order, there is output a prime number r which can set a group order having the same form even when an extension degree k of the extension field $K'=GF(q^k)$ of the finite field $K=GF(q)$ in elliptic curve pairing computation is changed in a predetermined range. Thus, it has an effect of easily changing the level of the security of encryption even when using the elliptic curve cryptographic processor 200 that performs elliptic curve pairing computation at high speed by being specialized in a group order having a specific form.

In the elliptic curve cryptographic parameter generator 100 according to the present Embodiment, as a candidate for a group order, there is output a prime number r with which it is not necessary to change the group order having been set even when an extension degree k of the extension field $K'=GF(q^k)$ of the finite field $K=GF(q)$ in elliptic curve pairing computation is changed in a predetermined range. Thus, it has an effect of easily changing the level of the security of encryption even when using the elliptic curve cryptographic processor 200 that performs elliptic curve pairing computation at high speed by being specialized in a specific group order.

In the elliptic curve cryptographic parameter generator 100 according to the present Embodiment, as a candidate for a group order, there is output a prime number r with which it is not necessary to change the group order having been set even when an extension degree k of the extension field $K'=GF(q^k)$ of the finite field $K=GF(q)$ in elliptic curve pairing computation is changed in the range of even numbers equal to or greater than 2 and less than or equal to a predetermined threshold $k_{max}$. Thus, it has an effect of easily changing the level of the security of encryption even when using the elliptic curve cryptographic processor 200 that performs elliptic curve pairing computation at high speed by being specialized in a specific group order.

In the elliptic curve cryptographic parameter generator 100 according to the present Embodiment, an order q of the finite field K is determined based on the group order r of the additive group E(K) composed of points on the elliptic curve E over the finite field $K=GF(q)$ and an extension degree k of the extension field $K'=GF(q^k)$ of the finite field K in the elliptic curve pairing computation. Thus, it has an effect of easily changing the level of the security of encryption even a group order r set in the elliptic curve cryptographic processor is fixed.

In the elliptic curve cryptographic parameter generator 100 according the present Embodiment, there is determined an order q of the finite field K which can be set to the apparatus for processing elliptic curve cryptograph, which performs elliptic curve pairing computation at high speed by extending the finite field $K=GF(q)$ to the extension field $GF(q^k)$ by using a predetermined irreducible polynomial pol(x). Thus, it has an effect of performing elliptic curve pairing computation at high speed in the elliptic curve cryptographic processor 200 by using the irreducible polynomial pol(x).

In the elliptic curve cryptographic parameter generator 100 according the present Embodiment, there is determined an order q of the finite field K which can be set to the apparatus for processing elliptic curve cryptograph, which performs elliptic curve pairing computation at high speed by extending the finite field $K=GF(q)$ to the extension field $GF(q^k)$ by using $pol(x)=x^k-\gamma$ as an irreducible polynomial. Thus, it has an effect of performing elliptic curve pairing computation at high speed in the elliptic curve cryptographic processor 200.

In the elliptic curve cryptographic parameter generator 100 according to the present Embodiment, there is determined an order q of the finite field K in which y satisfying a condition that $x^k-\gamma$ is irreducible in the finite field $K=GF(q)$ exists. Thus, it has an effect of performing elliptic curve pairing computation at high speed in the elliptic curve cryptographic processor 200 by using $pol(x)=x^k-\gamma$ as an irreducible polynomial.

In the elliptic curve cryptographic parameter generator 100 according to the present Embodiment, it is judged without calculating γ whether γ satisfying a condition that $x^k-\gamma$ is irreducible in the finite field $K=GF(q)$ exists or not. Thus, it has an effect of easily determining an order q of the finite field K, by which elliptic curve pairing computation can be performed at high speed in the elliptic curve cryptographic processor 200 by utilizing $pol(x)=x^k-\gamma$ as an irreducible polynomial.

The elliptic curve cryptographic parameter generator 100 described above can be realized by causing a computer to execute a program which makes the computer function as the elliptic curve cryptographic parameter generator explained above.

The elliptic curve cryptographic parameter generation program according to the present Embodiment has an effect of obtaining a candidate for a group order which can easily change the level of the security of elliptic curve cryptography, because the prime number generation unit 110 generates a prime number r, the group order suitability judgment unit 120 judges whether the prime number r generated by the prime number generation unit 110 is suitable as a group order of the additive group E(K) composed of points on the elliptic curve E over the finite field K=GF(q), and the group order candidate output unit 130 outputs the prime number r which has been judged to be suitable, as a candidate for a group order.

The elliptic curve pairing-based cryptographic parameter generator (apparatus for generating elliptic curve cryptographic parameter) described above is characterized in that p and r, being a part of elliptic curve pairing parameters, are selected to be a group order r being capable of achieving high speed, and k|r−1 with respect to many integers k, in computing elliptic curve pairing.

The elliptic curve pairing-based cryptographic parameter generator (apparatus for generating elliptic curve cryptographic parameter) described above is further characterized in that r is selected to have small Hamming weight.

The elliptic curve pairing-based cryptographic parameter generator (apparatus for generating elliptic curve cryptographic parameter) described above is further characterized in that r is selected, with respect to an integer λ, to be a prime number when dividing a quadratic polynomial of λ with an integer coefficient by a small integer. The elliptic curve pairing-based cryptographic parameter generator (apparatus for generating elliptic curve cryptographic parameter) described above is further characterized in that r is selected, with respect to an integer λ, to be a prime number when dividing $\lambda^2+\lambda+1$ by a small integer.

The elliptic curve pairing-based cryptographic parameter generator (apparatus for generating elliptic curve cryptographic parameter) described above is further characterized in that an integer λ is selected to have small Hamming weight.

The elliptic curve pairing-based cryptographic parameter generator (apparatus for generating elliptic curve cryptographic parameter) described above is further characterized in that an integer λ is selected to have small Hamming weight.

The elliptic curve pairing-based cryptographic parameter generator (apparatus for generating elliptic curve cryptographic parameter) described above is characterized in that even if k, being a part of elliptic curve pairing parameters, is changed, high speed is maintained in computing elliptic curve pairing.

The elliptic curve pairing-based cryptographic parameter generator (apparatus for generating elliptic curve cryptographic parameter) described above is characterized in that even if k, being a part of elliptic curve pairing parameters, is changed, high speed is maintained by using the high speed calculation method utilizing a homomorphism mapping on an elliptic curve, in computing elliptic curve pairing.

The elliptic curve pairing-based cryptographic parameter generator (apparatus for generating elliptic curve cryptographic parameter) described above is further characterized by using an efficiently computable homomorphism mapping.

The elliptic curve pairing-based cryptographic parameter generator (apparatus for generating elliptic curve cryptographic parameter) described above is further characterized by using an elliptic curve, the absolute value of the discriminant D of the endomorphism ring of which is small.

The elliptic curve pairing-based cryptographic parameter generator (apparatus for generating elliptic curve cryptographic parameter) described above is further characterized by using $E:Y^2=X^3+b$ as an elliptic curve and $(x, y) \rightarrow (\beta x, y)$ (β being a third root of unity) as a homomorphism mapping.

The elliptic curve pairing-based cryptographic parameter generator (apparatus for generating elliptic curve cryptographic parameter) described above is further characterized by using $E:Y^2=X^3+aX$ as an elliptic curve and $(x, y) \rightarrow (-x, iy)$ (i being a fourth root of unity) as a homomorphism mapping.

The elliptic curve pairing-based cryptographic parameter generator (apparatus for generating elliptic curve cryptographic parameter) described above is further characterized by using q achieving high speed calculation in the extension field $GF(q^k)$.

The elliptic curve pairing-based cryptographic parameter generator (apparatus for generating elliptic curve cryptographic parameter) described above is further characterized in that q is selected to satisfy, with respect to many k, two conditions of (1) each prime factor of k is a divisor of a multiplicative order L of element γ of GF(q) which is not 0, and is not a divisor of (q−1)/L, and (2) if k is divisible by 4, q−1 is divisible by 4.

The elliptic curve pairing-based cryptographic parameter generator (apparatus for generating elliptic curve cryptographic parameter) described above is further characterized in that when $\pi_1(=2), \pi_2, \ldots, \pi_v$ are a set of prime factors of k, k and q are selected to satisfy $q \equiv 1 \bmod \pi_1^2 \pi_2 \ldots \pi_v$ if 4|k, and $q \equiv 1 \bmod \pi_1 \pi_2 \ldots \pi_v$ if not.

The elliptic curve pairing-based cryptographic processor (apparatus for processing elliptic curve cryptograph) described above is characterized in that p and r, being a part of elliptic curve pairing parameters, are selected to be a group order r being capable of achieving high speed, and k|r−1 with respect to many integers k, in computing elliptic curve pairing.

The elliptic curve pairing-based cryptographic processor (apparatus for processing elliptic curve cryptograph) described above is further characterized in that r is selected to have small Hamming weight.

The elliptic curve pairing-based cryptographic processor (apparatus for processing elliptic curve cryptograph) described above is further characterized in that r is selected, with respect to an integer λ, to be a prime number when dividing a quadratic polynomial of λ with an integer coefficient by a small integer.

The elliptic curve pairing-based cryptographic processor (apparatus for processing elliptic curve cryptograph) described above is further characterized in that r is selected, with respect to an integer λ, to be a prime number when dividing $\lambda^2+\lambda+1$ by a small integer. The elliptic curve pairing-based cryptographic processor (apparatus for processing elliptic curve cryptograph) described above is further characterized in that an integer λ is selected to have small Hamming weight.

The elliptic curve pairing-based cryptographic processor (apparatus for processing elliptic curve cryptograph) described above is further characterized in that an integer λ is selected to have small Hamming weight.

The elliptic curve pairing-based cryptographic processor (apparatus for processing elliptic curve cryptograph) described above is characterized in that even if k, being a part of elliptic curve pairing parameters, is changed, high speed is maintained in computing elliptic curve pairing.

The elliptic curve pairing-based cryptographic processor (apparatus for processing elliptic curve cryptograph) described above is characterized in that even if k, being a part of elliptic curve pairing parameters, is changed, high speed is maintained by using the high speed calculation method utilizing a homomorphism mapping on an elliptic curve, in computing elliptic curve pairing.

The elliptic curve pairing-based cryptographic processor (apparatus for processing elliptic curve cryptograph) described above is further characterized by using an efficiently computable homomorphism mapping.

The elliptic curve pairing-based cryptographic processor (apparatus for processing elliptic curve cryptograph) described above is further characterized by using an elliptic curve whose absolute value of the discriminant D of the ring generated by an endomorphism mapping is small.

The elliptic curve pairing-based cryptographic processor (apparatus for processing elliptic curve cryptograph) described above is further characterized by using $E:Y^2=X^3+b$ as an elliptic curve and $(x, y) \to (\beta x, y)$ ($\beta$ being a third root of unity) as a homomorphism mapping.

The elliptic curve pairing-based cryptographic processor (apparatus for processing elliptic curve cryptograph) described above is further characterized by using $E:Y^2=X^3+aX$ as an elliptic curve and $(x, y) \to (-x, iy)$ (i being a fourth root of unity) as a homomorphism mapping.

The elliptic curve pairing-based cryptographic processor (apparatus for processing elliptic curve cryptograph) described above is further characterized by using q achieving high speed calculation in the extension field $GF(q^k)$.

The elliptic curve pairing-based cryptographic processor (apparatus for processing elliptic curve cryptograph) described above is further characterized in that q is selected to satisfy, with respect to many k, in claim 22, two conditions of
(1) each prime factor of k is a divisor of a multiplicative order L of element γ of GF(q) which is not 0, and is not a divisor of (q−1)/L, and
(2) if k is divisible by 4, q−1 is divisible by 4.

The elliptic curve pairing-based cryptographic processor (apparatus for processing elliptic curve cryptograph) described above is further characterized in that k and q are selected so that it may be $q \equiv 1 \mod \pi_1^2 \pi_2 \ldots \pi_\nu$ if 4|k when $\pi_1(=2), \pi_2, \ldots, \pi_\nu$ are a set of prime factors of k, and $q \equiv 1 \mod \pi_1 \pi_2 \ldots \pi_\nu$ if not.

The elliptic curve pairing-based cryptographic parameter generation program (program for generating elliptic curve cryptographic parameter) described above is characterized in that p and r, being a part of elliptic curve pairing parameters, are selected to be a group order r being capable of achieving high speed, and k|r−1 with respect to many integers k, in computing elliptic curve pairing.

The elliptic curve pairing-based cryptographic parameter generation program (program for generating elliptic curve cryptographic parameter) described above is further characterized in that r is selected to have small Hamming weight.

The elliptic curve pairing-based cryptographic parameter generation program (program for generating elliptic curve cryptographic parameter) described above is further characterized in that r is selected, with respect to an integer λ, to be a prime number when dividing a quadratic polynomial of λ with an integer coefficient by a small integer.

The elliptic curve pairing-based cryptographic parameter generation program (program for generating elliptic curve cryptographic parameter) described above is further characterized in that r is selected, with respect to an integer λ, to be a prime number when dividing $\lambda^2+\lambda+1$ by a small integer.

The elliptic curve pairing-based cryptographic parameter generation program (program for generating elliptic curve cryptographic parameter) described above is further characterized in that an integer λ is selected to have small Hamming weight.

The elliptic curve pairing-based cryptographic parameter generation program (program for generating elliptic curve cryptographic parameter) described above is further characterized in that an integer λ is selected to have small Hamming weight.

The elliptic curve pairing-based cryptographic parameter generation program (program for generating elliptic curve cryptographic parameter) described above is characterized in that even if k, being a part of elliptic curve pairing parameters, is changed, high speed is maintained in computing elliptic curve pairing.

The elliptic curve pairing-based cryptographic parameter generation program (program for generating elliptic curve cryptographic parameter) described above is characterized in that even if k, being a part of elliptic curve pairing parameters, is changed, high speed is maintained by using the high speed calculation method utilizing a homomorphism mapping on an elliptic curve, in computing elliptic curve pairing.

The elliptic curve pairing-based cryptographic parameter generation program (program for generating elliptic curve cryptographic parameter) described above is further characterized by using an efficiently computable homomorphism mapping.

The elliptic curve pairing-based cryptographic parameter generation program (program for generating elliptic curve cryptographic parameter) described above is further characterized by using an elliptic curve whose absolute value of the discriminant D of the ring generated by an endomorphism mapping is small.

The elliptic curve pairing-based cryptographic parameter generation program (program for generating elliptic curve cryptographic parameter) described above is further characterized by using $E:Y^2=X^3+b$ as an elliptic curve and $(x, y) \to (\beta x, y)$ ($\beta$ being a third root of unity) as a homomorphism mapping.

The elliptic curve pairing-based cryptographic parameter generation program (program for generating elliptic curve cryptographic parameter) described above is further characterized by using $E:Y^2=X^3+aX$ as an elliptic curve and $(x, y) \to (-x, iy)$ (i being a fourth root of unity) as a homomorphism mapping.

The elliptic curve pairing-based cryptographic parameter generation program (program for generating elliptic curve cryptographic parameter) described above is further characterized by using q achieving high speed calculation in the extension field $GF(q^k)$.

The elliptic curve pairing-based cryptographic parameter generation program (program for generating elliptic curve cryptographic parameter) described above is further characterized in that q is selected to satisfy, with respect to many k, two conditions of
(1) each prime factor of k is a divisor of a multiplicative order L of element γ of GF(q) which is not 0, and is not a divisor of (q−1)/L, and
(2) if k is divisible by 4, q−1 is divisible by 4.

The elliptic curve pairing-based cryptographic parameter generation program (program for generating elliptic curve cryptographic parameter) described above is further characterized in that k and q are selected so that it may be $q \equiv 1 \mod \pi_1^2 \pi_2 \ldots \pi_\nu$ if 4|k when $\pi_1(=2), \pi_2, \ldots, \pi_\nu$ are a set of prime factors of k, and $q \equiv 1 \mod \pi_1 \pi_2 \ldots \pi_\nu$ if not.

The elliptic curve pairing-based cryptographic processing program (program for processing elliptic curve cryptograph) described above is characterized in that p and r, being a part of elliptic curve pairing parameters, are selected to be a group order r being capable of achieving high speed, and k|r−1 with respect to many integers k, in computing elliptic curve pairing.

The elliptic curve pairing-based cryptographic processing program (program for processing elliptic curve cryptograph) described above is further characterized in that r is selected to have small Hamming weight.

The elliptic curve pairing-based cryptographic processing program (program for processing elliptic curve cryptograph) described above is further characterized in that r is selected, with respect to an integer λ, to be a prime number when dividing a quadratic polynomial of λ with an integer coefficient by a small integer.

The elliptic curve pairing-based cryptographic processing program (program for processing elliptic curve cryptograph) described above is further characterized in that r is selected, with respect to an integer λ, to be a prime number when dividing $\lambda^2+\lambda+1$ by a small integer.

The elliptic curve pairing-based cryptographic processing program (program for processing elliptic curve cryptograph) described above is further characterized in that an integer λ is selected to have small Hamming weight.

The elliptic curve pairing-based cryptographic processing program (program for processing elliptic curve cryptograph) described above is further characterized in that an integer λ is selected to have small Hamming weight.

The elliptic curve pairing-based cryptographic processing program (program for processing elliptic curve cryptograph) described above is characterized in that even if k, being a part of elliptic curve pairing parameters, is changed, high speed is maintained in computing elliptic curve pairing.

The elliptic curve pairing-based cryptographic processing program (program for processing elliptic curve cryptograph) described above is characterized in that even if k, being a part of elliptic curve pairing parameters, is changed, high speed is maintained by using the high speed calculation method utilizing a homomorphism mapping on an elliptic curve, in computing elliptic curve pairing.

The elliptic curve pairing-based cryptographic processing program (program for processing elliptic curve cryptograph) described above is further characterized by using an efficiently computable homomorphism mapping.

The elliptic curve pairing-based cryptographic processing program (program for processing elliptic curve cryptograph) described above is further characterized by using an elliptic curve whose absolute value of the discriminant D of the ring generated by an endomorphism mapping is small.

The elliptic curve pairing-based cryptographic processing program (program for processing elliptic curve cryptograph) described above is further characterized by using $E:Y^2=X^3+b$ as an elliptic curve and $(x, y) \rightarrow (\beta x, y)$ (β being a third root of unity) as a homomorphism mapping.

The elliptic curve pairing-based cryptographic processing program (program for processing elliptic curve cryptograph) described above is further characterized by using $E:Y^2=X^3+aX$ as an elliptic curve and $(x, y) \rightarrow (-x, iy)$ (i being a fourth root of unity) as a homomorphism mapping.

The elliptic curve pairing-based cryptographic processing program (program for processing elliptic curve cryptograph) described above is further characterized by using q achieving high speed calculation in the extension field $GF(q^k)$.

The elliptic curve pairing-based cryptographic processing program (program for processing elliptic curve cryptograph) described above is further characterized in that q is selected to satisfy, with respect to many k, two conditions of (1) each prime factor of k is a divisor of a multiplicative order L of element γ of GF(q) which is not 0, and is not a divisor of (q−1)/L, and
(2) if k is divisible by 4, q−1 is divisible by 4.

The elliptic curve pairing-based cryptographic processing program (program for processing elliptic curve cryptograph) described above is further characterized in that k and q are selected so that it may be $q \equiv 1 \mod \pi_1^2 \pi_2 \ldots \pi_v$ if 4|k when $\pi_1$ (=2), $\pi_2, \ldots, \pi_v$ are a set of prime factors of k, and $q \equiv 1 \mod \pi_1 \pi_2 \ldots \pi_v$ if not.

For performing elliptic cryptographic pairing computation at high speed and safely, it is important to use an appropriate parameter setting method. With the proposal of a method for performing pairing computation at high speed, a method for setting parameters capable of achieving high speed has been proposed. The pairing application technology can also be achieved by using a general algebraic curve which includes a hyper elliptic curve.

With the practical use of the advanced information and communication technology in recent years, the public key cryptography including the elliptic cryptography is already put to practical use. Conventionally, however, an infrastructure called a PKI (Public Key Infrastructure) is required because of the necessity for public key authentication, which hinders the development of the public key cryptography technology to various directions. According to the Nonpatent Reference 3, the public key cryptography which makes the PKI unnecessary has been realized by using an identifier (ID), such as a name and an equipment number. For realizing that, the pairing computation on an elliptic curve is essentially important.

Since finding out that "pairing can be applied to the ID-based cryptography," it has been recognized that broad cryptography application technologies, such as a short signature, a group signature, and traitor tracing, can be achieved by using the pairing. Because of this, necessity for computing pairing at higher speed increases, and then, new proposals on methods of calculating pairing parameters at high speed and safely also increase.

Moreover, in these days, risk of encryption has been brought to attention. That is, for example, likelihood of actual attacks to the hash function SHA-1, which has been normally used, increases, and shifting from RSA-1024 to 2048 becomes necessary. Therefore, it is eagerly desired to design cryptography considering a method of shifting to an appropriate new parameter. The present Embodiment relates to a method for flexibly setting parameters that can perform such shifting smoothly.

Regarding the study for high speed pairing, the case using a supersingular elliptic curve has conventionally taken a lead in studies. However, it has been recognized that when a supersingular elliptic curve is used, the range of the curve obtained is much restricted, and thus it is preferable to use an ordinary (non-supersingular) elliptic curve from the viewpoint of flexibly changing the security. Therefore, as described in the Nonpatent Reference 1 for example, speeding up the pairing computation on an ordinary elliptic curve has also progressed, and as the result, there is reported that performance equaling or surpassing that of the supersingular elliptic curve can be attained.

Although there exist various pairing parameter generation methods, in the Nonpatent Reference 2, etc., which value to change the security level, the Cocks-Pinch method is regarded as the appropriate method. Until now, there has not been known the method of changing the security while retaining high speed even when performing pairing computation on an ordinary elliptic curve. A pairing parameter setting method for smoothly changing parameters while retaining high speed by using the Cocks-Pinch method is proposed in the present Embodiment.

A part of elliptic curve pairing parameters, p, r, and k, are given attention. These parameters are set to satisfy some mathematical relations. For changing the security, it is important to variously set the parameter k. Particularly, for achieving the fast computation method, it is necessary to enable to change k flexibly, while limiting r to some extent. In that case, it is required for r and k to satisfy the relation of k|r−1, and then it is important to select r which satisfies k|r−1 with respect to many k. The pairing application technology can also be realized by using a general algebraic curve containing a hyper elliptic curve.

The Cocks-Pinch method is used as such a pairing parameter generation method. In the Cocks-Pinch method, when r, k, and a bit length of p are input, a suitable p is output. In that case, r needs to be judged in advance whether being suitable or not from the viewpoint of changing the security.

By performing this, it becomes possible not only to realize pairing-based cryptography which can perform computation at high speed and change the security flexibly but also to change the security easily by altering the parameters p and k even when the high speed has been achieved by using a special r as described in the Nonpatent Reference 1.

Regarding the elliptic curve cryptographic parameter generator and the elliptic curve cryptographic processor explained above, the mathematical background will be further described.

The references cited below are denoted by the following reference numbers.

[1] P. S. L. M. Barreto, S. Galbraith, C. 'O h'Eigeartaigh, and M. Scott, "Efficient pairing computation on supersingular abelian varieties," available at http://eprint.iacr.org.
[2] P. S. L. M. Barreto, H. Y. Kim, B. Lynn, and M. Scott, "Efficient algorithms for pairing-based cryptosystems," Crypto 2002, LNCS No. 2442, 354-368, Springer Verlag, 2002.
[3] P. S. L. M. Barreto, B. Lynn, and M. Scott, "Constructing elliptic curves with prescribed embedding degrees," SCN 2002, LNCS No. 2576, 263-273, Springer Verlag, 2002.
[4] P. S. L. M. Barreto, B. Lynn, and M. Scott, "On the selection of pairing-friendly groups," SAC 2003, LNCS No. 3006, 17-25, Springer Verlag, 2004.
[5] P. S. L. M. Barreto and M. Naehrig, "Pairing-friendly elliptic curves of prime order," available at http://eprint.iacr.org.
[6] I. F. Blake, G. Seroussi and N. P. Smart, Advances in Elliptic Curve Cryptography, LMS Lecture Note Series 317, 2004.
[7] D. Boneh and M. Franklin, "Identity based encryption from the Weil pairing," Crypto 2001, LNCS No. 2139, 213-229, Springer Verlag, 2002.
[8] D. Boneh, H. Shacham and B. Lynn, "Short signatures from the Weil pairing," Journal of Cryptology, vol. 17(4), 2004, 297-319.
[9] F. Brezing and A. Weng, "Elliptic curves suitable for pairing based cryptography," Designs, Codes and Cryptography, vol. 37(1), 133-141.
[10] R. Dupont, A. Enge and F. Morain "Building curves with arbitrary small MOV degree over finite prime fields," Journal of Cryptology, vol. 18(2), 2005, 129-141.
[11] S. D. Galbraith, K. Harrison and D. Soldera, "Implementing the Tate pairing," ANTS V, LNCS No. 2369, 324-337, Springer Verlag, 2002.
[12] S. D. Galbraith, J. McKee and P. Valen, ca, "Ordinary abelian varieties having small embedding degree," Proceedings of a workshop on Mathematical Problems and Techniques in Cryptology, 46-58, 2005, available at http://eprint.iacr.org.
[13] R. P. Gallant, J. L. Lambert and S. A. Vanstone, "Faster point multiplication on elliptic curves with efficient endomorphisms," Crypto 2001, LNCS No. 2139, Springer Verlag, 190-200, 2001.
[14] T. Izu and T. Takagi, "Efficient computations of the Tate pairing for the large MOV degrees," ICISC 2002, LNCS No. 2587, 283-297, 2003.
[15] T. Kobayashi, K. Aoki and H. Imai, "Efficient algorithms for Tate pairing," in preproceedings of WISA 2005, 291-306, 2005.
[16] N. Koblitz and A. Menezes, "Pairing-based cryptography at high security level," Cryptography and Coding: 10th IMA International Conference, LNCS No. 3796, 13-36, Springer Verlag, 2005.
[17] R. Lidl and H. Niederreiter, Finite Fields, 2nd ed. Cambridge University Press, 1997.
[18] The Magma Computational Algebra System, v. 2.11, http://magma.maths.usyd.edu.au/.
[19] A. Miyaji, M. Nakabayashi, and S. Takano, "New explicit conditions of elliptic curve traces for FRreduction", IEICE Transactions on Fundamentals, E84-A(5), 1234-1243, 2001.
[20] D. Page, N. P. Smart and F. Vercauteren, "A comparison of MNT curves and supersingular curves," available at http://eprint.iacr.org.
[21] R. Sakai, K. Ohgishi and M. Kasahara, "Cryptosystems based on pairing," SCIS 2000.
[22] R. Sakai, K. Ohgishi and M. Kasahara, "Cryptographic schemes based on pairing over elliptic curve," 7B-2, SCIS 2001 (In Japanese).
[23] M. Scott, "Computing the Tate pairing," CT-RSA 2005, 293-304, Springer Verlag, 2005.
[24] M. Scott, "Scaling security in pairing-based protocols," available at http://eprint.iacr.org.
[25] M. Scott, "Faster pairings using an elliptic curve with an efficient endomorphism," to appear in Indocrypt 2005, available at http://eprint.iacr.org.
[26] M. Scott and P. S. L. M. Barreto, "Compressed pairings," Crypto 2004, 140-156, Springer Verlag, 2004.
[27] M. Scott and P. S. L. M. Barreto, "Generating more MNT elliptic curves", to appear in Designs, Codes and Cryptography, 2005, available at http://eprint.iacr.org.
[28] J. Solinas, "ID-based digital signature algorithms," available at http://www.cacr.math.uwaterloo.ca/conferences/2003/ecc2003.

The cryptosystem using pairing on an elliptic curve has various applications, such as ID-based cryptography. Scott proposes to change the security level of the ID-based cryptography etc. by altering an embedding degree k ([24]). Meanwhile, Scott also proposes an efficient pairing computation method on an ordinary elliptic curve in a large characteristic prime field Fp ([25]).

In the present description, there will be described a parameter setting method in which both the security change by altering k and the computation method of high speed and small storage stated above can be realized. Specifically, it will point out that it is important to select an order r (prime number) of the cyclic group to be used so that it may satisfy k|r−1 for more k from the viewpoint of the security change, and will show examples of effective parameters of p, r, and k.

In the conventional elliptic curve cryptography, there is a selection, for example, of a characteristic 2 or a large characteristic, as a field of definition. When implementing the pairing-based cryptography, more selections are to be necessary.

That is, in addition to the characteristic selection including a characteristic 3, there are selections, a supersingular curve or an ordinary curve, Weil pairing or Tate pairing, and security enhancing by changing the embedding degree k or by changing the size of the definition field.

Regarding such selections, in the present description, an ordinary elliptic curve Tate pairing in a large characteristic prime field $F_p$ is used, and changing of k is oriented in the security change. Since flexibly changing k is assumed, the Cocks-Pinch method is used as the parameter generating method. Particularly, from a viewpoint of data length, curve generating methods, such as a MNT method capable of making $\rho(:=\log_2 p/\log_2 r)$ ($\rho<2$) small, are important. Such methods have exact restriction on the applicable k.

On the other hand, in the Cocks-Pinch method in which being b>2 cannot be avoided, there is no restriction on an applicable k (if r is not fixed). Therefore, the Cocks-Pinch method is applied to the present description (and [24]). Moreover, according to the Cocks-Pinch method, when one r (prime number) of [25], which is capable of computing at high speed, is fixed, the applicable k is determined. Then, in the present description, there will be described methods for selecting r capable of responding to more k, and p capable of further speeding up.

In [25], for example, fast computation is proposed by using a homomorphism mapping $(x, y) \rightarrow (\beta x, y)$ on an elliptic curve $E: Y^2 = X^3 + b (b \in F_p^*)$ of characteristic p ($\equiv 1 \mod 3$). In this case, $\beta(\in F_p^*)$ is the third root of unity. As a practical matter, when k=2, it is reported it becomes faster than a supersingular curve. Although using a special r is needed in the fast computation, the method is applicable to a prime number $r = \lambda^2 + \lambda + 1$ ($\lambda = 2^{c_1} + 2^{c_2}$, $c_1 > c_2$), for example.

Since if r satisfies k|r−1, an elliptic curve E s.t. r|#E($F_p$) having an extension degree k exists, it is recommended to select r which has k as many as possible as the factor of r−1, from the viewpoint of flexible changing of k. For example, in the case of $(c_1, c_2)=(80, 16)$, since r−1 does not have 5 as a prime factor, the elliptic curve E having k=10 cannot be selected. Similarly, in the case of $(c_1, c_2)=(96, 83)$, there is no E of k=14. However, r in the case of $(c_1, c_2)=(128, 22)$ can respond to all the even numbers of k less than or equal to 14.

Moreover, a method for selecting p which can efficiently perform computation of an extension field is also taken into consideration. For example, assuming that $n_1(=2), \pi_2, \ldots, \pi_v$ are prime factors of k, it is necessary to select p to satisfy p≡1 mod $\pi_1^2 \cdot \pi_2 \cdot \ldots \cdot \pi_v$ when 4|k, and p≡1 mod $\pi_1 \cdot \pi_2 \cdot \ldots \cdot \pi_v$ when 4|/k (not 4|k). Parameter examples of p, r, k, and b acquired by the selection method described above are also shown.

The cryptosystem using pairing on an elliptic curve has various applications, such as ID-based cryptography. Scott [24] proposes to realize the security level change of ID-based cryptography of [22, 7] by changing the embedding degree k. Meanwhile, in [25], there is proposed an efficient pairing computation method on an ordinary elliptic curve in the large characteristic prime field $F_p$.

In the following, there will be described a parameter setting method for realizing the security change of [24] and the computing method of high speed and small storage of [25]. Specifically, a method for selecting an order r (prime number) of the cyclic group so that it can respond to more k will be described.

1. Introduction

Since the pairing computation needs computation amount more than that of general elliptic curve scalar multiplication, there have been many studies on speeding up (for example, [11, 15], etc.). Moreover, parameter setting corresponding to security change becomes required. In the case of pairing-based cryptography, security can be changed by the embedding degree k. In the present description, a parameter which realizes security change by using k while keeping the high speed implementation [25] will be presented.

As a pairing-friendly elliptic curve, the supersingular curve has ever been frequently proposed from the viewpoints of ease of parameter generation, possibility of fast computation, and existence of a distortion map (e.g., refer to [1]). Meanwhile, in many pairing-based cryptosystems, a distortion map is not necessarily needed, and improvement in speed has been developed for the ordinary curve to be sufficiently suitable for practical use (refer to Section 5). For example, ID-based public key cryptography of [22, 7] can be constructed even if there is no distortion map [20]. The supersingular curve defined in $F_p$(p>3) is limited to k=2, and regarding the supersingular curve with k=3, 4 and 6, the characteristic and the number of the isomorphism classes are exactly restricted. Therefore, ordinary elliptic curve pairing parameters in the large characteristic prime field $F_p$ are practically important. Such a case will be treated in the present description.

The Cocks-Pinch method (Section 4.2) is used for generating pairing parameters in the present description. Thereby, it is possible to change p and k while retaining the bit length of p to be about the same and keeping the cyclic group order r (or the form of r, refer to Section 6) fixed.

In the present description, mainly focusing on being able to flexibly change p and k for a specific r (or its form) required for the high speed method of [25], the security changing method of a pairing-based cryptosystem will be stated without limiting it to the parameter changing method of [24] which focuses on the advantage in H/W implementation. In addition, methods of selecting r which is capable of responding to more k and selecting p which is capable of achieving high speed will also be explained.

There will be described a pairing computation method in Section 2, criteria of security for pairing curve parameters in Section 3, a currently usable parameter generation method in Section 4, the high speed calculation method of [25] in Section 5, and a setting method for suitable r and p and their examples in Section 6. Magma [18] is used for all the computation performed in the present description.

2. Computation Method Of Pairing On Elliptic Curve

Refer to Chapter IX of [6] for notations and detailed contents of the present section.

In the present description, the ordinary elliptic curve $E: Y^2 = X^3 + aX + b$ (a,b∈$F_p$) in the finite prime field Fp, and a prime number r satisfying r≠p, r|p−1, and r|#E($F_p$) are supposed to be fixed. With respect to r, it is defined to be $\mu_r := \{u \in Fp^* | u^r = 1\}$. Setting k to be the least k (>0) satisfying r|$p^k$−1, when K:=$F_p^k$, it is $\mu_r \subset K^*$, E[r] ⊂ E(K)

Weil pairing $e_r(\bullet, \bullet)$ and Tate pairing $<\bullet, \bullet>_r$ are non-degenerating bilinear mappings as follows:

$$e_r(\bullet,\bullet): E[r] \times E[r] \rightarrow \mu_r (\subset K)$$

$$<\bullet,\bullet>_r: E[r] \times E(K)/rE(K) \rightarrow K^*/(K^*)^r$$

Since the domain of the Tate pairing is an equivalent class, $<\bullet, \bullet>_r^{(p^k-1)/r}$ is calculated by raising $<\bullet, \bullet>_r$ to the power of $(p^k-1)/r$ in the actual calculation. This is called a Tate pairing value and denoted by $e(\bullet, \bullet): E[r] \times E(K) \rightarrow K^*$ in the present description.

According to [28], the value calculated by the Miller algorithm ([6] Algorithm IX.1) is denoted as M(P, Q) with respect to P∈E[r] and Q∈E(K). Supposing [Q] represents an element of E(K)/rE(K), M(P, Q) is a representative in the class <P, [Q]>$_r$. Then, e(P, Q)=M(P, Q)$^{(p^k-1)/r}$. When Q∈E[r], $e_r$(P, Q)=M(P, Q)/M(Q, P).

In the present description, there will be henceforth described focusing on the Tate pairing value calculation (Section 5.2 Algorithms 3, 4, and 5). The Tate pairing value calculation has been regarded as capable of calculating more efficiently than the Weil pairing value calculation. However, it needs to be noted that it is recently pointed out in [16, 24] that, for a large even number k, $e_r(P, Q)^{p^{k/2}-1}$ obtained by raising a Weil pairing value to the power of $p^{k/2}-1$ can be calculated equally or more efficiently than a Tate pairing value, under some conditions.

3. Security of Pairing Curve Parameter

There will be described hereinafter, according to [25], using the notation in which F denotes the size of p (~$\log_2 p$) and G does that of r (~$\log_2 r$), and defining ρ:=F/G as often used ([16, 5], etc.)

3.1 Size of p, r, and k

Since the security of DLP in $F_{p^k}^*$ is prescribed by kF, and that of ECDLP is prescribed by G, the security of a pairing curve is represented by a pair (kF/G). The matching is (1024/160), (3072/256), (8192/384) in [16], and (1024/160), (2048/192), (4096/224) in [25], namely it is not necessarily stable. One of the reasons is the estimate of calculation time of the number field sieve for DLP of $F_{p^k}^*$ is not so stable as that of the Pollard p method for ECDLP.

3.2 Hamming Weight of p and r

In the conventional elliptic curve cryptography in the prime field which does not utilize pairing, a prime number p with small Hamming weight is generally used for fast computation. In [16], parameters p and r with small Hamming weight are exemplified for the use of the pairing-based cryptography. Meanwhile, in [16], it is pointed out that DLP in $F_{p^k}^*$ in the pairing curve might be vulnerable against a special number field sieve method, by using such special prime numbers. Considering the risk, the Hamming weight of modulus p is generally selected (refer to Table 2 (FIG. 23)) in the present description. On the other hand, the cyclic group order r with small Hamming weight is used for achieving high-speed pairing computation.

3.3 Difference from DSA and DH Domain Parameter Setting Method

Domain parameters p and q of DSA and DH (s.t. q|p−1) have security basis (resistance to the number field sieve method for DLP in $F_p^*$, and resistance to the Pollard ρ method for DLP in an order q cyclic group) as well as pairing parameters (a part) p, k, and r (s.t. r|$p^k$−1). However, according to p and q generating methods of DSA and DH in FIPS etc., parameters are set as random as possible, and it appears no special attention is paid to the security change.

4. Pairing Curve Parameter Setting Method

As a construction method of a pairing curve, the CM method is used for attaining a small k. Even when k is fixed, two parameter generating methods can be roughly considered depending upon setting conditions for ρ and r, which will be described in the Sections 4.1 and 4.2, and will be stated from the point of the security change in the Section 4.3.

4.1 MNT Method, BW Method, BN Method

The MNT method [19], the BW method [9], and the BN method [5] are the parameter generating methods for realizing ρ<2. The characteristics of them are summarized in Table 1 (FIG. 17). According to these methods, it is not easy to set the prime number r arbitrarily and they are not applicable to all k as shown in Table 1. Therefore, the methods are not adopted as a parameter generating method in the present description (refer to Section 4.3). However, as stated in [24], for example, when using pairing for short signature in [8], being ρ to 1 is very important. Thus, it should be noted that each of the methods of Section 4.1 is significant.

4.2 Cocks-Pinch Method

Unlike the methods of Section 4.1, an arbitrary prime numbers r can be set by using the Cocks-Pinch method ([3] [6] Algorithm IX.4). However, generally, it is ρ>2 in the Cocks-Pinch method. Although the algorithm in the case of discriminant D being D≡0 mod 4 is described in p. 211 of [6], since the case of D=−3 is mainly treated after Section 5 in the present description, the algorithm when D≡1 mod 4 is shown (Algorithm 1) (FIG. 18). Moreover, in [25], the Algorithm 1 specially for k=2 is described.

4.3 Security Changing Method Using Cocks-Pinch Method 4.3.1 Assumptions Depending on Implementation Environment In [24], it is aimed to change p, k, and r while retaining the bit length F of p to be the same amount (512 bits). According to this method, even if G is changed to 160, 192, and 224, for example, parameter changing can be performed with fixing F to 512. Therefore, noting that this method can contribute to a compact cryptographic coprocessor in small devices, such as an IC card, such security change is conceived.

However, this situation is not necessarily assumed in the present description because it is desired to take S/W implementation into consideration. For example, it is assumed to apply the fast computation of [25] and to make F as small as possible, by generating parameters while making F close enough to 2G with respect to a specific prime number r (or its form). That is, setting F~320, 384 and 448 for G=160, 192 and 224, the situation for fast computation in many implementation environments, such as S/W installing, is also assumed.

4.3.2 Advantage of Using Cocks-Pinch Method

According to the Cocks-Pinch method, p and k can be changed while retaining a fixed r (or its form, refer to Section 6). Regarding this change, two points can be pointed out. The first point is that, as described in the Section 5, the high speed method of [25] largely depends upon r, and if r (or its form) can be fixed, it becomes possible to change the security with respect to kF while applying the high speed and the small storage only by newly giving a cryptographic module to p and k. The second point is that, as stated in Section 3.1, compared with a parameter G, setting a safe kF has high fluidity because of characteristics of attacking methods. Therefore, the Cocks-Pinch method, which can change k easily, is a method better than the method of Section 4.1 from the viewpoint of the security change.

5. Fast Computation Method [25] Of Scott

In Section 5.2, there will be described the fast Tate pairing value algorithm of [25] using an efficient homomorphism mapping. The idea of the computation method is effective in the case of inputs P and Q of pairing being general, and further, in the case of the Miller lite algorithm for special P and Q described in Section 5.1, it becomes more effective. Then, in Section 5.2, utilizing a homomorphism mapping for the Miller lite algorithm will be described (Algorithms 3, 4, and 5) (FIGS. 20, 21, and 22). Specifically, it is henceforth assumed that k is an even number.

5.1 Miller Lite Algorithm

The Miller lite algorithm is applied to P($\in(F_p)$), and Q($\in \phi$ (E'($F_{p^{k/2}}$))$\subset$ E($F_{p^k}$)), where E' denotes a quadratic twist of E and is given as $Y^2=X^3+d^2aX+d^3b$ using a quadratic non-residue de $F_p^*$. Moreover, φ:E'($F_{p^{k/2}}$)→E($F_{p^k}$) is given by (x', y')→(x, y)=($d^{-1}x'$, $\alpha^{-3}y'$) using $\alpha \in F_{p^2}$ s.t. $\alpha^2=d$. Thus, by using the obtained point (x, y) as Q, some high speed methods, such as denominator elimination, can be applied. The details are described in [4].

In [28, 16], in contrast to the Miller lite algorithm mentioned above, the algorithm used for general P, Q∈E($F_{p^k}$) ([6] Algorithm IX.1) is called a full Miller algorithm.

5.2 High Speed Method Using Fast Homomorphism Mapping

In [25], utilizing the fast homomorphism mapping in pairing computation is proposed as a similar method to [13]. In [25], there proposed high speed pairing computation on the elliptic curves with CM of D=−3 and −4 of $$Y^2 = X^3 + b, \ p \equiv 1 \bmod 3 \quad (1)$$

$$Y^2 = X^3 + aX, \ p \equiv 1 \bmod 4 \quad (2)$$

Although the curve (1) will be described hereinafter, the description can be applied to the curve (2) and a CM elliptic curve with small |D|.

In [25], a group order $r_1 = (\lambda^2 + \lambda + 1)/73$ ($\lambda = 2^{87}$) and a group order $r_2 = \lambda^2 + \lambda + 1$ ($\lambda = 2^{c1} + 2^{c2}$, c1>c2) of the elliptic curve (1) are cited as group orders capable of achieving high speed. A prime number r given by $r = \lambda^2 + \lambda + 1$, wherein Hamming weight of X is i($\geq 2$), is expressed as $r_i$ in the present description. In [25], especially a 161-bit prime number r2 ($\lambda = 2^{80} + 2^{16}$) is used.

Algorithm 2 (FIG. 19) is for the curve (1), and in [25], e(P, Q) algorithm of high speed and small storage using the g is described. (Algorithms 3, 4, and 5) (FIGS. 20, 21, and 22). $\beta(\in F_p^*)$ in the Algorithm 2 is the third root of unity.

Generally in pairing computation, when P is a fixed point, it is possible to precompute $x_i$, $y_i$, and $m_i$ of bit length number of r of steps 1 and 3 in Algorithm 2 as fixed values. When using such a technique in the method (Algorithms 3, 4, and 5) of [25], it is necessary to hold a half of the table values in advance. Algorithm 5 is the method of applying the high speed method of [25] in the environment where memory is limited because of reducing the table holding s[•]. Algorithms 2, 3, 4, and 5 can be achieved without division, by using Jacobian coordinates (similarly to the ordinary elliptic curve multiplication by scalars). For details, refer to [24], for example.

5.3 Final Exponentiation in Tate Pairing Computation

Based on Theorem 1, a prime number p capable of speeding up exponentiation in $F_{p^k}$ of the last step of Algorithms 3, 4 and 5 is selected ([16] Section 5). Theorem 2 of [16] Section 5 is specialized in the form of $k=2^i 3^j$, and the original general Theorem 3.75 of [17] is cited in the present description.

Theorem 1, let $k \geq 2$ and $\gamma \in F_q^*$. The necessary and sufficient condition for a polynomial $x^k - \gamma$ ($\in F_q[x]$) to be irreducible is to satisfy the following two conditions.

i. Each prime factor of k is a divisor of an order of $\gamma \in F_q^*$, and is not a divisor of (q−1)/L.

ii. If k≡0 mod 4, it is q≡1 mod 4.

Theorem 1 enables it to select a prime number p capable of achieving high speed, in accordance with factorization of k. That is, if $\pi_1 (=2), \pi_2, \ldots, \pi_v$ are prime factors of k, it is necessary to select a prime number p s.t. p≡1 mod $\pi_1^2 \cdot \pi_2 \cdots \pi_v$ when 4|k, and p s.t. p≡1 mod $\pi_1 \cdot \pi_2 \cdots \pi_v$ when 4∤k, for example. As described in [16], by choosing a binomial polynomial as a definitional equation of field extension, the number of times of $F_{p^-}$ multiplication can be reduced, and by choosing a small element for γ in Theorem 1, the computation amount in reduction calculation in the extension field can also be reduced. Moreover, since k is an even number, achieving high speed using Lucas sequence can be applied ([26, 24]).

6. Selecting Method of Effective p and r

For the prime number r to be $r|\#E(F_p)$ with respect to an elliptic curve E/Fp with the embedding degree k, it is necessary and sufficient to be k|r−1 so that $F_r^*$ may have k-th root of unity (i.e., $r|p^k - 1$). As to $r_1$ described in Section 5.2, it is $r_1 - 1 = 2^3 \cdot 3^2 \cdot 5 \cdot 7^2 \cdot 13 \cdot 29 \cdot 43 \cdot C_0$. In this case, $C_0$ represents the value whose prime factors are greater than or equal to 50 and which is a factor of $r_1 - 1$. Therefore, with respect to $r_1$, E whose embedding degrees are even numbers of k=2, 4, 6, 8, 10, 12, 14, ... can be obtained.

Table 3 (FIG. 24) shows all $c_2$ s.t. $r_2$ being a prime number in the case of $\lambda = 2^{c1} + 2^{c2}$ (c1=80, 96 and 128, c1>c2), and factorization of $r_2 - 1$. Since a prime number $r_2$ does not exist in $\lambda = 2^{112} + 2^{c2}$, when a prime number $r_3$ is calculated in $\lambda = 2^{112} + 2^{c2} + 2^{c3}$ (112>$c_2$>$c_3$), ninety-three prime numbers of $r_3$ exist. Table 4 (FIG. 25) shows some of them, which satisfy $2^3 \cdot 3^2 \cdot 5 \cdot 7 | r_3 - 1$. Each $C_i$ in Tables 3 and 4 represents a product of prime factors greater than or equal to 50. It is easy to suitably correct Algorithms 4 and 5 with respect to $r_3$ obtained from $\lambda = 2^{c1} + 2^{c2} + 2^{c3}$ (c1>c2>c3).

All the prime numbers p for k=4, 6 and 8 with respect to $r_2$ are shown in Table 2. Using these parameters, it is possible to perform pairing computation for different p by using the same (efficient) Algorithms 4 and 5. Owing to this, it can be updated to a pairing parameter with enhanced security, without replacing parameters except for the parameter p.

As described in Section 5.3, by checking whether p satisfies an appropriate congruence relational expression or not, it becomes possible to select p capable of efficiently calculating multiplication in the extension field $F_{p^k}$. p in Table 2 are selected by such method. If Cocks-Pinch method calculation routine more optimal than that of this time is used, the bit length of p may be closer to 322.

7. Conclusion

In the present description, similarly to [24], it is treated to achieve the security of pairing-based cryptography, such as ID-based public key cryptography, by changing the embedding degree k. There has been proposed the changing method which consists with the computation method of high speed and small storage proposed in [25]. In this proposal, conditions of the important cyclic group order r (prime number) are shown, and based on the conditions, a specific r suitable for the security change is presented. The case of Tate pairing is mainly treated in the present description. However, since it is pointed out in [16, 24] that Weil pairing (to the power of $p^{k/2} - 1$) can calculate more efficiently when k is large, a parameter setting method considering this point and a more efficient computation method are (one of) the problems to be solved in the future.

BRIEF DESCRIPTION OF THE DRAWINGS

FIG. 6 shows a flowchart (1) describing a flow example of computation processing for calculating a pairing value of Tate pairing by a computation method performed not at high speed;

FIG. 17 shows a table of characteristic comparison as to a p-oriented parameter generation method;

FIG. 18 shows Cocks-Pinch algorithm when D=1 mod 4;

FIG. 19 shows an algorithm of an auxiliary function g;

FIG. 20 shows an algorithm for calculating (73rd power of) a Tate pairing value for a group order $r_1$;

FIG. 21 shows an algorithm for calculating a Tate pairing value for a group order $r_2$;

FIG. 22 shows an algorithm (without storage) for calculating a Tate pairing value for the group order $r_2$;

FIG. 23 shows a table of parameters p and b for D=−3 and $\lambda=2^{80}+2^{16}$ ($r_2=\lambda^2+\lambda+1$)

FIG. 24 shows a table describing factorization of $r_2-1$ (D=−3); and

FIG. 25 shows a table describing factorization of $r_3-1$ (D=−3).

Figure 1:
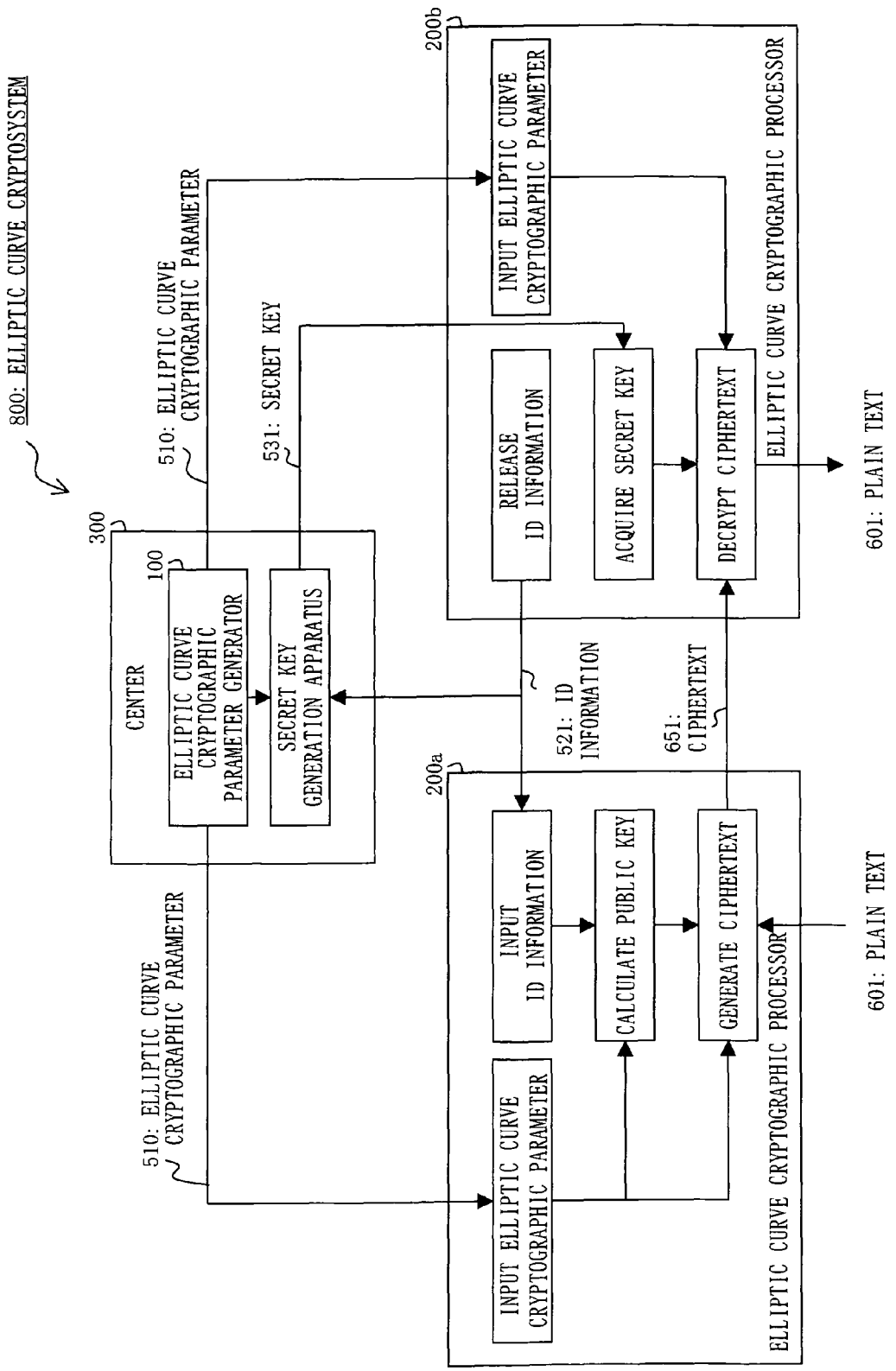
FIG. 1 shows a system configuration of an example of the whole configuration of an elliptic curve cryptosystem 800 according to Embodiment 1.
Figure 2:
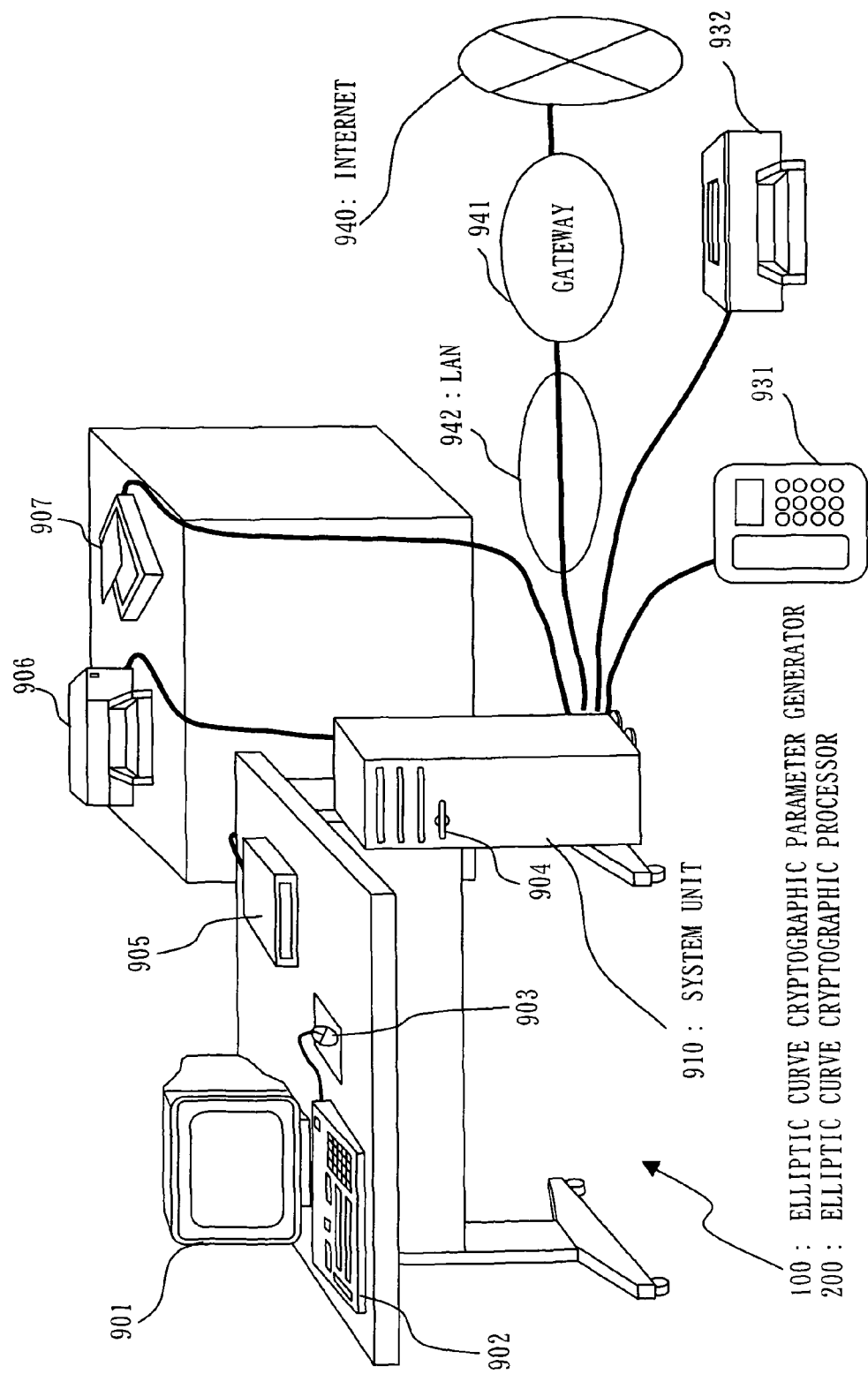
FIG. 2 shows an example of appearance of an elliptic curve cryptographic processor 200 according to Embodiment 1.
Figure 3:
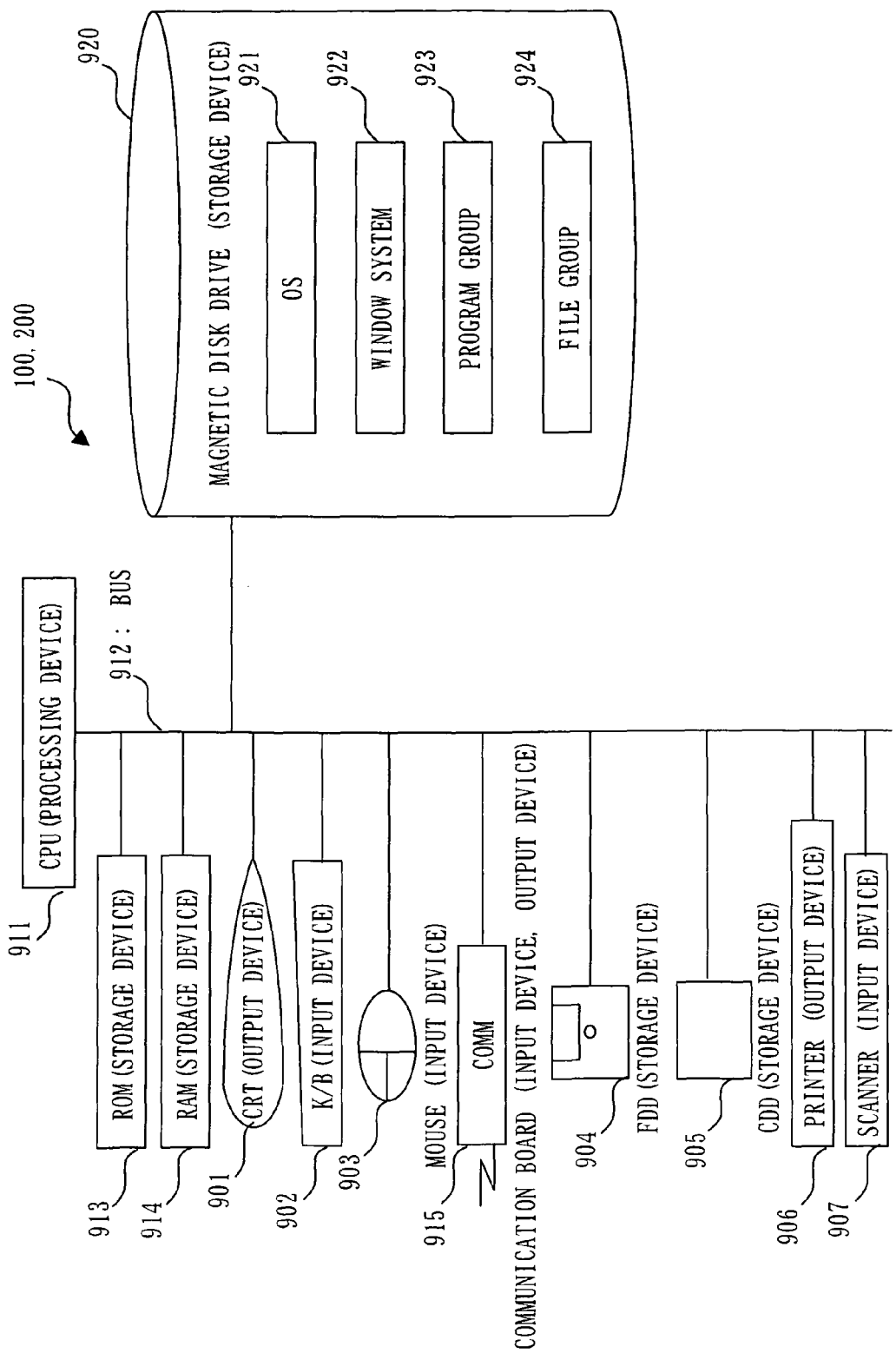
FIG. 3 shows an example of hardware resources of the elliptic curve cryptographic processor 200 according to Embodiment 1.
Figure 4:
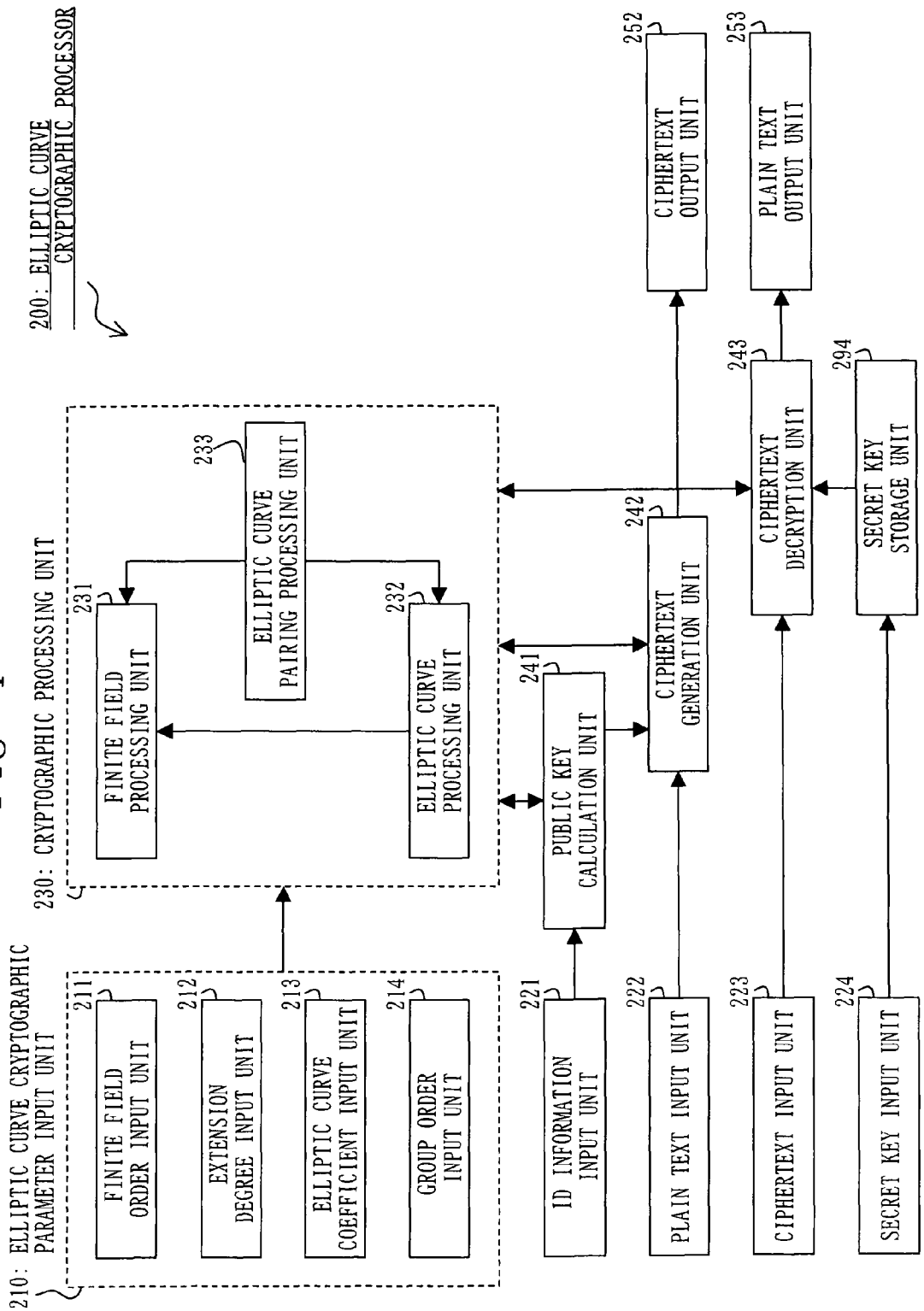
FIG. 4 is a configuration block diagram showing a configuration example of the internal block of the elliptic curve cryptographic processor 200 according to Embodiment 1.
Figure 5:
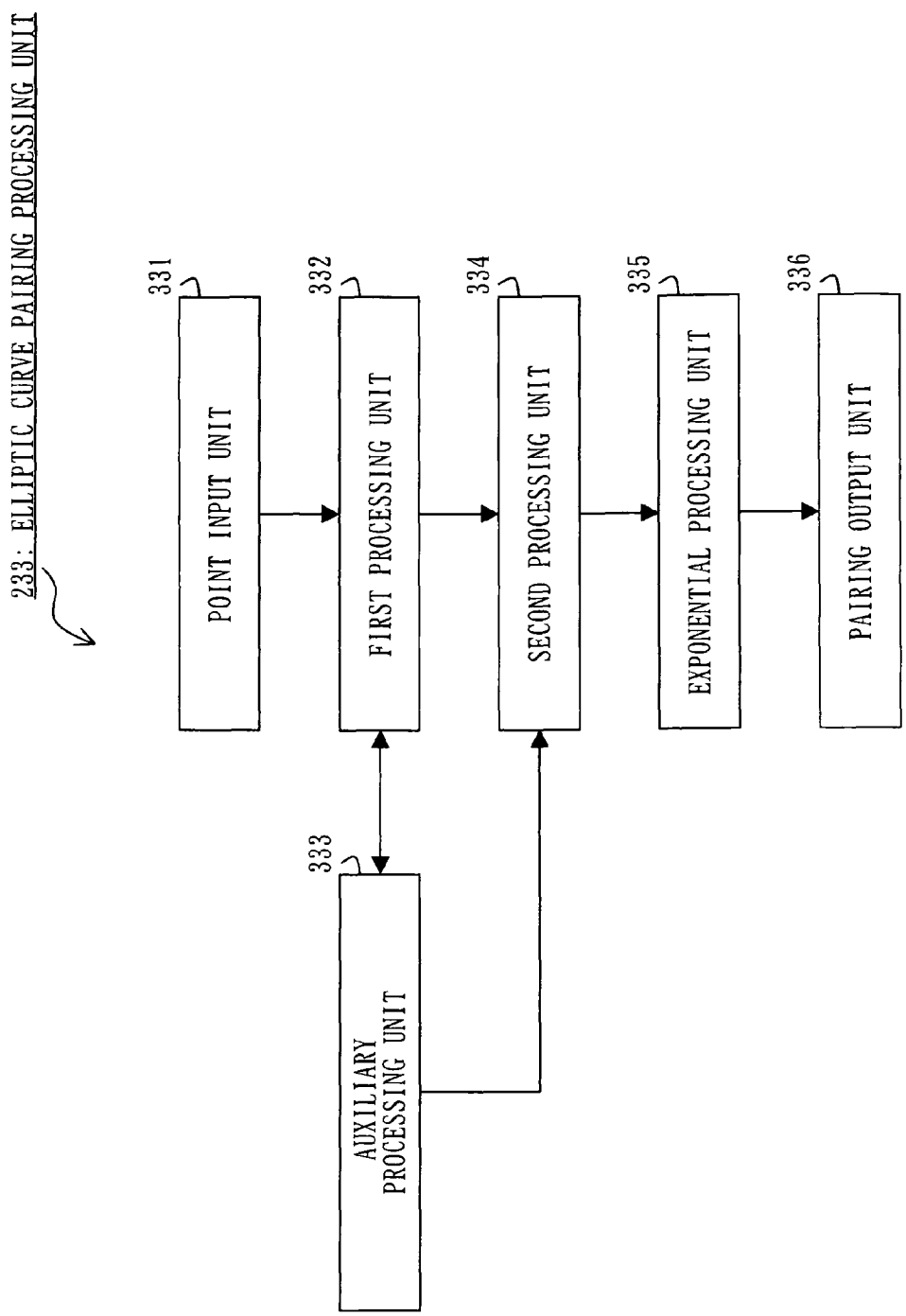
FIG. 5 is a configuration block diagram showing a configuration example of the internal block of an elliptic curve pairing processing unit 233 according to Embodiment 1.
Figure 7:
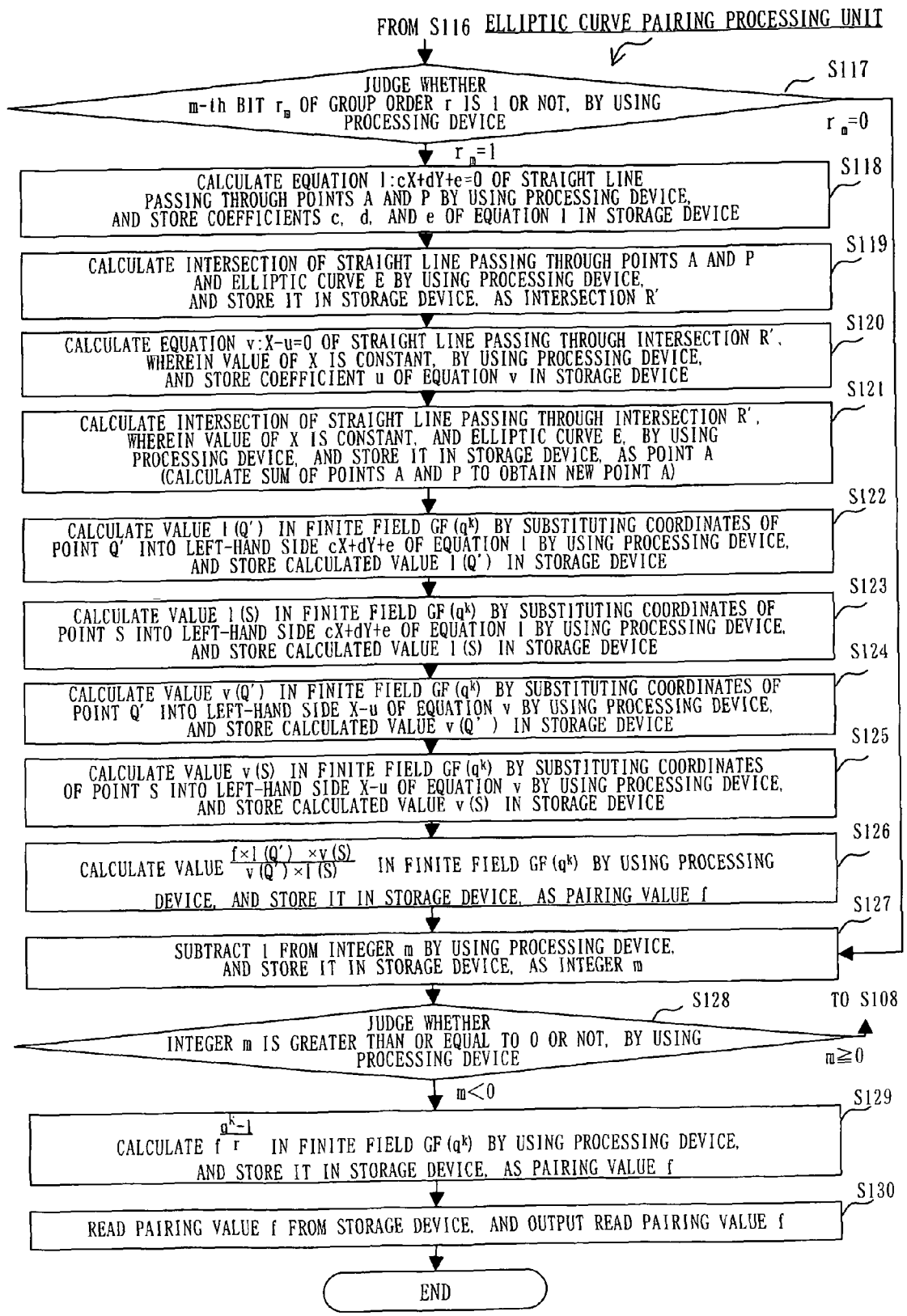
FIG. 7 shows a flowchart (2) describing a flow example of computation processing for calculating a pairing value of Tate pairing by a computation method performed not at high speed.
Figure 8:
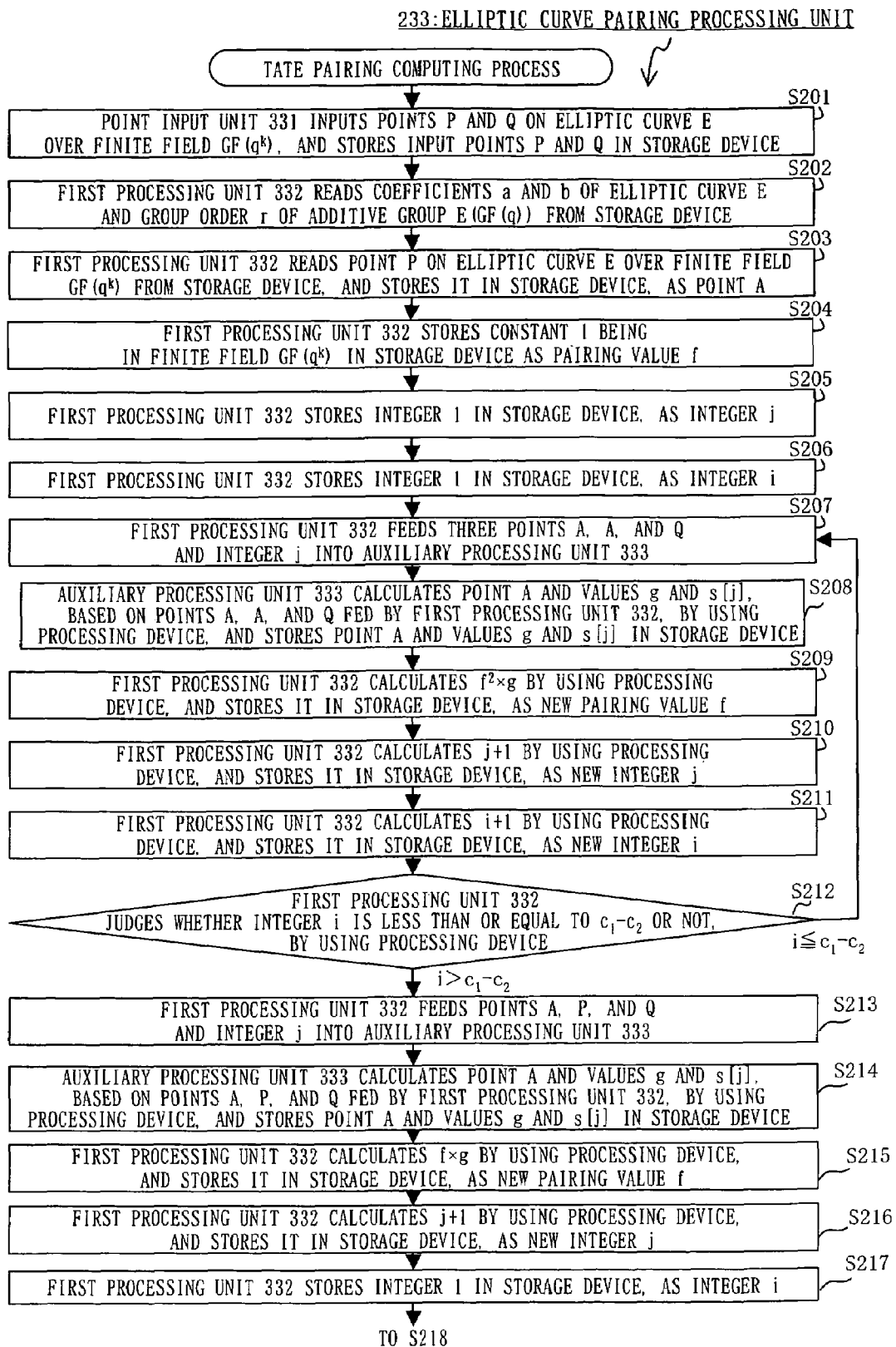
FIG. 8 is a flowchart (1) showing a flow example of computation processing of calculating a pairing value of Tate pairing, by the elliptic curve pairing processing unit 233 according to Embodiment 1.
Figure 9:
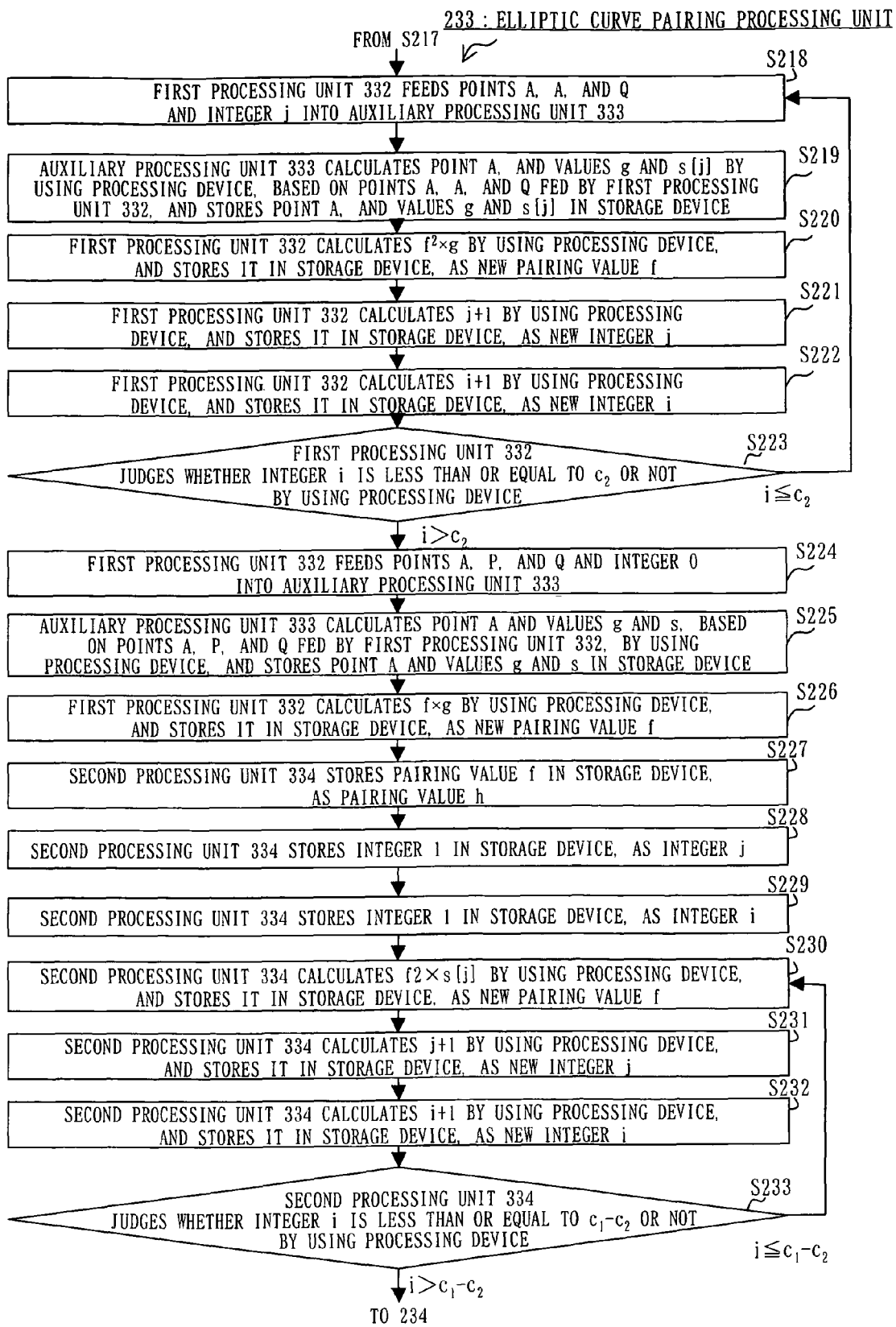
FIG. 9 is a flowchart (2) showing a flow example of computation processing of calculating a pairing value of Tate pairing, by the elliptic curve pairing processing unit 233 according to Embodiment 1.
Figure 10:
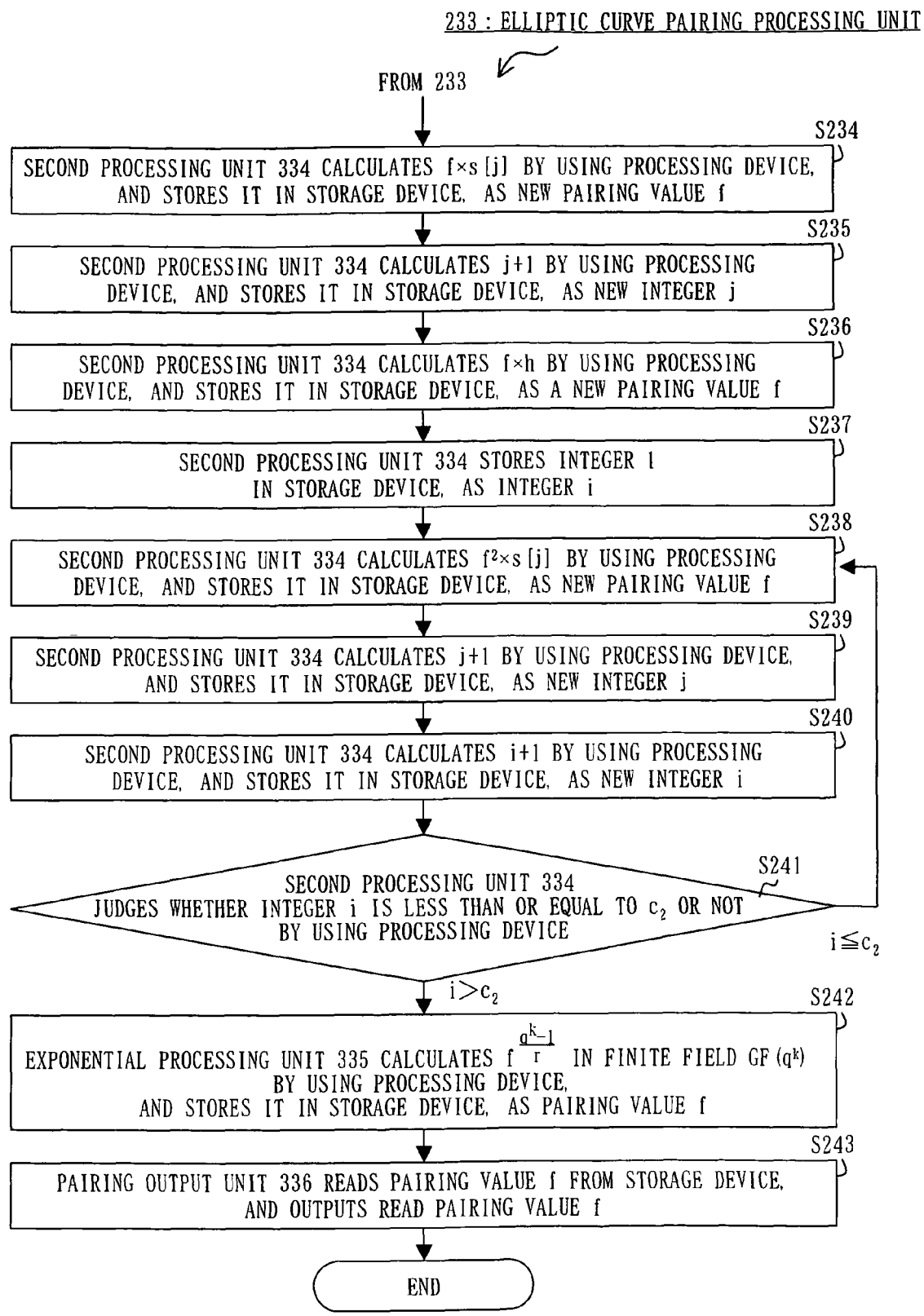
FIG. 10 is a flowchart (3) showing a flow example of computation processing of calculating a pairing value of Tate pairing, by the elliptic curve pairing processing unit 233 according to Embodiment 1.
Figure 11:
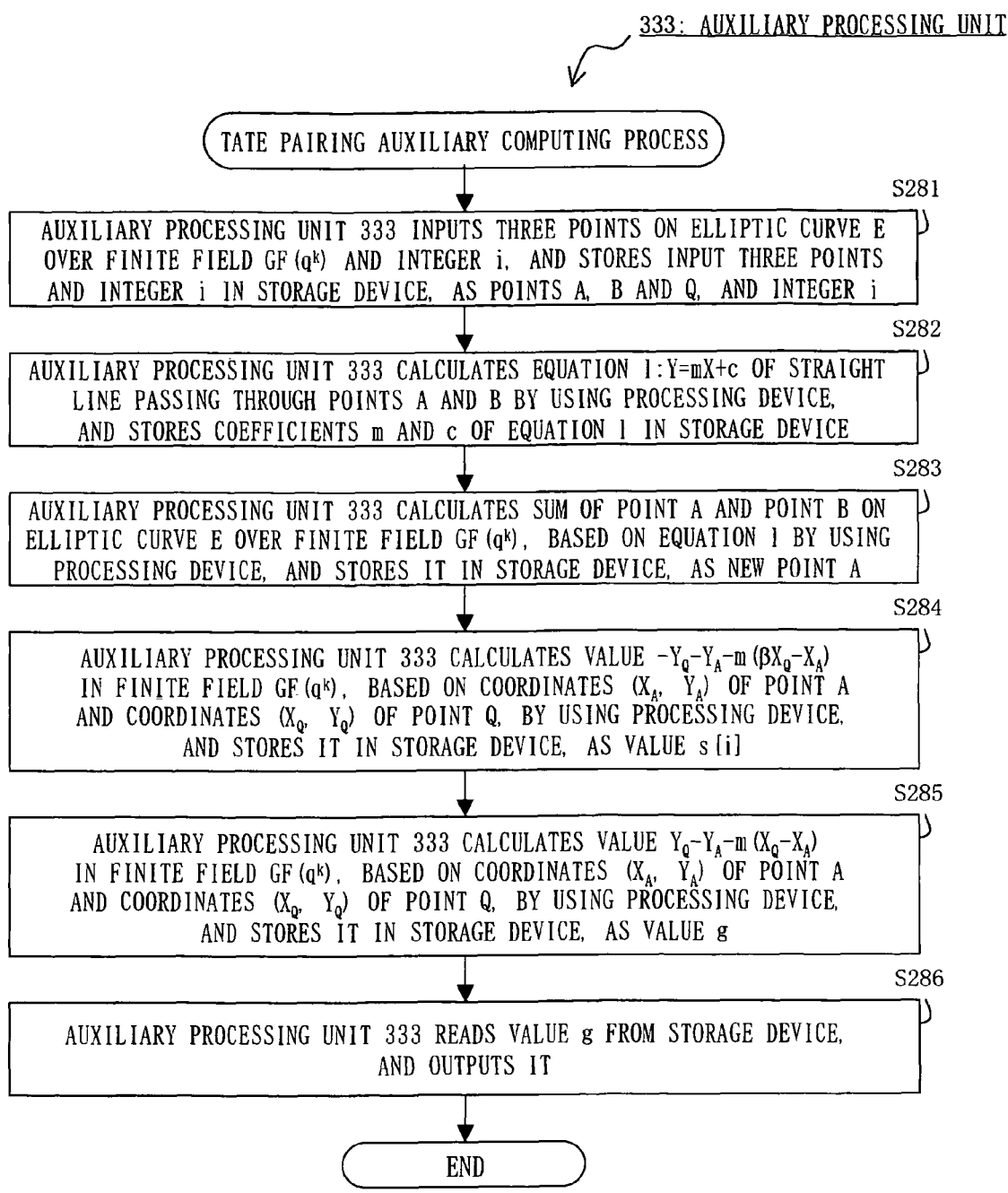
FIG. 11 is a flowchart showing a flow example of auxiliary processing of Tate pairing performed by an auxiliary processing unit 333 according to Embodiment 1.
Figure 12:
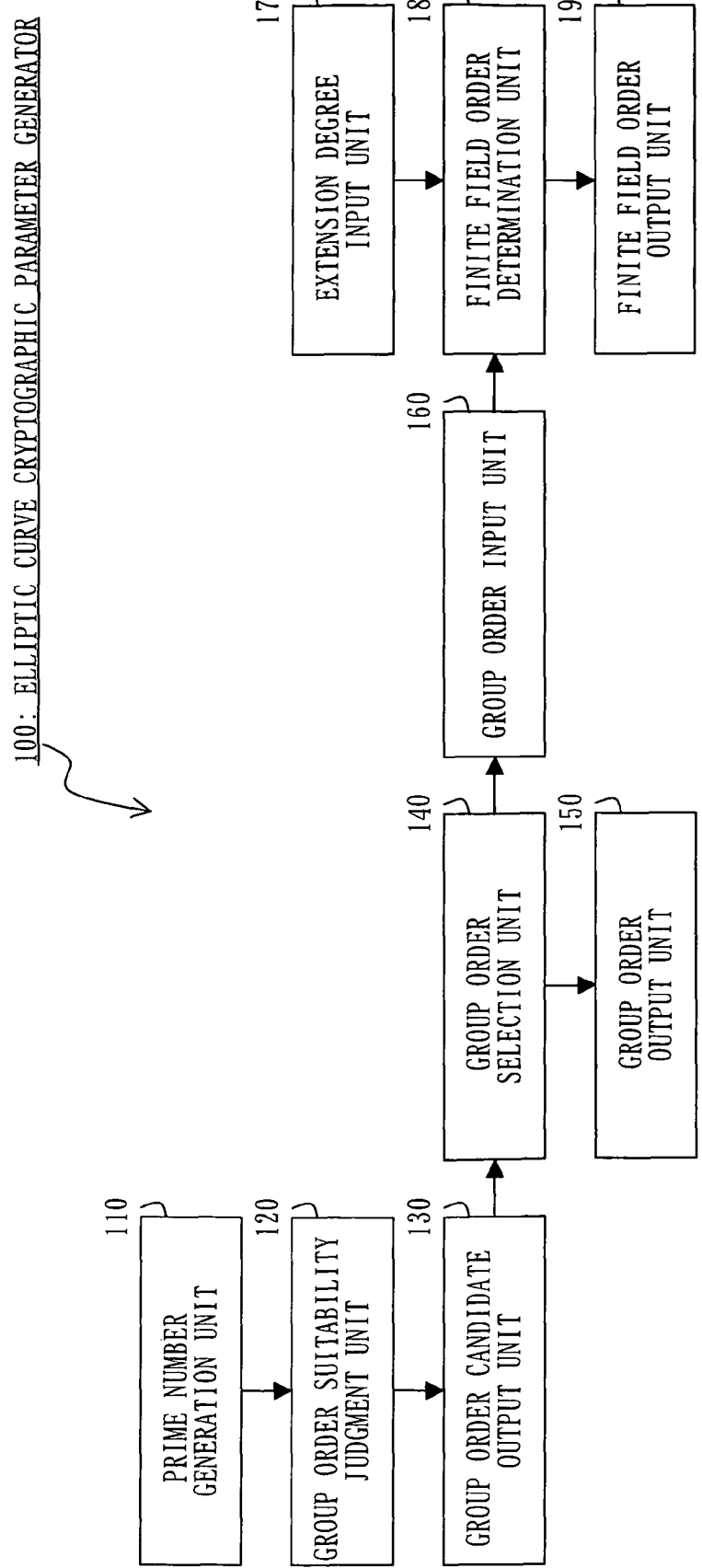
FIG. 12 is a configuration block diagram showing a configuration example of the internal block of an elliptic curve cryptographic parameter generator 100 according to Embodiment 2.
Figure 13:
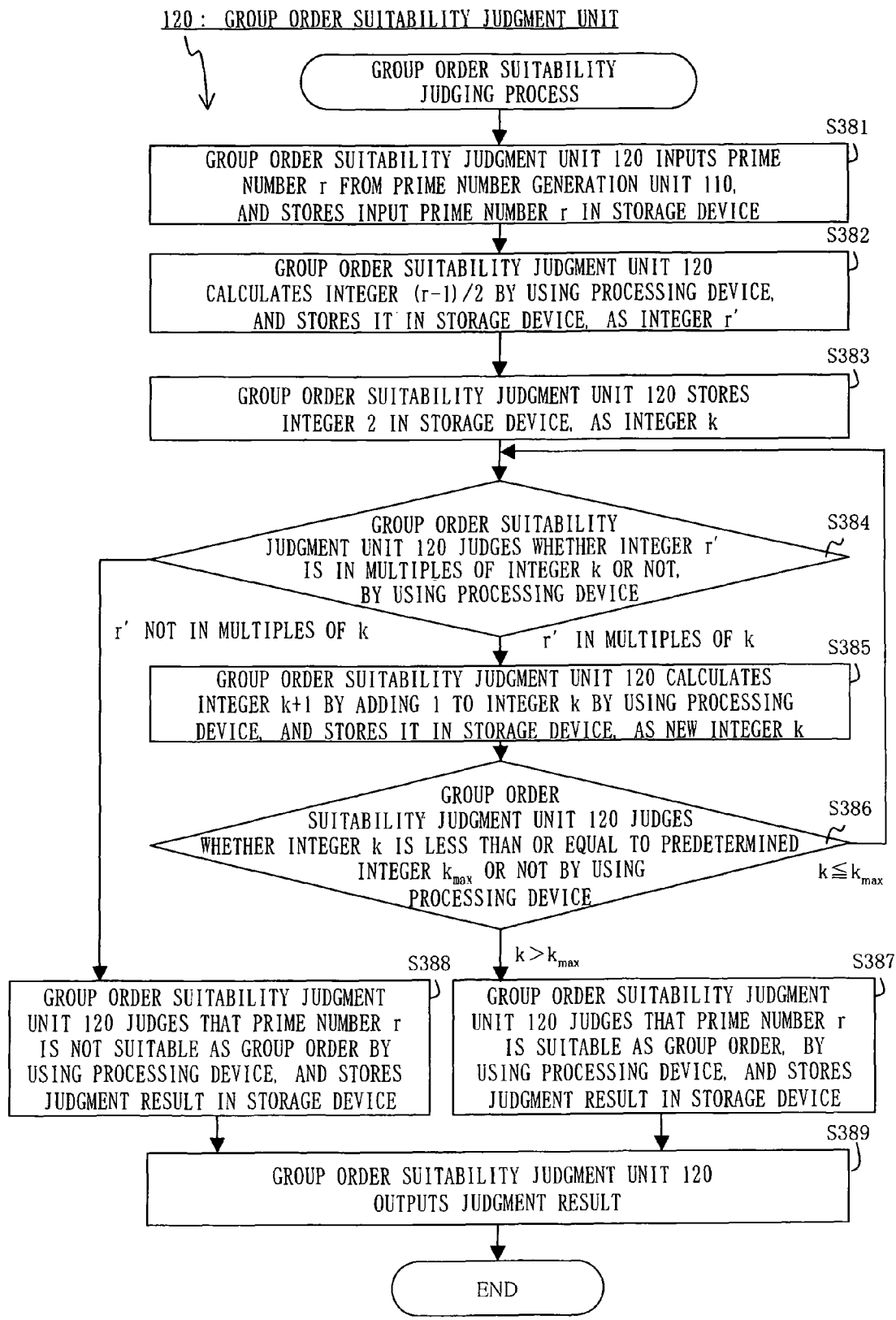
FIG. 13 shows a flowchart describing a flow example of group order suitability judgment processing by a group order suitability judgment unit 120 according to Embodiment 2.
Figure 14:
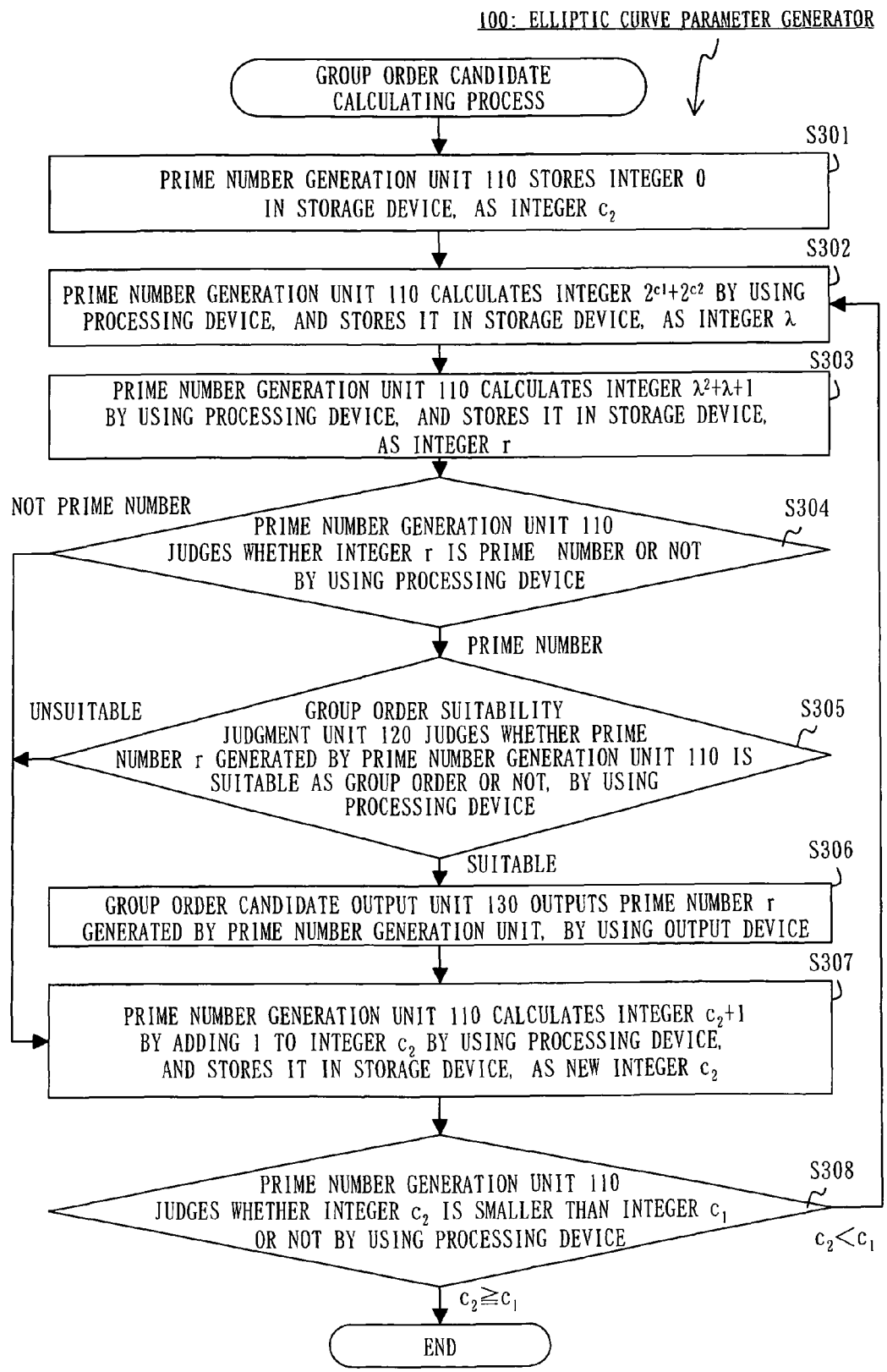
FIG. 14 is a flowchart showing a flow example of processing for calculating a group order candidate by the elliptic curve cryptographic parameter generator 100 according to Embodiment 2.
Figure 15:
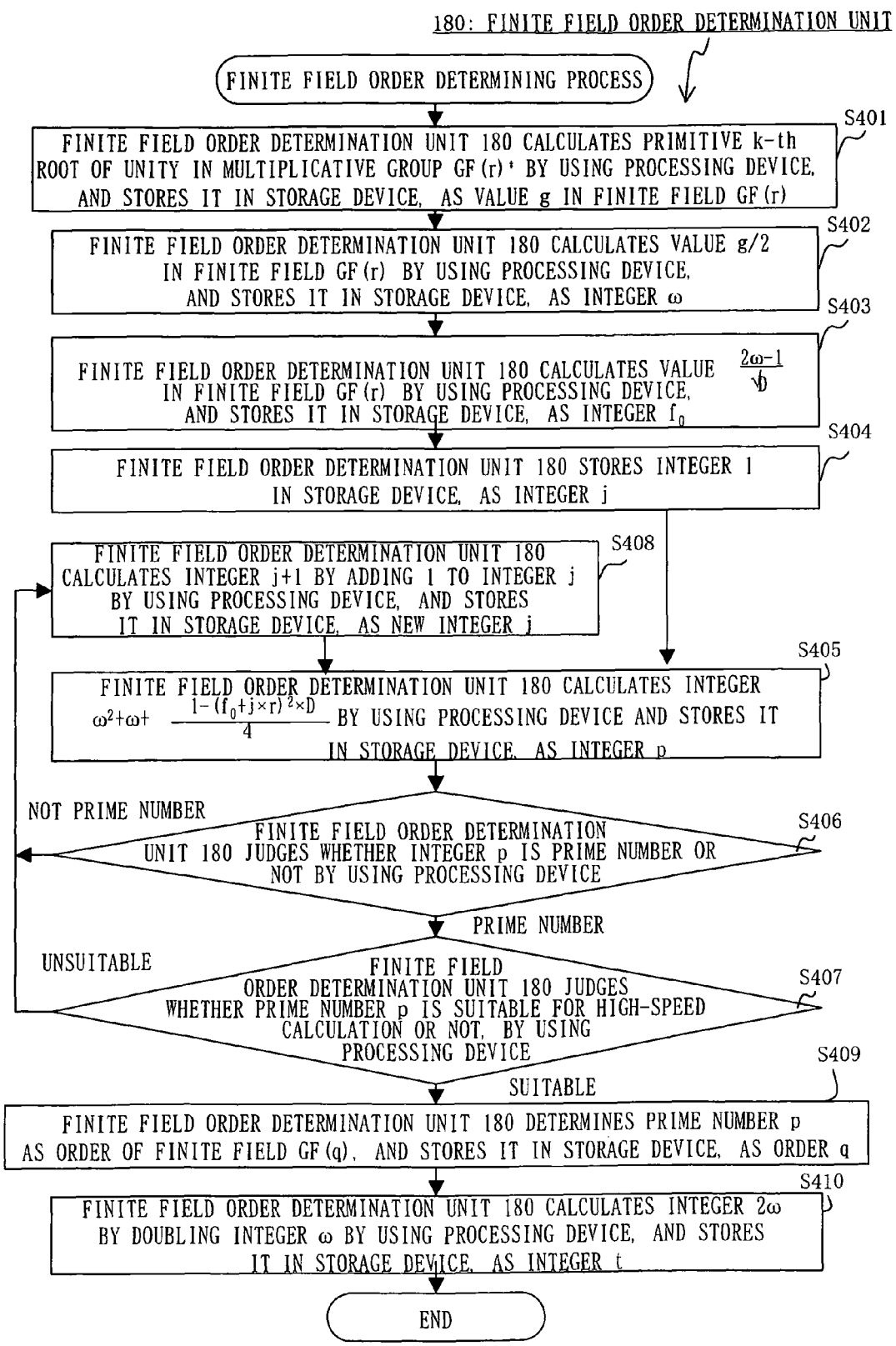
FIG. 15 is a flowchart showing a flow example of processing of determining a finite field order by a finite field order determination unit 180 according to Embodiment 2.
Figure 16:
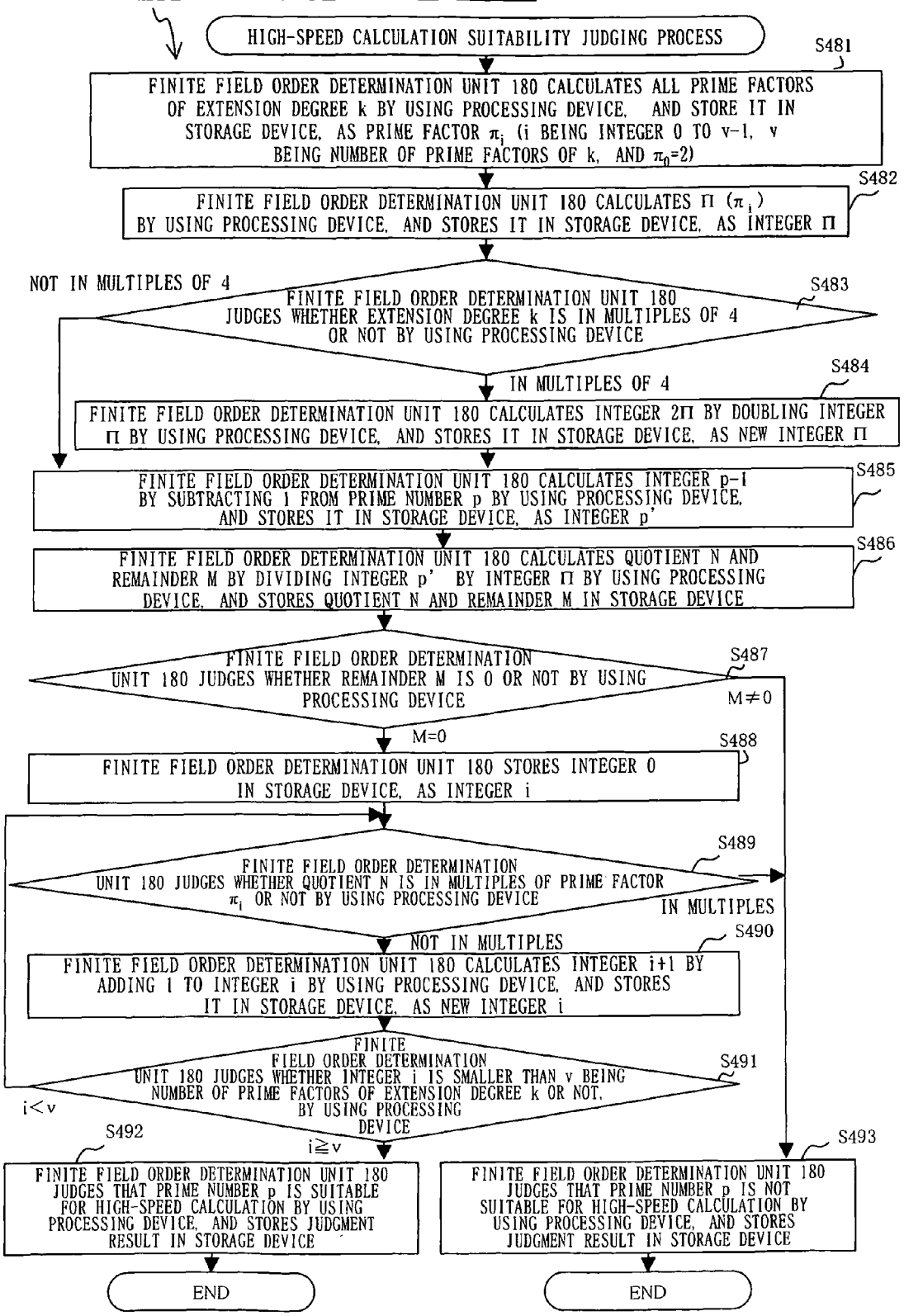
FIG. 16 is a flowchart showing a flow example of processing of judging suitability for high-speed calculation, by the finite field order determination unit 180 according to Embodiment 2.

DESCRIPTION OF THE REFERENCE NUMERALS 100 elliptic curve cryptographic parameter generator, 110 prime number generation unit, 120 group order suitability judgment unit, 130 group order candidate output unit, 140 group order selection unit, 150 group order output unit, 160 group order input unit, 170 extension degree input unit, 180 finite field order determination unit, 190 finite field order output unit, 200, 200a, and 200b elliptic curve cryptographic processors, 210 elliptic curve cryptographic parameter input unit, 211 finite field order input unit, 212 extension degree input unit, 213 elliptic curve coefficient input unit, 214 group order input unit, 221 ID information input unit, 222 plain text input unit, 223 ciphertext input unit, 224 secret key input unit, 230 cryptographic processing unit, 231 finite field processing unit, 232 elliptic curve processing unit, 233 elliptic curve pairing processing unit, 241 public key calculation unit, 242 ciphertext generation unit, 243 decryption unit, 252 ciphertext output unit, 253 plain text output unit, 294 secret key storage unit, 300 center, 510 elliptic curve cryptographic parameter, 521 ID information, 531 secret key, 601 plain text, 651 ciphertext, 800 elliptic curve cryptosystem, 901 display unit, 902 keyboard, 903 mouse, 904 FDD, 905 CDD, 906 printer, 907 scanner, 910 system unit, 911 CPU, 912 bus, 913 ROM, 914 RAM, 915 communication board, 920 magnetic disk drive, 921 OS, 922 window system, 923 program group, 924 file group, 931 telephone, 932 facsimile machine, 940 Internet, 941 gateway, and 942 LAN

The invention claimed is:

1. An apparatus for generating an elliptic curve cryptographic parameter comprising:
a storage device for storing information;
an output device for outputting information;
a processing device for performing computation;
a prime number generation unit for generating a prime number r by using the processing device, and for storing the prime number r generated, in the storage device;
a group order suitability judgment unit for reading the prime number r generated by the prime number generation unit from the storage device, and for judging whether the prime number r is suitable as a group order of an additive group E(K) composed of points on an elliptic curve E over a finite field K=GF(q) in elliptic curve cryptographic processing, by using the processing device; and
a group order candidate output unit, when the group order suitability judgment unit judges that the prime number r is suitable as the group order of the additive group E(K) composed of points on the elliptic curve E over the finite field K in elliptic curve cryptographic processing, for reading the prime number r generated by the prime number generation unit from the storage device, and for outputting the prime number r as a group order candidate by using the output device.

2. The apparatus for generating an elliptic curve cryptographic parameter according to claim 1,
wherein the group order suitability judgment unit
reads the prime number r generated by the prime number generation unit from the storage device, calculates a natural number r−1 by subtracting 1 from the prime number r by using the processing device, and stores the natural number r−1 calculated, in the storage device;
generates a natural number k in a predetermined range by using the processing device, and stores the natural number k generated, in the storage device;
reads the natural number r−1 calculated and the natural number k generated, from the storage device, and judges whether the natural number k is a divisor of the natural number r−1 by using the processing device; and
when judging that each of the natural number k in the predetermined range is a divisor of the natural number r−1, judges that the prime number r is suitable as the group order of the additive group E(K) composed of points on the elliptic curve E over the finite field K in elliptic curve cryptographic processing, by using the processing device.

3. The apparatus for generating an elliptic curve cryptographic parameter according to claim 2, wherein the group order suitability judgment unit generates the natural number k in a range of even numbers equal to or greater than 2 and less than or equal to a predetermined threshold $2k_{max}$ by using the processing device, and stores the natural number k generated, in the storage device.

4. The apparatus for generating an elliptic curve cryptographic parameter according to claim 1,
wherein the prime number generation unit generates the prime number r, a Hamming weight of the primer number r being less than or equal to a predetermined value, by using the processing device, and stores the prime number r generated, in the storage device.

5. The apparatus for generating an elliptic curve cryptographic parameter according to claim 1,
wherein the prime number generation unit
generates a natural number λ by using the processing device, and stores the natural number λ, generated, in the storage device;
reads the natural number λ, generated, from the storage device, calculates an integer $f(λ)=aλ^2+bλk+c$ by substituting the natural number λ into a predetermined quadratic polynomial $f(x)=ax^2+bx+c$ (where, a, b, and c being integers and x being a variable) by using the processing device, and stores the integer f(λ) calculated, in the storage device;
reads the integer f(λ) calculated, from the storage device, calculates a prime factor r of the integer f(λ) by using the processing device, and stores the prime factor r calculated, in the storage device; and
reads the prime factor r calculated, from the storage device, and outputs the prime factor r as the prime number r by using the output device.

6. The apparatus for generating an elliptic curve cryptographic parameter according to claim 5,
wherein the prime number generation unit
reads the integer f(λ) calculated, and the prime factor r calculated, from the storage device, calculates a quotient n=f(λ)/r by dividing the integer f(λ) by the prime factor r by using the processing device, and stores the quotient n calculated, in the storage device;
reads the quotient n calculated, from the storage device, and judges whether the quotient n is equal to or less than a predetermined integer by using the processing device; and
when judging that the quotient n is equal to or less than a predetermined integer, reads the prime factor r calculated, from the storage device, and outputs the prime factor r as the prime number r by using the output device.

7. The apparatus for generating an elliptic curve cryptographic parameter according to claim 5,
wherein the prime number generation unit utilizes $x^2+x+1$ or $x^2+1$ as the predetermined quadratic polynomial f(x) to calculate the integer f(λ) by using the processing device, and stores the integer f(λ) calculated, in the storage device.

8. The apparatus for generating an elliptic curve cryptographic parameter according to claim 5,
wherein the prime number generation unit generates the natural number λ, a Hamming weight of the natural number λ being less than or equal to a predetermined value, by using the processing device, and stores the natural number λ generated, in the storage device.

9. The apparatus for generating an elliptic curve cryptographic parameter according to claim 1, wherein the prime number generation unit generates the prime number r by using the processing device, the prime number r being settable to an apparatus for processing elliptic curve cryptograph as a group order, the apparatus for processing elliptic curve cryptograph performing elliptic curve pairing computation at a speed higher than a predetermined value by being specialized in a group order having a specific form, and stores the prime number r generated, in the storage device.

10. The apparatus for generating an elliptic curve cryptographic parameter according to claim 9, wherein the prime number generation unit generates the prime number r by using the processing device, the prime number r being settable to an apparatus for processing elliptic curve cryptograph as a group order, the apparatus for processing elliptic curve cryptograph performing elliptic curve pairing computation at a speed higher than a predetermined value by utilizing an endomorphism mapping φ on the elliptic curve E over the finite field K, and stores the prime number r generated, in the storage device.

11. The apparatus for generating an elliptic curve cryptographic parameter according to claim 10, wherein the prime number generation unit generates the prime number r by using the processing device, the prime number r being settable to an apparatus for processing elliptic curve cryptograph as a group order, the apparatus for processing elliptic curve cryptograph performing elliptic curve pairing computation at a speed higher than a predetermined value by utilizing an efficiently computable endomorphism mapping as the endomorphism mapping φ and stores the prime number r generated, in the storage device.

12. The apparatus for generating an elliptic curve cryptographic parameter according to claim 10, wherein the prime number generation unit generates the prime number r by using the processing device, the prime number r being settable to an apparatus for processing elliptic curve cryptograph as a group order, the apparatus for processing elliptic curve cryptograph performing elliptic curve pairing computation at a speed higher than a predetermined value by utilizing an endomorphism mapping, an absolute value of a discriminant D of a ring generated by the endomorphism mapping being smaller than a predetermined value, as the endomorphism mapping φ and stores the prime number r generated, in the storage device.

13. The apparatus for generating an elliptic curve cryptographic parameter according to claim 10, wherein the prime number generation unit generates the prime number r by using the processing device, the prime number r being settable to an apparatus for processing elliptic curve cryptograph as a group order, the apparatus for processing elliptic curve cryptograph performing elliptic curve pairing computation at a speed higher than a predetermined value by using $y2=X3+b$ as the elliptic curve E and utilizing (x, y)→(13x, y) (13 being a primitive third root of unity in the finite field K) as the endomorphism mapping φ and stores the prime number r generated, in the storage device.

14. The apparatus for generating an elliptic curve cryptographic parameter according to claim 10, wherein the prime number generation unit generates the prime number r by using the processing device, the prime number r being settable to an apparatus for processing elliptic curve cryptograph as a group order, the apparatus for processing elliptic curve cryptograph performing elliptic curve pairing computation at a speed higher than a predetermined value by using $Yz=X3+aX$ as the elliptic curve E and utilizing (x, y) - - - , (−x, iy) (i being a primitive fourth root of unity in the finite field K) as the endomorphism mapping φ and stores the prime number r generated, in the storage device.

15. The apparatus for generating an elliptic curve cryptographic parameter according to claim 9, wherein the group order candidate output unit outputs the prime number r as the group order candidate by using the output device, the prime number r having a same form as a form of the group order, when an extension degree k of an extension field K'=GF($q^k$) of the finite field K in elliptic curve pairing computation is changed in a predetermined range.

16. The apparatus for generating an elliptic curve cryptographic parameter according to claim 9,
wherein the group order candidate output unit outputs the prime number r as a group order candidate by using the output device, the prime number r being settable as a same group order when an extension degree k of an extension field K'=GF($q^k$) of the finite field K in elliptic curve pairing computation is changed in a predetermined range.

17. The apparatus for generating an elliptic curve cryptographic parameter according to claim 9,
wherein the group order candidate output unit outputs the prime number r as the group order candidate by using the output device, the prime number r being settable as a same group order when an extension degree k of an extension field K'=GF($q^k$) of the finite field K in elliptic curve pairing computation is changed in a range of even numbers equal to or greater than 2 and less than or equal to a predetermined threshold $2k_{max}$.

18. The apparatus for generating an elliptic curve cryptographic parameter according to claim 1, further comprising:
an input device for inputting information;
an extension degree input unit for inputting an extension degree k of an extension field K'=GF($q^k$) of the finite field K in elliptic curve pairing computation by using the input device, and for storing the extension degree k input, in the storage device;
a group order input unit for inputting the prime number r selected from the group order candidate output by the group order candidate output unit, as the group order r, by using the input device, and stores the group order r input, in the storage device;
a finite field order determination unit for reading the group order r input by the group order input unit and the extension degree k input by the extension degree input unit, from the storage device, for determining an order q of the finite field K in the elliptic curve cryptographic processing, based on the group order r and the extension degree k by using the processing device, and for storing the order q of the finite field K determined, in the storage device; and
a finite field order output unit for reading the order q of the finite field K determined from the storage device, and for outputting the order q of the finite field K by using the output device.

19. The apparatus for generating an elliptic curve cryptographic parameter according to claim 18, wherein the finite field order determination unit determines the order q settable to an apparatus for processing elliptic curve cryptograph as an order of the finite field K by using the processing device, the apparatus for processing elliptic curve cryptograph performing elliptic curve pairing computation at a speed higher than a predetermined value by extending the finite field K to the extension field K' by using a predetermined irreducible polynomial pol(x), and stores the order q of the finite field K determined, in the storage device.

20. The apparatus for generating an elliptic curve cryptographic parameter according to claim 18, wherein the finite field order determination unit determines the order q settable to an apparatus for processing elliptic curve cryptograph as an order of the finite field K by using the processing device, the apparatus for processing elliptic curve cryptograph performing elliptic curve pairing computation at a speed higher than a predetermined value by extending the finite field K to the extension field K' by using pol(x)=xk−7 (where, x being a variable in the finite field K and 7 being an element of a multiplicative group K* of the finite field K) as an irreducible polynomial pol(x), and stores the order q of the finite field K determined, in the storage device.

21. The apparatus for generating an elliptic curve cryptographic parameter according to claim 18,
wherein the finite field order determination unit
generates a candidate q for the order settable as the order of the finite field K, by using the processing device, and stores the candidate q generated for the order, in the storage device;
reads the extension degree k input by the extension degree input unit and the candidate q of the order from the storage device, and judges, using the processing device, whether an element γ of the finite field K satisfying all of three conditions below exists:
(1) all prime factors of the extension degree k being divisors of an order L of the element γ of the finite field K,
(2) none of prime factors of the extension degree k being divisors of (q−1)/L,
(3) when the extension degree k being in multiples of 4, q−1 also being in multiples of 4; and
when judging that the element γ of the finite field K satisfying all of the three conditions exists by using the processing device, judges, using the processing device, that the candidate q calculated of the order is settable as the order of the finite field K.

22. The apparatus for generating an elliptic curve cryptographic parameter according to claim 18,
wherein the finite field order determination unit
generates a candidate q for the order settable as the order of the finite field K, by using the processing device, and stores the candidate q generated for the order, in the storage device;
reads the extension degree k from the storage device, calculates all prime factors π by factorizing the extension degree k into prime factors by using the processing device, and stores all the prime factors n calculated, in the storage device;
reads all the prime factors π calculated from the storage device, calculates a product Π of all the prime factors π by using the processing device, and stores the product Π calculated, in the storage device;
reads the extension degree k from the storage device, judges whether the extension degree k is in multiples of 4 by using the processing device, when judging that the extension degree k is in multiples of 4, reads the product Π calculated from the storage device, calculates a product 2Π by doubling the product Π by using the processing device, and stores the product 2Π calculated, in the storage device, as a new product Π;
reads the candidate q generated for the order from the storage device, calculates an integer q−1 by subtracting 1 from the candidate q for the order by using the processing device, and stores the integer q−1 calculated, in the storage device;
reads the integer q−1 calculated and the product Π calculated from the storage device, and judges, using the processing device, whether the integer q−1 is in multiples of the product Π;

when judging that the integer q−1 is in multiples of the product Π, reads the integer q−1 calculated and the product Π calculated from the storage device, calculates a quotient N=(q−1)/L by dividing the integer q−1 by the product Π by using the processing device, and stores the quotient N calculated, in the storage device;

reads the quotient N calculated and all the prime factors π calculated, from the storage device, and judges, using the processing device, whether the quotient N is in multiples of the prime factor π; and when judging that, with respect to all the prime factors π, the quotient N is not in multiples of the prime factor π, judges, using the processing device, that the candidate q generated for the order is settable as the order of the finite field K.

23. An apparatus for processing elliptic curve cryptograph comprising: an input device for inputting information; a storage device for storing information; a processing device for performing computation; a finite field order input unit for inputting an order q of a finite field K=GF(q) in elliptic curve cryptographic processing by using the input device, and for storing the order q input, in the storage device;

a group order input unit for inputting a group order r by using the input device and for storing the group order r input, in the storage device, the group order r being a group order of an additive group E(K) composed of points on an elliptic curve E over a finite field K=GF(q) in elliptic curve cryptographic processing and having a specific form; and an elliptic curve pairing processing unit for reading the order q input by the finite field order input unit and the group order r input by the group order input unit from the storage device, and for performing elliptic curve pairing computation, the elliptic curve pairing computation being performed at a speed higher than a predetermined value by being specialized in the group order having the specific form, based on the order q and the group order r input by the group order input unit, by using the processing device.

24. The apparatus for processing elliptic curve cryptograph according to claim 23, wherein the elliptic curve pairing processing unit performs elliptic curve pairing computation by using the processing device, the elliptic curve pairing computation being performed at said speed by utilizing an endomorphism mapping q0 on the elliptic curve E over the finite field K.

25. The apparatus for processing elliptic curve cryptograph according to claim 24, wherein the elliptic curve pairing processing unit performs elliptic curve pairing computation by using the processing device, the elliptic curve pairing computation being performed at said speed by utilizing an efficiently computable endomorphism mapping as the endomorphism mapping φ.

26. The apparatus for processing elliptic curve cryptograph according to claim 24, wherein the elliptic curve pairing processing unit performs elliptic curve pairing computation by using the processing device, the elliptic curve pairing computation being performed at said speed by utilizing an endomorphism mapping, an absolute value of a discriminant D of a ring generated by the endomorphism mapping being smaller than a predetermined value, as the endomorphism mapping φ.

27. The apparatus for processing elliptic curve cryptograph according to claim 24, wherein the elliptic curve pairing processing unit performs elliptic curve pairing computation by using the processing device, the elliptic curve pairing computation being performed at said speed by using $y2=X3+b$ as the elliptic curve E and utilizing (x, y)~(13x, y) (13 being a primitive third root of unity in the finite field K) as the endomorphism mapping φ.

28. The apparatus for processing elliptic curve cryptograph according to claim 24, wherein the elliptic curve pairing processing unit performs elliptic curve pairing computation by using the processing device, the elliptic curve pairing computation being performed at said speed by using $y2=X3+aX$ as the elliptic curve E and utilizing (x, y) - - - , (−x, iy) (i being a primitive fourth root of unity in the finite field K) as the endomorphism mapping φ.

29. An apparatus for processing elliptic curve cryptograph comprising: an input device for inputting information; a storage device for storing information; a processing device for performing computation; a finite field order input unit for inputting an order q of a finite field K=GF(q) in elliptic curve cryptographic processing by using the input device, and for storing the order q input, in the storage device; and an elliptic curve pairing processing unit for reading the order q input by the finite field order input unit from the storage device, and for performing elliptic curve pairing computation by using the processing device, based on the order q and a specific group order r determined in advance as a group order of an additive group E(K) composed of points on an elliptic curve E over the finite pair K=GF(q) in elliptic curve cryptographic processing, the elliptic curve pairing computation being performed at a speed higher than a predetermined value by being specialized in the specific group order.

30. A nontransitory computer readable medium having stored thereon computer executable program, said program [A program for generating an elliptic curve cryptographic parameter, ] comprising a function for causing a computer including a storage device to store information, an output device to output information, and a processing device to perform computation, to operate as an apparatus for generating an elliptic curve cryptographic parameter, wherein the apparatus includes:

a prime number generation unit for generating a prime number r by using the processing device, and for storing the prime number r generated, in the storage device;

a group order suitability judgment unit for reading the prime number r generated by the prime number generation unit from the storage device, and for judging whether the prime number r is suitable as a group order of an additive group E(K) composed of points on an elliptic curve E over a finite field K=GF(q) in elliptic curve cryptographic processing, by using the processing device; and a group order candidate output unit, when the group order suitability judgment unit judges that the prime number r is suitable as the group order of the additive group E(K) composed of points on the elliptic curve E over the finite field K in elliptic curve cryptographic processing, for reading the prime number r generated by the prime number generation unit from the storage device, and for outputting the prime number r as a group order candidate by using the output device.

31. A nontransitory computer readable medium having stored thereon computer executable program, said program [A program for processing an elliptic curve cryptographic, ] comprising a function for causing a computer including an input device to input information, a storage device to store information, and a processing device to perform computation, to operate as an apparatus for processing elliptic curve cryptograph, wherein the apparatus includes:

a finite field order input unit for inputting an order q of a finite field K=GF(q) in elliptic curve cryptographic processing by using the input device, and for storing the order q input, in the storage device;

a group order input unit for inputting a group order r by using the input device and for storing the group order r input, in the storage device, the group order r being a group order of an additive group E(K) composed of points on an elliptic curve E over a finite field K=GF(q) in elliptic curve cryptographic processing and having a specific form; and an elliptic curve pairing processing unit for reading the order q input by the finite field order input unit and the group order r input by the group order input unit from the storage device, and for performing elliptic curve pairing computation, the elliptic curve pairing computation being performed at a speed higher than a predetermined value by being specialized in the group order having the specific form, based on the order q and the group order r by using the processing device.

32. An apparatus for generating an elliptic curve cryptographic parameter comprising:

a processing device for performing computation;

a prime number generation unit for generating a prime number r by using the processing device;

a group order suitability judgment unit for judging, by using the processing device and based on the prime number r generated by the prime number generation unit, with respect to 2 or more natural numbers k selected from natural numbers each equal to or greater than 2 and less than or equal to a predetermined integer, whether or not each of the natural numbers k is a divisor of a natural number r−1 obtained by subtracting 1 from the prime number r, and when judging that all of the natural numbers k are divisors of the natural number r−1, for judging that the prime number r is suitable as a group order of an additive group E(K) composed of points on an elliptic curve E over a finite field K=GF(q) in elliptic curve cryptographic processing; and a finite field order determination unit for determining, based on the prime number r judged by the group order suitability judgment unit as being suitable as the group order of the additive group E(K), an order q of the finite field K such that the group order of the additive group E(K) becomes the prime number r, by using the processing device.

33. The apparatus for generating an elliptic curve cryptographic parameter according to claim 32, wherein the group order suitability judgment unit judges, with respect to 2 or more natural numbers k selected from even numbers each equal to or greater than 2 and less than or equal to a predetermined integer, whether or not each of the natural numbers k is a divisor of the natural number r−1, by using the processing device.

34. The apparatus for generating an elliptic curve cryptographic parameter according to claim 32, wherein the group order suitability judgment unit judges, with respect to all natural numbers k each of which is an even number equal to or greater than $2k_{min}$ and less than or equal to $2k_{max}$, whether or not each of the natural numbers k is a divisor of the natural numbers r−1, by using the processing device.

35. The apparatus for generating an elliptic curve cryptographic parameter according to claim 32, further comprising:

an input device for inputting information; and an extension degree input unit for inputting an extension degree k of an extension field $K'=GF(q^k)$ of the finite field K used in pairing computation of points on the elliptic curve E by using the input device;

wherein the finite field order determination unit, by using the processing device and based on the prime number r judged by the group order suitability judgment unit as being suitable as the group order of the additive group E(K) and on the extension degree k input by the extension degree input unit, determines an order q of the finite field K, such that the group order of the additive group E(K) becomes the prime number r and that an extension degree of the extension field K' used in pairing computation of the points on the elliptic curve E becomes the extension degree k.

36. The apparatus for generating an elliptic curve cryptographic parameter according to claim 35, wherein the finite field order determination unit generates a candidate q for the order of the finite field K, by using the processing device;

judges, by using the processing device and based on the extension degree k input by the extension degree input unit and the candidate q for the order, whether an element γ of the finite field K satisfying all of three conditions below exists:

(1) all prime factors of the extension degree k being divisors of an order L of the element γ of the finite field K, (2) none of prime factors of the extension degree k being divisors of (q−1)/L, (3) when the extension degree k being in multiples of 4, q−1 also being in multiples of 4; and when judging that an element γ of the finite field K satisfying all of the three conditions exists, determines that the generated candidate q for the order, as the order q of the finite field K, by using the processing device.

37. The apparatus for generating an elliptic curve cryptographic parameter according to claim 35, wherein the finite field order determination unit generates a candidate q for the order of the finite field K, by using the processing device;

by using the processing device and based on the extension degree k input by the extension degree input unit, calculates all prime factors π by factorizing the extension degree k;

by using the processing device and based on all the prime factors π calculated, calculates a product of all the prime factors π;

by using the processing device and based on the extension degree k input by the extension degree input unit, judges whether the extension degree k is in multiples of 4, when judging that the extension degree k is in multiples of 4, doubles the product of all the prime factors π calculated, by using the processing device, as a product Π, and when judging that the extension degree k is not in multiples of 4, treating the product of all the prime factors π calculated, as the product Π;

judges whether the integer q−1 obtained by subtracting 1 from the candidate q for the order by using the processing device is in multiples of the product Π;

when judging that the integer q−1 is in multiples of the product Π, by using the processing device and based on the integer q−1 calculated and the product Π calculated, calculates a quotient N=(q−1)/L by dividing the integer q−1 by the product Π;

using the processing device and based on the quotient N calculated and all the prime factors π calculated, judges whether the quotient N is in multiples of the prime factor π; and when judging that, with respect to all the prime factors π, the quotient N is not in multiples of the prime factor π, determines, using the processing device, the generated candidate q for the order, as the order of the finite field K.

38. The apparatus for generating an elliptic curve cryptographic parameter according to claim 35,
wherein the finite field order determination unit determines the order q of the finite field K such that an element γ exists, the element γ rendering a polynomial pol(x) satisfying pol(x)=$x^k$−γ (where, x being a variable in the finite field K and γ being an element of a multiplicative group K* of the finite field K) an irreducible polynomial pol(x) on the finite field K, by using the processing device.

39. The apparatus for generating an elliptic curve cryptographic parameter according to claim 32, wherein the prime number generation unit
generates a natural number λ by using the processing device;
by using the processing device and based on the natural number λ generated, calculates an integer f(λ)=a$λ^2$+bλ+c by substituting the natural number λ into a predetermined quadratic polynomial f(x)=a$x^2$+bx+c (where, a, b, and c being integers and x being a variable);
by using the processing device and based on the integer f(λ) calculated, calculates a prime factor r of the integer f(λ); and
treats the prime factor r calculated, as the prime number r.

40. The apparatus for generating an elliptic curve cryptographic parameter according to claim 39, wherein the prime number generation unit
by using the processing device and based on the integer f(λ) calculated, and the prime factor r calculated, calculates a quotient n=f(λ)/r by dividing the integer f(λ) by the prime factor r;
by using the processing device and based on the quotient n calculated, judges whether the quotient n is equal to or less than a predetermined integer; and
when judging that the quotient n is equal to less or than a predetermined integer, treats the prime factor r calculated, as the prime number r.

41. The apparatus for generating an elliptic curve cryptographic parameter according to claim 39,
wherein the prime number generation unit utilizes f(x)=$x^2$+x+1 or f(x) =$x^2$+1 as the predetermined quadratic polynomial f(x), and calculates the integer f(λ) by using the processing device.

42. The apparatus for generating an elliptic curve cryptographic parameter according to claim 39,
wherein the prime number generation unit generates the natural number λ, a Hamming weight of which is less than or equal to a predetermined value, by using the processing device.

43. An elliptic curve cryptograph system comprising:
an apparatus for generating an elliptic curve cryptographic parameter according to claim 32; and
an apparatus for processing elliptic curve cryptograph which performs elliptic curve cryptographic processing by using an additive group E(K), the additive group E(K) having, as a group order, a prime number r judged to be suitable as the group order by the group order suitability judgment unit, and the additive group E(K) being composed of points on an elliptic curve E over a finite field K, the finite field K having, as an order, an order q determined by the finite field order determination unit.

44. A nontransitory computer readable medium having stored thereon computer executable program, said program [A program for generating an elliptic curve cryptograpgic parameter,] comprising a function for causing a computer including a processing device to perform computation, to operate as an apparatus for generating an elliptic curve cryptographic parameter according to claim 32.

* * * * *

UNITED STATES PATENT AND TRADEMARK OFFICE
CERTIFICATE OF CORRECTION

PATENT NO. : 8,111,826 B2  
APPLICATION NO. : 12/085587  
DATED : February 7, 2012  
INVENTOR(S) : Katsuyuki Takashima Page 1 of 1

It is certified that error appears in the above-identified patent and that said Letters Patent is hereby corrected as shown below:

On the Title Page, Item (54) and at the top of column 1 lines 1-8, correct the title to read as follows:

--APPARATUS FOR GENERATING ELLIPTIC CURVE CRYPTOGRAPHIC PARAMETER, APPARATUS FOR PROCESSING ELLIPTIC CURVE CRYPTOGRAPH, PROGRAM FOR GENERATING ELLIPTIC CURVE CRYPTOGRAPHIC PARAMETER, AND PROGRAM FOR PROCESSING ELLIPTIC CURVE CRYPTOGRAPH--.

Signed and Sealed this  
Fifteenth Day of May, 2012

David J. Kappos  
*Director of the United States Patent and Trademark Office*